US012609559B2

(12) United States Patent
Widmer et al.

(10) Patent No.: US 12,609,559 B2
(45) Date of Patent: Apr. 21, 2026

(54) FOREIGN OBJECT DETECTION USING HYBRID INDUCTIVE AND CAPACITIVE SENSING

(71) Applicant: WiTricity AI Tech, LLC, Stuart, FL (US)

(72) Inventors: Hans Peter Widmer, Wohlenschwil (CH); Marcel Fischer, Boniswil (CH); Ning Liu, Belmont, MA (US)

(73) Assignee: WiTricity AI Tech, LLC, Stuart, FL (US)

( * ) Notice: Subject to any disclaimer, the term of this patent is extended or adjusted under 35 U.S.C. 154(b) by 638 days.

(21) Appl. No.: 18/162,886

(22) Filed: Feb. 1, 2023

(65) Prior Publication Data

US 2023/0246489 A1     Aug. 3, 2023

Related U.S. Application Data

(60) Provisional application No. 63/362,588, filed on Apr. 6, 2022, provisional application No. 63/267,532, filed on Feb. 3, 2022.

(51) Int. Cl.
   *H01M 10/44*        (2006.01)
   *B60L 53/124*      (2019.01)
                 (Continued)

(52) U.S. Cl.
   CPC ............ *H02J 50/60* (2016.02); *B60L 53/124* (2019.02); *H02J 50/12* (2016.02)

(58) Field of Classification Search
   CPC .. H02J 50/90; H02J 50/10; H02J 50/12; H02J 50/60; H02J 50/402; Y02T 10/7072; Y02T 10/70; B60L 53/124

(Continued)

(56) References Cited

U.S. PATENT DOCUMENTS 10,444,394 B2    10/2019   Widmer et al.
11,565,596 B2    1/2023   Widmer
           (Continued)

FOREIGN PATENT DOCUMENTS

CN      104040834     9/2014
CN      107112814     8/2017
           (Continued)

OTHER PUBLICATIONS

"Notice of Allowance", U.S. Appl. No. 18/069,656, filed Nov. 22, 2023, 8 pages.

(Continued)

*Primary Examiner* — Edward Tso
(74) *Attorney, Agent, or Firm* — Colby Nipper PLLC

(57)            ABSTRACT

In aspects, techniques for detecting and discriminating foreign objects near an inductive wireless power transfer system is disclosed. The method is based on hybrid inductive and capacitive sensing. The apparatus includes a sensing system, a measurement circuit, and a controller. The sensing system senses the object based on at least one of an inductive or a capacitive effect. The sensing system includes an inductive sense element, which has an electrical characteristic that changes in a presence of the object based on the inductive effect. The sensing system further includes a capacitive sense element, which has an electrical characteristic that changes in the presence of the object based on the capacitive effect. The measurement circuit measures the electrical characteristics in the inductive and capacitive sense circuits. The controller determines the presence of the object, and discriminates between metallic and non-metallic objects based on the change in the measured electrical characteristics.

13 Claims, 18 Drawing Sheets

(51) Int. Cl.

| | | |
|---|---|---|
| *H01M 10/46* | (2006.01) | |
| *H02J 50/12* | (2016.01) | |
| *H02J 50/60* | (2016.01) | |

(58) Field of Classification Search

USPC ................. 320/107, 108, 114, 116, 133, 134

See application file for complete search history.

(56) References Cited

U.S. PATENT DOCUMENTS

| | | | |
|---|---|---|---|
| 11,571,976 B2 | 2/2023 | Widmer et al. | |
| 11,945,319 B2 | 4/2024 | Widmer et al. | |
| 12,184,087 B2 | 12/2024 | Widmer et al. | |
| 2012/0248888 A1 | 10/2012 | Kesler et al. | |
| 2013/0163635 A1 | 6/2013 | Karanth et al. | |
| 2013/0181724 A1 | 7/2013 | Teggate et al. | |
| 2014/0084859 A1 | 3/2014 | Hall et al. | |
| 2015/0331135 A1 | 11/2015 | Widmer | |
| 2016/0187519 A1 | 6/2016 | Widmer et al. | |
| 2016/0187520 A1 | 6/2016 | Widmer et al. | |
| 2017/0033609 A1 | 2/2017 | Nakamura et al. | |
| 2017/0315155 A1 | 11/2017 | Smith | |
| 2018/0191200 A1 | 7/2018 | Dibben et al. | |
| 2018/0198323 A1 | 7/2018 | Widmer et al. | |
| 2018/0329101 A1 | 11/2018 | Roy et al. | |
| 2019/0140481 A1 | 5/2019 | Keeling et al. | |
| 2019/0333693 A1 | 10/2019 | Nishimura | |
| 2019/0353816 A1 | 11/2019 | Widmer et al. | |
| 2020/0204005 A1 | 6/2020 | Lee et al. | |
| 2021/0124078 A1* | 4/2021 | Widmer ............... | H05B 1/0288 |
| 2021/0138918 A1 | 5/2021 | Widmer et al. | |
| 2021/0231825 A1* | 7/2021 | Widmer ................ | B60L 53/124 |
| 2023/0099095 A1* | 3/2023 | Widmer ................. | H02J 50/10 |
| 2023/0182589 A1 | 6/2023 | Widmer et al. | |
| 2023/0246488 A1 | 8/2023 | Widmer et al. | |

FOREIGN PATENT DOCUMENTS

| | | |
|---|---|---|
| EP | 2679970 | 1/2014 |
| EP | 2779359 | 9/2014 |
| EP | 3840176 | 6/2021 |
| EP | 3855600 | 7/2021 |
| GB | 2509015 | 6/2014 |
| WO | 2012004092 | 11/2015 |
| WO | 2015175406 | 11/2015 |
| WO | 2023150484 | 8/2023 |

OTHER PUBLICATIONS

"Foreign Office Action", CN Application No. 2017800826390, Jun. 3, 2020, 16 pages.

"Foreign Office Action", EP Application No. 17822979.5, Jul. 22, 2021, 6 pages.

"International Preliminary Report on Patentability", Application No. PCT/US2017/066095, Jul. 25, 2019, 9 pages.

"International Search Report and Written Opinion", Application No. PCT/US2017/066095, Mar. 27, 2018, 15 pages.

"Non-Final Office Action", U.S. Appl. No. 16/526,831, filed Jun. 22, 2022, 7 pages.

"Non-Final Office Action", U.S. Appl. No. 17/153,235, filed Jul. 5, 2022, 7 pages.

"Non-Final Office Action", U.S. Appl. No. 15/620,548, filed Mar. 22, 2019, 10 pages.

"Notice of Allowance", U.S. Appl. No. 16/526,831, filed Sep. 23, 2022, 7 pages.

"Notice of Allowance", U.S. Appl. No. 17/153,235, filed Sep. 23, 2022, 7 pages.

"Notice of Allowance", U.S. Appl. No. 15/620,548, filed May 2, 2019, 9 pages.

"International Search Report and Written Opinion", Application No. PCT/US2023/061742, Jun. 15, 2023, 13 pages.

"Notice of Allowance", U.S. Appl. No. 18/161,396, filed Oct. 28, 2024, 7 pages.

"International Search Report and Written Opinion", Application No. PCT/US2023/061552, Apr. 21, 2023, 13 pages.

"International Preliminary Report on Patentability", Application No. PCT/US2023/061552, Aug. 6, 2024, 7 pages.

"International Preliminary Report on Patentability", Application No. PCT/US2023/061742, Aug. 6, 2024, 7 pages.

"Non-Final Office Action", U.S. Appl. No. 18/161,396, filed Jul. 3, 2024, 9 pages.

* cited by examiner

1400

1402

GENERATE AN ALTERNATING MAGNETIC FIELD

1404

MEASURE AN ELECTRICAL CHARACTERISTIC OF
ONE OR MORE SENSE ELEMENTS

1406

DETECT A CHANGE IN THE MEASURED ELECTRICAL CHARACTERISTIC

1408

DETERMINE PRESENCE OF THE FOREIGN OBJECT
BASED ON THE DETECTED CHANGE

1

FOREIGN OBJECT DETECTION USING HYBRID INDUCTIVE AND CAPACITIVE SENSING

PRIORITY CLAIM AND CROSS-REFERENCE TO RELATED APPLICATIONS

This application claims priority to U.S. Provisional Patent Application No. 63/267,532, filed Feb. 3, 2022, and 63/362, 555, filed Apr. 6, 2022, the content of which is hereby incorporated by reference in its entirety. This application is related to U.S. patent application Ser. No. 15/620,548 filed Jun. 12, 2017, the content of which is hereby incorporated by reference in its entirety.

FIELD

This application is related generally to wireless charging power transfer applications, and specifically to a method and apparatus for detecting and discriminating foreign objects using hybrid inductive and capacitive sensing.

BACKGROUND

Inductive wireless power transfer (WPT) systems provide one example of wireless transfer of energy. In an inductive WPT system, a primary power device (or wireless power transmitter) transmits power wirelessly to a secondary power device (or wireless power receiver). Each of the wireless power transmitter and the wireless power receiver includes an inductive power transfer structure, typically a single or multi-coil arrangement of windings comprising electric current conveying materials (e.g., copper Litz wire). An alternating current passing through the coil e.g., of a primary WPT structure produces an alternating magnetic field. When a secondary WPT structure is placed in proximity to the primary WPT structure, the alternating magnetic field induces an electromotive force (EMF) into the secondary WPT structure according to Faraday's law, thereby wirelessly transferring power to the wireless power receiver if a resistive load is connected to the wireless power receiver. To improve a power transfer efficiency, some implementations use a WPT structure that is part of a resonant structure (resonator). The resonant structure may comprise a capacitively loaded inductor forming a resonance substantially at a fundamental operating frequency of the inductive WPT system (e.g., in the range from 80 kHz to 90 kHz).

Inductive WPT to electrically chargeable vehicles at power levels of several kilowatts in both domestic and public parking zones may require special protective measures for safety of persons and equipment. Such measures may include detection of foreign objects in an inductive power region of the inductive WPT system where electromagnetic field exposure levels exceed certain limits. This necessity for protective measures may be particularly true for systems where the inductive power region is open and accessible. Such measures may include detection of electrically conducting (metallic) objects and living objects (e.g., humans, extremities of humans, or animals) that may be present within or near the inductive power region.

In certain applications for inductive wireless charging of electric vehicles, it may be useful to be able to detect foreign objects that may be present in the inductive power region and that could be susceptible to induction heating due to the high magnetic field strength in that region. In an inductive WPT system for electric vehicle charging operating at a fundamental frequency in a range from 80 kHz to 90 kHz, magnetic flux densities in the inductive power region (e.g., above a primary WPT structure) can reach relatively high levels (e.g., above 2 millteslas (mT)) to allow for sufficient power transfer (e.g., 3.3 kilowatts (kW), 7 kW, 11 kW, and the like). Therefore, metallic objects or other objects present in the magnetic field can experience undesirable induction heating due to eddy current loss effects. In ferromagnetic metallic objects, induction heating may be even more intense due to additional current displacement (skin) and hysteresis loss effects. For this reason, foreign object detection (FOD) may be implemented to detect metallic objects or other objects that are affected by the magnetic field generated by the primary and/or the secondary WPT structure of the inductive WPT system. Once the presence of a foreign object is detected, the WPT system may reduce power or turn off and issue an alert prompting a user to remove the foreign object. Upon removal of the foreign object, regular power transfer may be resumed, initiated either manually by the user or automatically by the WPT system (e.g., based on an object removal detection).

In certain applications for inductive wireless charging of electric vehicles, it may also be useful to be able to detect living objects that are present within or near an inductive power region where a level of electromagnetic field exposure exceeds certain limits (e.g., as defined by the International Commission on Non-Ionizing Radiation Protection (ICNIRP) recommendation). For this reason, living object detection (LOD) may be implemented to detect living objects (e.g., human extremities, animals) or other objects that may be exposed to the magnetic field generated by the primary or secondary WPT structure of the inductive WPT system. Once the presence of a living object is detected, the WPT system may immediately turn off and automatically resume regular power transfer once the presence of the living object is no more detected or after expiration of a period of time that begins when the presence of the living object is no more detected.

In further applications for inductive wireless charging of electric vehicles, it may also be useful to be able to detect a vehicle or a type of vehicle that is present above the wireless power transmitter (e.g., above the primary WPT structure). For this reason, vehicle detection (VD) may be implemented.

In yet another application for inductive wireless charging of electric vehicles, it may also be useful to be able to transmit data (e.g., a vehicle identifier or the like) from a vehicle-based secondary structure to a ground-based primary structure. For this reason, vehicle detection (VD) may be extended for receiving low rate signaling from the vehicle.

Efficiency of an inductive WPT system for electric vehicle charging depends at least in part on achieving sufficient alignment between a primary WPT structure and the secondary WPT structure. Therefore, in certain applications for inductive wireless charging of electric vehicles, it may be useful to be able to determine a position of the vehicle relative to the wireless power transmitter for purposes of guidance and alignment. More specifically, it may be useful to be able to determine a position of the vehicle-based secondary structure (e.g., the secondary WPT structure) relative to the ground-based primary structure (e.g., the primary WPT structure). For this reason, position determination (PD) may be implemented.

In an aspect of hardware complexity reduction and cost saving, it may be useful and desirable to provide FOD, LOD, VD, and PD by a common detection circuit.

SUMMARY

Various implementations of systems, methods, and devices within the scope of the appended claims each have several aspects, no single one of which is solely responsible for the desirable attributes described herein. Without limiting the scope of the appended claims, some prominent features are described herein.

In general, in one aspect, foreign objects are detected in an inductive wireless power transfer system based on one or more of an inductive effect and a capacitive effect. A first sense circuit includes a first electrical conductor forming a loop of an inductive sense element and terminating in a first terminal and a second terminal. A second sense circuit includes a second electrical conductor forming an electrode of a capacitive sense element and having a third terminal. A measurement circuit measures a first electrical characteristic between the first terminal and the second terminal and a second electrical characteristic between the first terminal and the third terminal. A controller jointly uses the measured first and second electrical characteristics to determine a presence of the foreign object and to discriminate whether the foreign object is a metallic object or a non-metallic object based on a change in the measured first and second electrical characteristics.

Implementations may include one or more of the following, in any combination. The first electrical conductor of the first sense element may form a balanced loop of at least two turns forming a substantially symmetric structure with respect to a mirror axis, and the electrical conductor may have at least one crossover located on the mirror axis. A capacitor may be coupled between two equal length sections of the first electrical conductor of the first sense element, forming a series resonant circuit tuned to a first operating frequency. The first sense circuit may include a first capacitor coupled between the first electrical conductor and the first terminal and a second capacitor coupled between the first electrical conductor and the second terminal forming a series resonant circuit tuned to a first operating frequency. The second sense circuit may include an inductor coupled between the second electrical conductor and the third terminal forming a series resonant circuit tuned to a second operating frequency. The second sense circuit may include a capacitor coupled between the second electrical conductor and the first terminal in parallel to the capacitive sense element forming a series resonant circuit tuned to the second operating frequency. The second electrical conductor may be a single-turn open loop. At least one of the first electrical characteristic or the second electrical characteristic may be a complex impedance. The first operating frequency may differ from the second operating frequency. The first and second electrical characteristics may be measured in different time intervals according to a time multiplexing scheme.

Details of one or more implementations of the subject matter described in this specification are set forth in accompanying drawings and the descriptions below. Other features, aspects, and advantages will become apparent from the description, the drawings, and the claims.

BRIEF DESCRIPTION OF THE DRAWINGS

FIGS. 10A to 13A show schematic diagrams illustrating a ground assembly circuit of a wireless power transfer system.

FIGS. 10B to 13B show schematic diagrams illustrating a vehicle assembly circuit of a wireless power transfer system.

DETAILED DESCRIPTION

Figure 1:
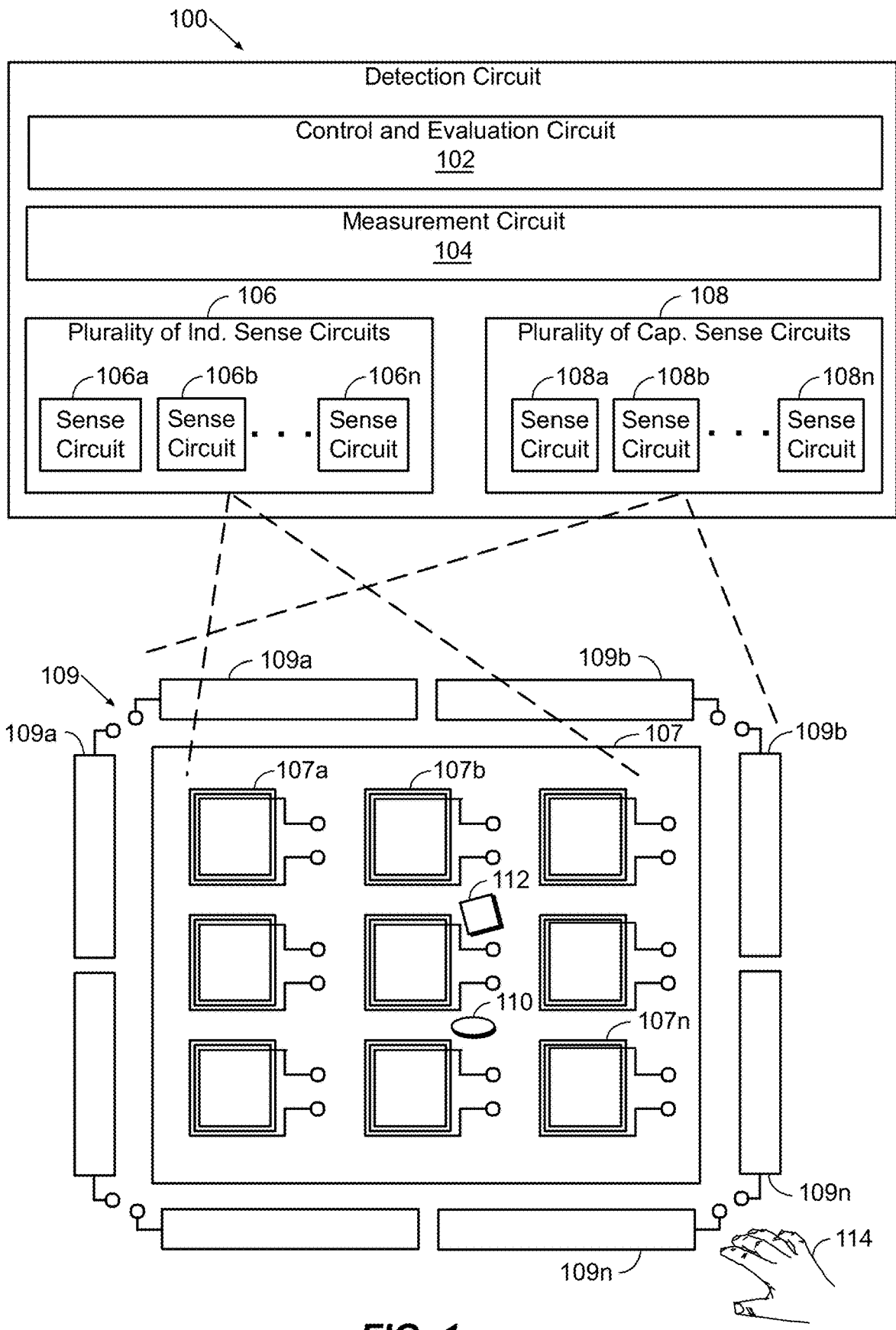
FIG. 1 is a schematic view illustrating an example implementation of a detection circuit including inductive and capacitive sense circuits, a non-living (e.g., metallic) object, and a living object.

As mentioned above, foreign object detection (FOD), and particularly metal object detection, may be valuable for a variety of applications. For detection in a predetermined region, a FOD system may include a plurality of inductive sense circuits each including an inductive sense element (e.g., a sense coil) distributed across a predetermined area (e.g., a planar array of sense coils integrated into the ground-based WPT structure). The predetermined region may be defined by a space where metal objects may be found and where magnetic flux density exceeds certain limits (e.g., a threshold determined based on what temperature a metal object might be heated to). This space referred to as the detection space is generally a three-dimensional space above the inductive sense elements defining a detection area. The number of inductive sense elements may be related to a form factor of the detection space (or detection area) and a minimum size of an object that is desirable to detect. For a system that is configured to detect small objects (e.g., a paper clip), the number of sense elements may be relatively high (e.g., on the order of 100). The FOD system may further include control and measurement circuitry for applying drive signals to each of the inductive sense circuits each including an inductive sense element and additional elements for conditioning, as well as for measuring an electrical characteristic in each of the capacitive sense circuits and for detecting changes in the electrical characteristics that may indicate the presence of a foreign (e.g., metallic) object. An example FOD system is described in U.S. Pat. No. 10,627, 257, titled Systems, Methods, and Apparatus for Detection of Metal Objects in a Predetermined Space, the entire contents of which are hereby incorporated by reference.

As also mentioned above living object detection (LOD) (e.g., human extremities, animals) may be valuable for a variety of applications. For detection in a predetermined region, a LOD system may include a plurality of capacitive sense circuits each including a capacitive sense element (e.g., a sense electrode) disposed, for example, along the periphery of a ground-based WPT structure of a WPT system. The predetermined region may be defined by the space accessible for living objects as well as where living objects may be located and an exposure magnetic field strength exceeds certain limits (e.g., as recommended by ICNIRP). This space referred to as the detection space is generally three-dimensional. The number of capacitive sense elements may be related to the detection space and a minimum size of a living object that is desirable to be detect. For a system that is configured to detect human extremities (e.g., a hand) and animals (e.g., a cat), the number of sense elements may be relatively low (e.g., on the order of 4). The LOD system may further include control and measurement circuitry for applying drive signals to each of the capacitive sense circuits each including a capacitive sense element and additional elements for conditioning, as well as for measuring an electrical characteristic in each of the capacitive sense circuits and for detecting changes in the electrical characteristics that may indicate the presence of a living object. An example LOD system is described in U.S. Pat. No. 9,952, 266, titled Object Detection for Wireless Energy Transfer Systems, the entire contents of which are hereby incorporated by reference.

As mentioned above vehicle detection (VD) or detection of the type of vehicle above the ground-based WPT structure of a WPT system may be valuable for a variety of applications. For detection of a vehicle or the type of vehicle, a VD system may include a plurality of sense circuits each including a corresponding sense element distributed across an area defined by the ground-based WPT structure. In some implementations, the plurality of sense circuits includes inductive sense circuits each including an inductive sense element (e.g., a planar array of sense coils). In other implementations, the plurality of sense circuits includes capacitive sense circuits or a combination of inductive and capacitive sense circuits, each including a correspond capacitive or inductive sense element. The VD system may further include control and measurement circuitry for applying drive signals to each of the sense circuits each including a corresponding sense element and additional elements for conditioning, as well as for measuring an electrical characteristic in each of the sense circuits and for detecting changes in the electrical characteristics that may indicate the presence of a vehicle.

As mentioned above, determination of a position (PD) of a vehicle (e.g., the position of the vehicle-based WPT structure relative to the ground-based WPT structure of a WPT system) may be valuable for a variety of applications. For determination of a vehicle position, a PD system may include a plurality of sense circuits each including a corresponding sense element disposed in an area defined by the ground-based WPT structure. In some implementations, the plurality of sense circuits includes inductive sense circuits each including an inductive sense element (e.g., a planar array of sense coils). In other implementations, the plurality of sense circuits includes capacitive sense circuits or a combination of inductive and capacitive sense circuits, each including a corresponding capacitive or inductive sense element. The PD system may further include control and measurement circuitry for applying drive signals to each of the sense circuits each including a corresponding sense element and additional elements for conditioning, as well as for measuring an electrical characteristic in each of the sense circuits and for detecting changes in the electrical characteristics that may indicate position of a vehicle.

In some implementations, the PD system is configured to support a passive beacon PD technique. Passive beacon PD uses at least one passive beacon transponder that may be integrated into the vehicle-based WPT structure or that may be mounted elsewhere at the vehicle underbody. When positioned above the sense element array of the detection circuit, the passive beacon transponder produces a distinct time-varying change (a modulated response) in the electrical characteristic of at least one of the sense circuits. This modulated response may be used for determining a position of the at least one passive beacon transponder relative to the array of sense elements, which is related to the position of the vehicle-based WPT structure relative to the ground-based WPT structure. The at least one passive beacon transponder may also be used for determining the presence of a vehicle (VD) or the type of vehicle, (e.g., by means of a modulation that is characteristic for the type of vehicle). Further, the at least one passive beacon transponder may be used to transmit data (e.g., at a low data rate) to the primary device by means of the passive modulation technique.

In some implementations, the at least one passive beacon transponder includes an inductive passive beacon transponder configured to mainly interact with an inductive sense circuit and the detection circuit of the PD system includes a plurality of inductive sense circuits. In other implementations, the at least one passive beacon transponder includes a capacitive passive beacon transponder configured to mainly interact with the capacitive sense circuits and the detection circuit of the PD system includes a plurality of capacitive sense circuits. In further implementations, the at least one passive beacon transponder is configured to interact with both the inductive and capacitive sense circuits and the detection circuit of the PD system includes a plurality of inductive and capacitive sense circuits. An example inductive passive beacon PD system is described in U.S. patent application Ser. No. 16/052,445, titled Hybrid Foreign Object Detection and Positioning System, the entire contents of which are hereby incorporated by reference.

In an aspect of hardware complexity reduction and cost saving, it may be useful and desirable to share use of hardware components of a detection circuit for FOD, LOD, VD, and PD functions as far as possible and sensible. A multi-purpose detection circuit configurable for FOD, LOD, VD, and PD functions is described in U.S. Patent application 62/926,307, titled Circuit for Object Detection and Vehicle Position Determination, the entire contents of which are hereby incorporated by reference.

"Electric vehicle" describes a remote system, an example of which is a vehicle that includes, as part of its locomotion capabilities, electrical power derived from a chargeable energy storage device (e.g., one or more rechargeable electrochemical cells or another type of battery). As non-limiting examples, some electric vehicles may be hybrid electric vehicles that include, besides electric motors, a traditional combustion engine for direct locomotion or to charge the vehicle's battery. Other electric vehicles may draw all locomotion ability from electrical power. An electric vehicle is not limited to an automobile and may include motorcycles, carts, scooters, and the like.

"Foreign object" describes an object that does not naturally belong to the WPT system. A foreign object may include a metallic object, a non-living dielectric (substantially nonconductive) object, a living object (e.g., an animal, a human extremity), a vehicle, or a combination thereof. It may describe an object that needs to be detected for purposes of safety of equipment or persons, but it may also refer to an object of no harm (e.g., that has the potential to produce a false detection (false positive detection) in a detection system and therefore needs to be discriminated).

FIG. 1 illustrates an example implementation of a detection circuit 100 that includes a plurality of inductive sense circuits 106a, 106b, . . . 106n and a plurality of capacitive sense circuits 108a, 108b, . . . 108n. The number of inductive sense circuits 106a to 106n and the number of capacitive sense circuits 108a to 108n may each be fewer or greater than three that are shown. In examples mentioning an arbitrary one of such numbered sense circuits, it may be referred to it as 106i, 108i, respectively. As illustrated in FIG. 1, each of the sense circuits 106a to 106n includes a corresponding inductive sense element (e.g., a sense coil) of a plurality of inductive sense elements 107a to 107n, respectively. Likewise, each of the capacitive sense circuits 108a to 108n includes a corresponding capacitive sense element (e.g., a pair of sense electrodes) of a plurality of capacitive sense elements 109a to 109n, respectively. In examples mentioning an arbitrary one of such numbered elements, it may be referred to it as 107i, 109i, respectively.

FIG. 1 also illustrates foreign objects 110 and 112 representing non-living objects and a living object 114. The object 110 represent a metallic (substantially electrically conductive) object that is potentially heated when exposed to the WPT magnetic field, while the object 112 represents a dielectric or ferromagnetic object that is substantially electrically non-conductive and that does not heat when exposed to the WPT magnetic field. The living object 114 may stand for a human extremity (e.g., a hand, as depicted in FIG. 1) or an animal that is dielectric and substantially electrically non-conductive.

The inductive sense elements 107a to 107n and capacitive sense elements 109a to 109n are configured to sense a presence of a foreign object (e.g., object 110) in proximity to at least one of the inductive sense elements 107a to 107n and a living object (e.g., object 114) in proximity to at least one of the capacitive sense elements 109a to 109n, a vehicle or type of vehicle (not shown in FIG. 1) positioned above the inductive and capacitive sense elements 107a to 107n and 109a to 109n, respectively, and for determining a vehicle position by measuring one or more electrical characteristics (e.g., an impedance) in each of the inductive sense circuits 106a to 106n and capacitive sense circuits 108a to 108n and by detecting changes in the measured one or more electrical characteristics. Each of the inductive sense circuits 106a to 106n and capacitive sense circuits 108a to 108n may also include additional conditioning circuitry (not shown in FIG. 1) configured, for example, to improve measurement of the one or more electrical characteristics and thus a detection sensitivity and reliability of the detection circuit 100. Each of the sense circuits also defines at least one measurement port (not shown in FIG. 1) where the one or more electrical characteristics are measured and refer to.

Each of the inductive sense elements 107a to 107n is shown in FIG. 1 as a "circular" coil for purposes of illustration. However, in other implementations, the inductive sense elements 107a to 107n may include a sense coil having another coil topology (e.g., a "figure-eight-like" topology). In yet other implementations, the inductive sense elements 107a to 107n may include sense coils of a mixed coil topology (e.g., "circular" and "figure-eight-like"). In further implementations, the inductive sense elements 107a to 107n, may include sense coils with a ferrite core (e.g., solenoid coils, not shown herein) that are physically smaller compared to "air" coils. In yet further implementations, the sense elements 107a to 107n may include other inductive devices that can be used for generating a magnetic field for detecting a foreign object or a vehicle or for determining a vehicle position. In some implementations (not shown herein), each of the inductive sense elements 107a to 107n, may include a double or even a triple sense coil arrangement that may be used in conjunction with a transimpedance measurement technique (e.g., based on a mutual inductance or mutual impedance). In some implementations, the inductive sense elements 107a to 107n are arranged in an array 107, such as a two-dimensional array 107 as shown in FIG. 1. However, in other implementations, the inductive sense elements 107a to 107n are arranged in other configurations that do not conform to rows or columns (radial or interleaved), are at least partially overlapping or have irregular spacing, have different sizes, have different shapes (circular, hexagonal, etc.), cover irregular detection areas, or include any combination thereof. As such the term "array" as used herein denotes a plurality of sense elements that are arranged over a predetermined area. Furthermore, the number of inductive sense elements of the array 107 and thus the number of sense circuits can vary widely based on the application, which includes the total region in which a foreign object is to be detected and the smallest size of an object the detection circuit 100 is configured to detect. Example implementations of the inductive sense element (e.g., 107a) and arrangements of inductive sense elements are described in U.S. Pat. No. 9,726,518, titled Systems, Methods, and Apparatus for Detection of Metal Objects in a Predetermined Space, in U.S. Pat. No. 11,002,874, titled Foreign Object Detection Circuit Using Mutual Impedance Sensing, in U.S. Pat. No. 10,122,192, titled Sense Coil Geometries with Improved Sensitivity for Metallic Object Detection in a Predetermined Space, and in U.S. Pat. No. 10,124,687, titled Hybrid Foreign Object Detection (FOD) Loop Array Board, the entire contents of which are hereby incorporated by reference.

Each of the capacitive sense elements 109a to 109n is shown in FIG. 1 as a pair of sense electrodes for purposes of illustration. However, in other implementations, the capacitive sense elements 109a to 109n may include a single electrode providing a single terminal. In further implementations, the capacitive sense elements 109a to 109n may be configured and driven for measuring a transimpedance (e.g., based on a mutual capacitance or mutual impedance). In yet further implementations, the capacitive sense elements 109a to 109n, may include other capacitive devices that can be used for generating and detecting an electric field for detecting a foreign object (e.g., object 112), a living object (e.g., object 114), or a vehicle (e.g., vehicle 340, FIG. 3), or for determining a type of vehicle or a vehicle position. In FIG. 1, the capacitive sense elements 109a to 109n are shown arranged in an area around the array of inductive sense elements 107a to 107n. However, in other implementations, the capacitive sense elements 109a to 109n are arranged in other configurations (e.g., distributed over the area of the array 107 of the inductive sense elements). Example implementations of a capacitive sense element (e.g., capacitive sense element 109a) and arrangements of capacitive sense elements are described in U.S. Pat. No. 9,952,266, titled Object Detection for Wireless Energy Transfer Systems, the entire contents of which are hereby incorporated by reference.

Continuing the example of FIG. 1, each of the inductive sense circuits 106a to 106n and the capacitive sense circuits 108a to 108n including the corresponding sense elements 107a to 107n and 109a to 109n, are operably connected to a measurement circuit 104. The measurement circuit 104, including multiplexing (not shown in FIG. 1), is configured to selectively and sequentially measure one or more electrical characteristics in each of the inductive sense circuits 106a to 106n and capacitive sense circuits 108a to 108n and to provide outputs to the control and evaluation circuit 102.

The measurement circuit 104 is configured to cause each of the inductive sense elements 107a to 107n to selectively and sequentially generate an alternating magnetic field at a sense frequency (e.g., by selectively and sequentially applying a sense signal (e.g., a current) to each of the inductive sense circuits 106a to 106n). If a metallic object (e.g., object 110) is present in the alternating magnetic field, eddy currents will be generated in the object. According to Lentz's law, the eddy currents in the object will generate another (secondary) magnetic field that interacts with the primary magnetic field as generated by the respective sense element, and a mutual coupling is developed. This may cause a change in an electrical characteristic (e.g., an impedance) as measured by the measurement circuit 104 in the respective inductive sense circuit 106i. A change in a measured electrical characteristic may also be caused by a substantially non-conductive but ferromagnetic object (e.g., object 112) with a relative permeability $\mu_r > 1$ that interacts with the alternating magnetic field as generated by the respective inductive sense element. Applying a sense signal to the inductive sense circuit 106i may also cause the respective inductive sense element 107i to generate an alternating electric field that may interact with a substantially non-conductive, dielectric object (e.g., non-living object 112 or living object 114) causing a change in the electrical characteristic as measured in the respective inductive sense circuit (capacitive sensing effect). This alternating electric field may also interact with a metallic (substantially electrically conductive) object (e.g., object 110). However, this effect is expected to be orders of magnitude weaker than the magnetic field effect.

The measurement circuit 104 is further configured to cause each of the capacitive sense elements (e.g., sense electrodes) 109a to 109n to selectively and sequentially generate an alternating electric field at the sense frequency (e.g., by selectively and sequentially applying a sense signal (e.g., a current) to each of the capacitive sense circuits 108a to 108n). If a substantially non-conductive, dielectric object (e.g., living object 114 or non-living object 112) with a relative permittivity $\varepsilon_r > 1$ is present in the alternating electric field, it will interact with the electric field. This may cause a change in an electrical characteristic (e.g., an impedance) as measured by the measurement circuit 104 in the respective capacitive sense circuit (e.g., capacitive sense circuit 108a). A change in a measured electrical characteristic may also be caused by a metallic object (e.g., object 110) as it will also interact with the alternating electric field as generated by the respective capacitive sense element. Applying a sense signal (e.g., current) to the capacitive sense circuit 108i may also cause the respective capacitive sense element 109i to generate an alternating magnetic field that may interact with a metallic object (e.g., object 110) causing a change in the electrical characteristic as measured in the respective capacitive sense circuit (inductive sensing effect). However, this effect may be orders of magnitude weaker than the electric field effect.

Figure 2:
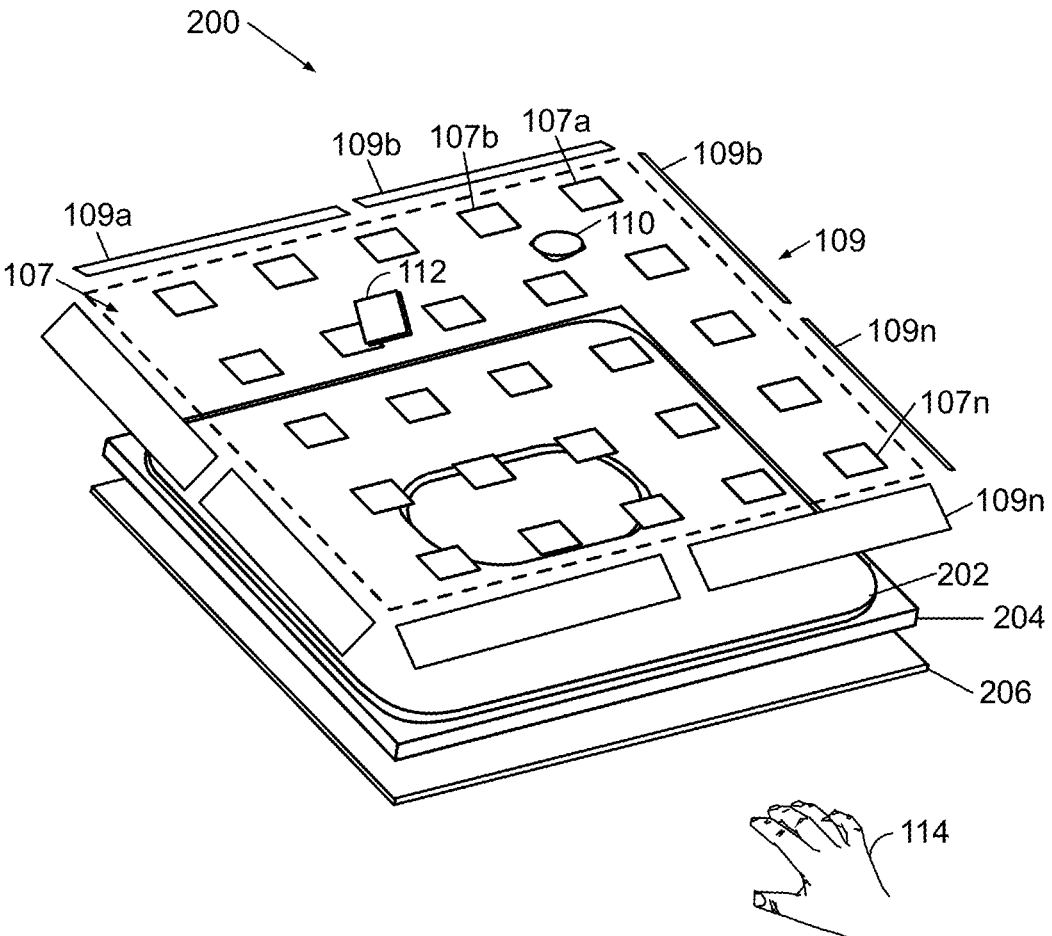
FIG. 2 is a schematic view illustrating an example implementation of a ground-based wireless power transfer structure integrating a portion of the detection circuit shown in FIG. 1 and the non-living and living objects of FIG. 1.

FIG. 2 illustrates an example implementation of a WPT structure 200 that is a portion of a WPT system. The WPT structure 200 includes a coil 202 (e.g., a Litz wire coil) also referred to as the WPT coil that is configured to generate an alternating magnetic field when driven with a current by a power conversion circuit (not shown). The WPT structure 200 also includes a ferrite structure 204 that may be consist of one or more ferrite tiles and is configured to channel or provide a low reluctance path for magnetic flux. It further includes a back plate 206. In some implementations, the back plate 206 is metallic acting as a shield configured to guide magnetic flux and to prevent the magnetic and electric fields from extending far beyond a boundary determined by the back plate 206 or at least to attenuate the field extending beyond that boundary. As an example, the back plate 206 may be formed from aluminum. Further, FIG. 2 illustrates one example of how the inductive sense element array 107 and the capacitive sense element array 109 of FIG. 1 may be integrated into the WPT structure 200. In some implementations, the WPT structure 200 also includes a tuning and matching network (not shown) to tune the WPT structure 200 for resonance substantially at the WPT operating frequency and to match an impedance to a power conversion circuit (not shown in FIG. 2). FIG. 2 also shows foreign objects such as metallic object 110, non-metallic object 112, and living object 114 as in FIG. 1.

FIG. 2 depicts a ground-based wireless power transfer (WPT) structure also sometimes referred to as a "ground assembly (GA) pad", a "base bad", or a GA resonator if integrating the tuning and matching network. The ground-based WPT structure 200 is commonly configured to transmit power from the GA to a vehicle (not shown) and may be an integral part of the GA of the WPT system including power converters and tuning and matching networks. In some implementations, the ground-based WPT structure 200 is configured to transmit or receive power to or from the vehicle depending on an operational mode of the WPT system. In transmit mode, power is transferred from the GA to the vehicle, while in receive mode, power is transferred from the vehicle to the GA as needed (e.g., to transfer power from the vehicle to the grid) in a mode referred to as "V2G". When excited by a current, the WPT coil 202 generates a magnetic field (e.g., at the WPT operating frequency in a range from 80 to 90 kHz) for transferring power from the GA to the vehicle. Furthermore, as the ground-based WPT structure 200 may be positioned on the ground or another top-facing surface, a foreign object may come to rest at a top surface of an enclosure (e.g., enclosure 310 with reference to FIG. 3). The object may be exposed to high levels of magnetic flux density if power is being transferred. As previously discussed, metallic objects or other objects present in this magnetic field can experience undesirable induction heating due to eddy current or hysteresis loss effects. Moreover, a human extremity (e.g., a hand) such as illustrated by the object 114 when approaching the WPT structure 200 may be exposed by the magnetic field. Therefore, exposure of both types of objects may require protection mechanisms as discussed herein.

Figure 3:
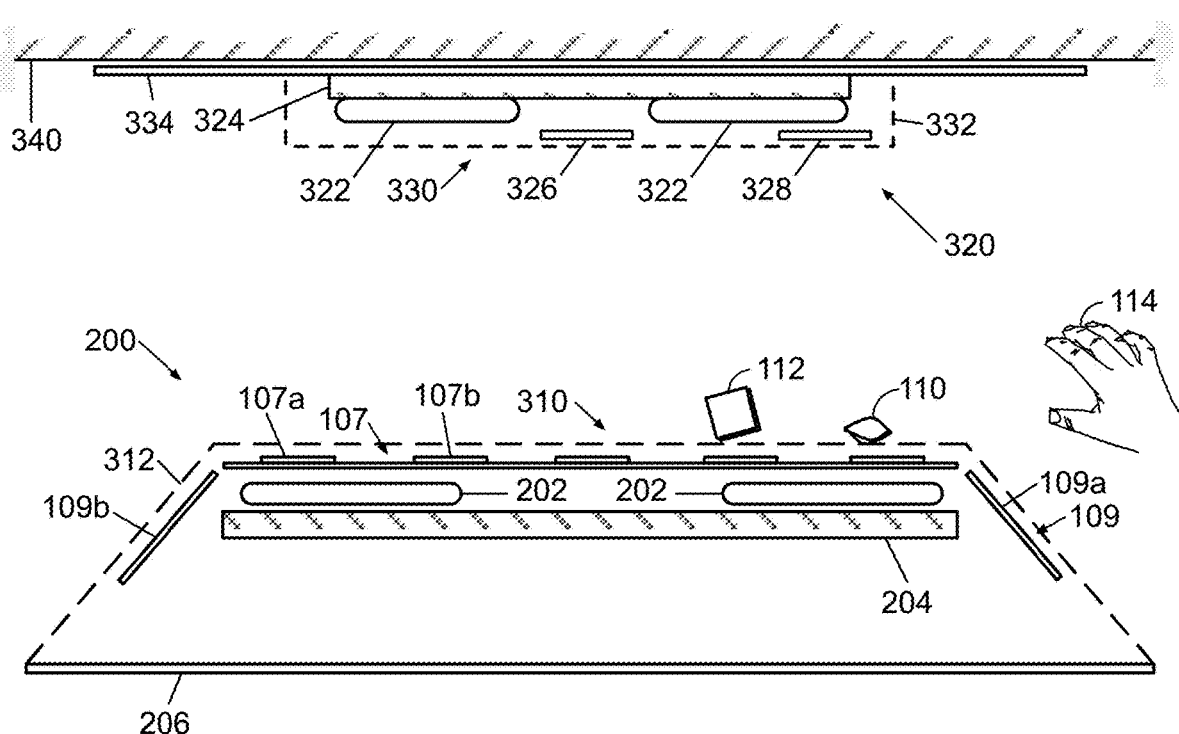
FIG. 3 is a vertical cut view illustrating a portion of a WPT system including a vehicle-based wireless power transfer structure and the ground-based wireless power transfer structure of FIG. 2 integrating a portion of the detection circuit of FIG. 1, and the non-living and living objects of FIG. 1.

FIG. 3 illustrates a vertical cut view of a portion 300 of a WPT system applicable to wireless electric vehicle charging. This portion 300 includes the ground-based (e.g., transmit) WPT structure 200 with reference to FIG. 2 and a vehicle-based (e.g., receive) WPT structure 320 affixed to an underbody of a vehicle 340. The vehicle-based WPT structure 320 may be an integral part of a vehicle assembly (VA) of the WPT system including power converters and tuning and matching networks.

The ground-based WPT structure 200 includes the WPT coil 202, ferrite structure 204, and back plate 206, as well as the inductive sense element array 107 and capacitive sense element array 109 as part of the detection circuit 100 shown in FIGS. 1 and 2.

FIG. 3 further illustrates an enclosure 310 that houses the components of the WPT structure 200 such as the WPT coil 202, the ferrite structure 204, and the sense element arrays 107 and 109. The enclosure 310 comprises a cover shell 312 and the back plate 206 from FIG. 2. In some implementations, the enclosure 310 may also house the tuning and impedance matching network as mentioned above and the measurement circuit 104 and the control and evaluation circuit 102 as part of the detection circuit 100 of FIG. 1. In another implementation, the enclosure 310 additionally houses a portion or all of a power conversion circuit (not shown). The enclosure 310 may be inclined along its perimeter from its edge toward its interior to form a ramp over which a vehicle may drive. The capacitive sense elements 109a to 109n may be tilted (nonparallel) with respect to a plane defined by the inductive sense element array 107. For example, the capacitive sense elements may be oriented to be substantially parallel to the inclined surface of the enclosure 310 along the enclosure's perimeter. FIG. 3 also shows the non-living objects 110 and 112 and the living object 114 from FIG. 1.

The vehicle-based WPT structure 320 includes a WPT coil 322, a ferrite structure 324, and a shield 334 made of an electrically conductive material. In some implementations, the shield 334 may be formed from a portion of the structure that the ferrite structure 324 and the WPT coil 322 are affixed to on the underbody of the vehicle 340. In this case, an enclosure 330 that houses the WPT coil 322 and the ferrite structure 324 may not house the shield 334. Other implementations are possible where the enclosure 330 includes a cover shell 332 and an electrically conductive back plate (not shown) similar to the enclosure 310 of the WPT structure 200. A power conversion circuit (not shown) may be electrically connected to the WPT coil 322 and a portion or all of the power conversion circuit may also be housed in the enclosure 330.

As discussed above, the ground-based WPT structure 200 generates a magnetic field while the vehicle-based WPT structure 320 inductively receives power via the magnetic field. In implementations supporting V2G, the WPT structure 320 may also generate a magnetic field and the WPT structure 200 may receive power via the magnetic field.

As illustrated in FIG. 3, the vehicle-based WPT structure 320 may also integrate at least one of an inductive passive beacon transponder 326 and a capacitive passive beacon transponder 328 (e.g., for purposes of PD and VD). The inductive passive beacon transponder 326 may be configured to primarily interact with inductive sense elements (e.g., the inductive sense elements 107a to 107n). In some implementations, the inductive passive beacon transponder 326 includes a transponder coil, a capacitive element to compensate for the gross reactance of the coil at the operating (sense) frequency of the detection circuit 100, and a passive impedance modulation circuit (these elements not shown herein). The capacitive passive beacon transponder 328 may be configured to primarily interact with capacitive sense elements (e.g., the capacitive sense elements 109a to 109n). In some implementations, the capacitive passive beacon transponder 328 includes a transponder electrode, an inductive element to compensate for the gross reactance of the electrode at the operating (sense) frequency of the detection circuit 100, and a passive impedance modulation circuit (these elements not shown herein). In further implementations (not shown herein), the passive beacon transponder (e.g., passive beacon transponder 326) is configured to interact with both the inductive and capacitive sense elements of the detection circuit 100.

In some implementations (not shown) the vehicle-based WPT structure 320 also includes one or more inductive and capacitive sense elements configured to detect non-living and living objects (e.g., metallic object 110 and living object 114) in the same manner as is described for detection circuit 100.

Figure 4:
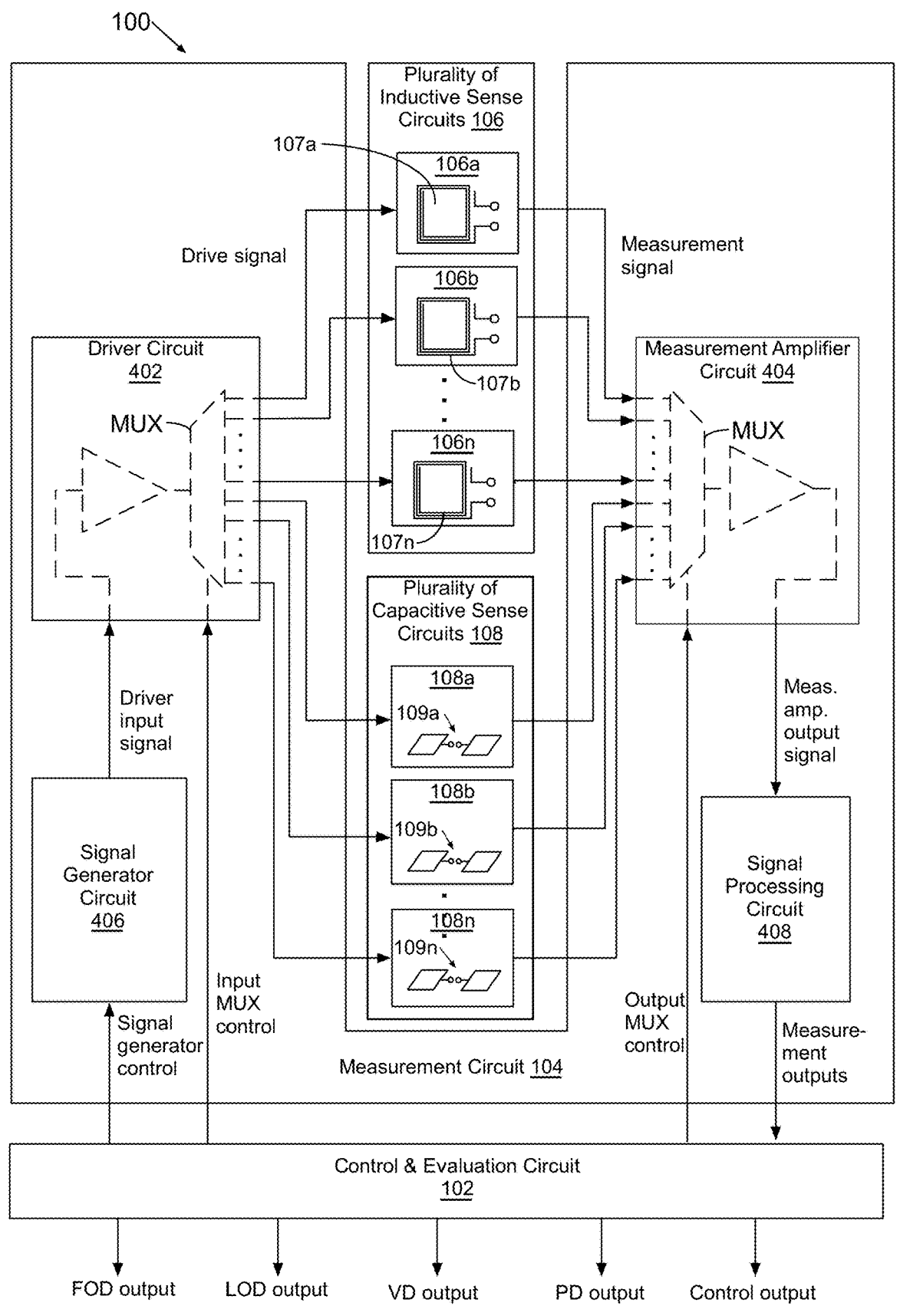
FIG. 4 is a generic block diagram of an example implementation of the detection circuit of FIG. 1

FIG. 4 is a generic block diagram illustrating an example implementation or operation of a detection circuit 100. The detection circuit 100 includes the inductive sense circuits 106a to 106n including the inductive sense elements 107a to 107n, the capacitive sense circuits 108a to 108n including the capacitive sense elements 109a to 109n, the measurement circuit 104, and the control and evaluation circuit 102 with reference to FIG. 1.

Each of the inductive sense circuits 106a to 106n may also include an associated capacitive element (not shown) to compensate for the gross reactance as presented at the terminals of the inductive sense element at the sense frequency. Each of the capacitive sense circuits 108a to 108n may also include an associated inductive element (not shown) to compensate for the gross reactance as presented at the terminals of the capacitive sense element at the sense frequency. At least one of the inductive and capacitive sense circuits also includes an impedance matching element (e.g., a transformer) for transforming the impedance of the sense circuit to match with an operating impedance range of the multi-purpose object detection circuit 100. In an example implementation, each of the inductive sense circuits 106a to 106n is naturally matched with an operating impedance range without using an additional impedance matching element. However, the capacitive sense circuits 108a to 108n are not naturally matched, and therefore an additional impedance matching element (e.g., a transformer) is used. In another example implementation, it is vice-versa. In a further example implementation, both the inductive sense circuits 106a to 106n and the capacitive sense circuits 108a to 108n include an additional impedance matching element.

The measurement circuit 104 is electrically connected to the inductive and capacitive sense circuits and configured for selectively and sequentially measuring one or more electrical characteristics (e.g., an impedance) in each of the inductive and capacitive sense circuits according to a predetermined time multiplexing scheme. The outputs of the measurement circuit 104, also referred to as measurement outputs as indicated in FIG. 4, are indicative of the measured one or more electrical characteristics. The measurement circuit 104 further includes a driver circuit 402, a measurement amplifier circuit 404, a signal generator circuit 406, and a signal processing circuit 408.

The driver circuit 402, including an input multiplexer (input MUX) circuit, is electrically connected to the inductive sense circuits 106a to 106n and the capacitive sense circuits 108a to 108n and configured to selectively and sequentially apply a drive signal (e.g., a current signal) at the sense frequency to each of the inductive sense circuits 106a to 106n and the capacitive sense circuits 108a to 108n based on a driver input signal generated by the signal generator circuit 406.

The measurement amplifier circuit 404, including an output multiplexer (output MUX) circuit, is electrically connected to the inductive sense circuits 106a to 106n and the capacitive sense circuits 108a to 108n and configured to selectively and sequentially amplify a measurement signal (e.g., a voltage signal) in each of the inductive sense circuits 106a to 106n and the capacitive sense circuits 108a to 108n and to provide a measurement amplifier output signal indicative of the measurement signal in each of the sense circuits.

The signal generator circuit 406 electrically connected to the input of the driver circuit 402 is configured to generate the driver input signal.

The signal processing circuit 408, electrically connected to the output of the measurement amplifier circuit 404, is configured to receive and process the measurement amplifier output signal and to determine the one or more electrical characteristics in each of the inductive and capacitive sense circuits based on the driver input signal and the measurement amplifier output signal. Processing the measurement amplifier output signal may include filtering, combining, averaging, etc. Filtering may include reducing a disturbance (e.g., noise) component superimposed on the sense signal as received by the signal processing circuit 408 and thus to improve a signal-to-noise ratio (SNR) in the measurement outputs of the signal processing circuit 408.

The control and evaluation circuit 102 is electrically connected to the measurement circuit 104 and configured to control the input MUX circuit and the output MUX circuit of the driver circuit 402 and the measurement amplifier circuit 404 via input MUX control and output MUX control, respectively, as indicated in FIG. 4. Input and output MUX circuit control is according to the predetermined time multiplexing scheme, to evaluate the one or more electrical characteristics (measurement outputs) as measured in each of the inductive and capacitive sense circuits and to determine at least one of a presence of a foreign object, a living object, or a vehicle, a type of vehicle, and a vehicle position based on changes in the measured one or more electrical characteristics. The control and evaluation circuit 102 may provide various outputs as indicated in FIG. 4. In a detection circuit 100 configured for FOD, LOD, VD, and PD, the control and evaluation circuit 102 provides a corresponding FOD output, LOD output, VD output, and PD output.

The dashed lines used in FIG. 4 emphasize that the components and their configuration in the measurement circuit 104 and particularly in the driver circuit 402 and the measurement amplifier circuit 404 are illustrative, and other implementations may have these or other components configured to drive the sense circuits 106a to 106n and 108a to 108n with a drive signal and to amplify a measurement signal in each of the sense circuits 106a to 106n and 108a to 108n. Furthermore, while certain circuit elements are described as connected between other elements, it should be appreciated that there may be other circuit elements in various implementations that may also be in between the two elements described as electrically connected (e.g., other elements interposed). In an example alternative implementation (not shown) of the measurement circuit 104, there is only one MUX circuit in common for both the driver circuit 402 and the measurement amplifier circuit 404.

Example implementations of the detection circuit 100 are described in U.S. Pat. No. 9,726,518, titled Systems, Methods, and Apparatus for Detection of Metal Objects in a Predetermined Space, in U.S. Pat. No. 9,921,045, titled Systems, Methods, and Apparatus for Increased Foreign Object Detection Loop Array Sensitivity, in U.S. Pat. No. 10,295,693, titled Systems, Methods, and Apparatus for Foreign Object Detection Loop Based on Inductive Thermal Sensing, in U.S. Pat. No. 10,302,795, titled Systems, Methods, and Apparatus for Detecting Ferromagnetic Objects in a Predetermined Space, in U.S. Pat. No. 10,298,049, titled Systems, Methods, and Apparatus for Detecting Metallic Objects in a Predetermined Space via inductive Kinematic Sensing, in U.S. Pat. No. 11,046,193, titled Foreign Object Detection Circuit Using Current Measurement, in U.S. Pat. No. 10,855,117, titled Extended Foreign Object Detection Signal Processing, and in U.S. Pat. No. 11,002,874, titled Foreign Object Detection Circuit Using Mutual Impedance Sensing, the entire contents of which are hereby incorporated by reference.

In an example operation of the detection circuit 100, the sense signal is selectively and sequentially applied to each of the inductive sense circuits 106a to 106n and to each of the capacitive sense circuits 108a to 108n according to a time division multiplexing scheme and in a round robin fashion. The sense signal for driving an inductive sense circuit is applied in a time interval (time slot) allocated to that sense circuit and has a maximum duration equal to or shorter than the duration of the time slot. The time frame corresponding to the sum of time slots allocated to the inductive sense circuits 106a to 106n and capacitive sense circuits 108a to 108n is also referred to herein as the scan cycle or the repetition period.

In an aspect, to reduce the duration of the scan cycle, a first sense signal is selectively and sequentially applied to each of a portion of the inductive sense circuits 106a to 106n and capacitive sense circuits 108a to 108n and a second sense signal is concurrently, selectively and sequentially applied to each of the remaining portions of the inductive and capacitive sense circuits. Concurrently applying two or more sense signals reduces the scan cycle and may result in a reduced detection latency with respect to FOD and LOD and in an increased position update rate with respect to PD (e.g., using the passive beaconing approach as previously described).

In an example implementation or operation of the detection circuit 100, the concurrently applied sense signals are sinusoidal signals of the same frequency. In another example, the concurrently applied sense signal are sinusoidal signals but differ in frequency.

In a further example, each of the concurrent sinusoidal sense signals as applied in time slots allocated to the same sense circuit (e.g., sense circuit 106i) starts with the same phase (e.g., zero-phase). In some implementations using more than two current sense signals, starting sense signals in time slots allocated to the same sense circuit with the same phase may help to mitigate interference caused by intermodulation effects as described in U.S. Pat. No. 10,855,117 mentioned above.

In some implementations or operations of the detection circuit 100, time slots of a scan cycle are reallocated based on some conditions (e.g., whether WPT is active or inactive). For example, it may be desirable to reduce detection latency with respect to LOD when WPT is active. Therefore, in an example operation, two or more time slots of a scan cycle are allocated to each of the capacitive sense circuits 108a to 108n when WPT is active. Conversely, the LOD function may not be required when WPT is inactive. Therefore, in an example operation, time slots of a scan cycle are only allocated to inductive sense circuits 106a to 106n when WPT is inactive. In another example operation, two or more time slots of a scan cycle are allocated to each of the inductive sense circuits 106a to 106n and one time slot is allocated to each of the capacitive sense circuits when WPT is inactive. This mode of operation may maintain a limited LOD function when WPT is inactive (e.g., for monitoring proper functioning of the detection circuit 100 with respect to LOD). Moreover, time spacing between time slots allocated to the same sense circuit in any of the scanning modes described above is maximized.

The control and evaluation circuit 102 is configured to control the measurement circuit 104 (e.g., the multiplexing) and to evaluate the outputs of the measurement circuit 104 (measurement outputs) as indicative of the one or more measured electrical characteristics, to determine at least one of a presence of a foreign object, living object, or vehicle, a type of vehicle, and a vehicle position based on changes in the measurement outputs.

In some implementations, the control and evaluation circuit 102 may include decision functions as needed for FOD, LOD, and VD as well as position calculation functions needed for PD. In other implementations, the vehicle position is determined in a unit (not shown) external to the detection circuit 100 based on outputs (e.g., raw data) from the control and evaluation circuit 102 and on outputs provided by other ground- or vehicle-based sensors (not shown).

In an example implementation or operation of the control and evaluation circuit 102, the evaluation is based on a time-differential detection (TDD) scheme that is sensitive (e.g., to a relatively fast change in a sequence (time-series) of consecutive measurement outputs, each associated with the same at least one sense circuit of the plurality of sense circuits 106a to 106n and 108a to 108n). A relatively fast change may be defined as a change that is substantially faster than a drift of a measured electrical characteristics due to a varying ambient temperature of a sense circuit.

In some implementations or operations based on a TDD scheme, the presence of an object is assumed, if at least one difference between a first measurement output associated to a sense circuit (e.g., sense circuit 106a) and at a first time and a second measurement output associated with the same sense circuit and at a second time exceeds a threshold. Using TDD, an object can be detected when it enters or leaves the proximity of a sense element or generally when it moves in the proximity of the sense element.

In a further example implementation or operation of the detection circuit 100, the evaluation is based on a sense circuit differential detection scheme that is sensitive to differences between outputs of the measurement circuit 104 associated with different sense circuits of the plurality of sense circuits. This detection scheme may be referred to as space-differential detection (SDD). In some implementations or operations based on SDD, a presence of an object is assumed if at least one difference between a first measurement output associated with at least one first sense circuit and a second measurement output associated to at least one second sense circuit exceeds a threshold. In some implementations or operations of a true SDD scheme, the plurality of measurement outputs used to determine a difference refer to substantially the same time. It may be appreciated that in certain cases, SDD may be less sensitive and reliable than TDD because individual sense circuits of the plurality of sense circuits 106a to 106n may be at least partially differently affected by ambient temperature, mechanical impacts, and aging.

In some aspects, TDD may be sensitive to movements of metallic structures in the environment of the sense element array 107. Such environmental effects may include movements of the metallic underbody structure of the vehicle (e.g. vehicle 340 of FIG. 3) when the vehicle is parked over WPT structure 200. These movements may cause false detections in certain implementations of the detection circuit 100 that is solely based on a TDD approach. Therefore, in some aspects, it may be desirable to mitigate such disturbance effects.

Combining TDD with SDD is one approach to effectively discriminate such disturbance effects. In certain implementations or operations of combined TDD and SDD, a presence of an object is determined by evaluating at least one difference between a TDD output associated with at least one sense circuit and a reference value that is determined based on a plurality of TDD outputs each associated with one of the sense circuits 106a to 106n. This reference value may be, for example, a mean value, a median value (50th percentile), or any other statistical value that is derived from the measurement outputs. It may be appreciated that this special detection scheme has the potential to discriminate environmental effects (e.g., from a moving vehicle underbody) that may produce changes in an electrical characteristic (e.g., an impedance) in a majority (cluster) of sense circuits. This special scheme may be considered as a mechanism that automatically adapts the detection threshold used in the control and evaluation circuit 102 for determining the presence of an object. More specifically, in some implementations or operations, the control and evaluation circuit 102 automatically adjusts the reference value as described above. When the vehicle underbody is moving, the reference value (detection threshold) may increase. Increasing the reference value reduces the false detection rate but also the detection sensitivity to some extent. Therefore, a somewhat lower sensitivity may be accepted for an object entering the predetermined space while the vehicle is moving. As soon as the vehicle underbody comes to rest, the reference value settles automatically, and the detection circuit 100 may return to its ordinary detection sensitivity maintaining a specified false detection rate.

Inductive thermal sensing (ITS) described in U.S. Pat. No. 10,295,693 (incorporated herein) is a specialized detection scheme for detecting metallic objects of a category characterized by at least one electrical property (e.g., conductivity, permeability) that can be inductively sensed at the FOD sense frequency and that is a function of the object's temperature, and, when the object is heated, changes at a rate substantially faster than a system-intrinsic thermal drift in absence of the object. An object of this category can potentially be detected by exposing it to a sufficiently strong alternating magnetic field to cause induction heating as previously explained. In some implementations, this magnetic field is the low-frequency magnetic field as generated by the WPT system.

Non-limiting examples of objects detectable by ITS may be a cigarette packet including a metallized foil, an aluminum cover (lid) of a yoghurt cup, a chewing gum wrapper, a cigarette lighter with a metallized lighter head, and a paper clip. These objects may be characterized by rapid heating (e.g., in seconds) if exposed to an alternating magnetic field with a flux density above 1 mT at a frequency of 85 kHz and by at least one electrical property that substantially changes as a function of temperature.

It may be appreciated that an object of this category, when heated, may also change an electrical characteristic (e.g., impedance) of an inductive sense element (e.g., sense element 107i) proximate to the object. This will result in a change in an electrical characteristic as measured in a corresponding inductive sense circuit by the measurement circuit 104 at the FOD sense frequency and thus in a change in the measurement outputs. Exposing the object to a heating magnetic field may be considered as stimulating the object to make it detectable on an absolute basis without the need for a precise calibration and long-term stability of circuits or by means of a TDD scheme as described above.

In some implementations or operations of ITS, a potential metallic object is stimulated by intermittently applying the magnetic field exposure in a manner so that the object's temperature follows exposure ON and OFF cycles distinctly but not exceeding a critical level. If an object of the above-described category is proximate to at least one inductive sense element, the associated measurement outputs will also follow the exposure ON and OFF cycles. In an alternative implementation or operation of ITS, a potential metallic object is stimulated by changing the magnetic field exposure between a higher level and a lower level rather than by applying ON/OFF cycling.

In some implementations of a detection circuit 100 using ITS, the presence of an object is determined by the control and evaluation circuit 102 based on a correlation between a sequence of measurement outputs indicative of an electrical characteristic of an inductive sense circuit as determined at the FOD sense frequency and a signal indicative of the level of magnetic field exposure used for heating (stimulation). The magnetic field exposure level may be sensed using at least one of the inductive sense elements 107a to 107n and with the measurement amplifier circuit 404 and the signal processing circuit 408 also configured to measure the voltage induced into the at least one inductive sense element.

In some example implementations or operations of the detection circuit 100, ITS is combined with a SDD scheme. Presence of an object is assumed if at least one difference between a level of measurement output-to-magnetic field exposure correlation associated with at least one first sense circuit (e.g., inductive sense circuit 106a) and a level of correlation associated with at least one second sense circuit (e.g., inductive sense circuit 106b) exceeds a threshold.

In some implementations, the system intrinsic thermal effect may occur due to one or more properties (e.g., resistance, permittivity) of the conductive and insulating materials included in the inductive sense element that are also a function of temperature. When exposed to the low-frequency WPT magnetic field, the one or more properties may change, causing the electrical characteristic of the inductive sense element to change (e.g., to drift). In the presence of a metal object, the system intrinsic thermal effect will superimpose with a system extrinsic thermal effect produced by the object, thus falsifying or even predominating the wanted system extrinsic effect. Therefore, in some implementations, the detection circuit 100 employs a process of calibration (or learning) by determining the change (e.g., drift) of the electrical characteristic as produced by the system intrinsic thermal effect in absence of any foreign object. While in normal operation, the control and evaluation circuit 102 may compensate for (e.g., subtract) the system intrinsic effect, resulting in an improved sensitivity for detecting metal objects based on ITS.

In a further implementation, the system intrinsic thermal effect is reduced by using special materials or components configured to reduce a thermal coefficient in the one or more properties.

Inductive ferromagnetic sensing (IFS) described in U.S. Pat. No. 10,302,795 (incorporated herein) is another specialized detection scheme for detecting metallic ferromagnetic objects of a category characterized by at least one electrical property (e.g., conductivity, permeability) that can be inductively sensed at the FOD sense frequency and that is a function of an instantaneous amplitude of a biasing magnetic field in a manner such that it can be substantially varied (modulated) by applying a low frequency biasing magnetic field (e.g., the 85 kHz WPT magnetic field). In ferromagnetic objects, this function is generally non-linear meaning that a negative and a positive magnetic field amplitude change an electrical property equally resulting in a rectified modulation. This rectified modulation produces a DC component, a fundamental frequency component at double the frequency of the biasing field (e.g., 170 kHz), and, depending on the degree of saturation higher order harmonics. The modulation function may also include memory (hysteresis) effects and thermal effects (e.g., Curie temperature effect).

Non-limiting examples of objects detectable by IFS are objects made of ferromagnetic steel such as paper clips, pieces of wire, nails, pins, screws, nuts, and washers. These objects may be characterized by a pronounced magnetic biasing effect if exposed to an alternating magnetic field with a flux density above 1 mT at a frequency of around 85 kHz and by at least one electrical property that substantially changes as a function of the exposure flux density.

It may be appreciated that an object of this category, when exposed to the low-frequency magnetic field, may also modulate an electrical characteristic (e.g., impedance) of an inductive sense element (e.g., sense element 107i) proximate to the object. This will result in a modulation of an electrical characteristic as measured in a corresponding inductive sense circuit (e.g., sense circuit 106i) at the FOD sense frequency by the measurement circuit 104.

Exposing the object to the magnetic field will cause magnetic biasing that may be considered as stimulating the object to make it detectable on an absolute basis without the need for a precise calibration and long-term stability of circuits or by means of a TDD scheme as described above.

In the frequency domain, the modulation by the biasing low-frequency magnetic field can manifest in a change of a spectral peak at the FOD sense frequency (corresponding to the DC component of the modulation) but also in the occurrence of modulation sidebands on the left and the right of the FOD sense frequency. The modulation sidebands may include one or more spectral peaks in both the lower and upper sideband corresponding to the fundamental and higher order harmonics having an offset of n times the fundamental modulation frequency (e.g., $2 \times 85$ kHz) from the FOD sense frequency, where n is an even integer including 2, 4, 6, etc.

In certain implementations, the signal processing circuit 408 extracts the component at the FOD sense frequency (DC component of the rectified modulation) and the measurement outputs are indicative of the DC component. In other implementations, it extracts one or more of the fundamental and harmonics components of the modulation spectrum and the measurement outputs are indicative of one or more of the fundamental and harmonics components.

In some implementations or operations of IFS, a potential metallic object is stimulated by applying the low-frequency magnetic field (e.g., with a frequency of 85 kHz) in a manner that modulates the object's electrical properties during an exposure ON cycle but with a level and duration that does not cause the object to exceed a critical temperature. An exposure ON cycle may be considered as a substantially rectangular pulse with respect to an envelope of the low-frequency magnetic field. If an object of the above described category is proximate to at least one inductive sense element, the associated measurement outputs will also change for the duration of the exposure ON cycle ((e.g., the pulse duration). In an alternative implementation or operation of IFS, a potential metallic object is stimulated by changing the magnetic field exposure between a higher level and a lower level rather than by applying ON/OFF cycles.

In some implementations of a detection circuit 100 using IFS, a presence of an object is determined by the control and evaluation circuit 102 based on a correlation between a sequence of measurement outputs indicative of an electrical characteristic of an inductive sense circuit as determined at one or more of the FOD sense frequency and a modulation sideband and a signal indicative of the level of magnetic field exposure used for modulation (stimulation). The magnetic field exposure level may be sensed using at least one of the inductive sense elements 107a to 107n in a manner as described above with reference to ITS.

In certain implementations of the control and evaluation circuit 102, presence of an object is determined based on a correlation as described above but using ITS and IFS jointly. This may improve detection of small ferromagnetic objects exhibiting both a thermal effect and a magnetic biasing effect (e.g., a paper clip).

In some implementations, a magnetic biasing effect may also occur in the ferrite material used in the WPT structure (e.g., in ferrite structure 204 of WPT structure 200 of FIGS. 2 and 3) causing a change in an electrical characteristic (e.g., impedance) of an inductive sense element when the low-frequency WPT magnetic field is applied. In the presence of a ferromagnetic object, this system intrinsic magnetic biasing effect will superimpose with a system extrinsic magnetic biasing effect produced by the object, thus falsifying or even predominating the wanted system extrinsic effect. Therefore, in some implementations, the detection circuit 100 employs a process of calibration (or learning) by determining the change in the electrical characteristic as produced by the system intrinsic biasing effect in absence of any foreign object. While in normal operation, the control and evaluation circuit 102 may compensate for (e.g., subtract) the system intrinsic effect, resulting in an improved sensitivity for detecting ferromagnetic objects based on IFS.

In a further implementation, the system intrinsic magnetic biasing effect is reduced by using a ferrite structure (e.g., ferrite structure 204 of FIG. 2) including a ferrite material configured to reduce a magnetic biasing effect when exposed to the low-frequency magnetic field.

Inductive motion sensing (IMS) as described in U.S. Pat. No. 10,298,049 (incorporated herein) is a further specialized detection scheme for detecting an object by its relative motion (e.g., when the object is mechanically moved relative to the sense elements). The relative movement of an object in proximity of a sense element (e.g., inductive sense element 107i) may produce a change in an electrical characteristic (e.g., impedance) of a corresponding inductive sense circuit (e.g., inductive sense circuit 106i) and consequently in the associated measurement outputs of the measurement circuit 104.

In an example implementation or operation of IMS, an object is mechanically moved back and forth relative to the sense element array 107. This may be accomplished by moving the top surface of the enclosure 310 of FIG. 3 where the object may come to rest, a portion of the WPT structure 200, or both. This portion may include the WPT coil 202, the ferrite structure 204, and sense element array 107 inside enclosure 310 of FIG. 3. In some implementations or operations of IMS, an object is moved relative to the sense elements with an amplitude in the centimeter range and at a low frequency (e.g., 3 Hz). In other implementations or operations, the object is moved (vibrated) with an amplitude in the millimeter or even submillimeter range at a higher frequency (e.g., 100 Hz).

In another implementation or operation of IMS, a metal object is moved by applying a time-varying magnetic field exerting electrodynamic forces on the object (e.g., due to eddy currents induced into the object) as described in U.S.

Pat. No. 9,726,518 (incorporated herein). In this implementation or operation, the object may be a low-mass object (e.g., a thin metal foil) and the applied alternating magnetic field may be the WPT low-frequency magnetic field (e.g., 85 kHz).

In a further implementation or operation of IMS, a ferromagnetic metal object (e.g., object 110) is moved by applying a magnetic field exerting magnetic forces on the object.

In yet another implementation or operation of IMS, an object is moved by gravitational or deformational forces. An example may be a composite object that includes a metallic and a plastic portion (e.g., a plastic yoghurt cup with an aluminum lid). The metallic portion, when inductively heated, may cause the plastic to partially melt or deform and therefore the metallic part to move.

In some implementations or operations of IMS, a presence of an object is determined based on a correlation between a measurement output indicative of a measured electrical characteristic (e.g., impedance) and a signal indicative of a mechanical movement. In other implementations or operations of IMS, a presence of an object is determined based on a correlation between a measurement output indicative of a measured electrical characteristic and a signal indicative of a level of magnetic field exposure causing the object to move.

In some implementations or operations of the detection circuit 100, one or more power correlation-based detection scheme (e.g., ITS, IFS, IMS) are employed in a pre-charging phase (e.g., before starting the regular charging process) when the vehicle is parked over the ground-based WPT structure such that the WPT structure cannot be easily accessed by persons or animals. In such conditions, the use of ITS, IFS, and IMS requiring the WPT coil (e.g., WPT coil 202 of FIG. 2) to be excited by a relatively high current (e.g., >30 Arms) may be considered safe and access of a living object can be more easily protected by LOD. This procedure using a correlation-based detection scheme is to verify that the ground-based WPT structure is clear for WPT (e.g., charging). This procedure may be also referred to as a "clean pad check" and may last a few minutes.

In other implementations or operations and if supported by the WPT system and a management system of the vehicle battery, the detection circuit 100 employs one or more of a power correlation-based detection scheme (e.g., ITS, IFS, IMS) during regular power transfer. Use of a correlation-based detection scheme may require the WPT system to frequently and rapidly ramp up and ramp down power.

Object Detection with Mediating Heat-Sensitive Material

A certain category of metal objects may not be detectable by any of the above-discussed power-correlation schemes (e.g., ITS, IFS, IMS) though potentially heating if exposed to the to the WPT magnetic field. This may be particularly true if the sense frequency is in the MHz range. Objects of this category may exhibit neither a pronounced thermal or magnetic biasing effect nor movement if exposed to the WPT magnetic field. This category includes copper- or nickel-coated objects with a core of ferromagnetic steel (e.g., certain coins). An undetectable object resting on the top surface of the enclosure 310 of the WPT structure 200 as illustrated in FIG. 3 may heat up when exposed to the WPT magnetic field and may melt into the enclosure 310 potentially causing irreparable damage if the cover shell 312 of the enclosure 310 is made of a standard low-cost plastic.

Accordingly, a method and apparatus for protecting a WPT structure from such objects is desirable. In certain aspects, a WPT structure (e.g., WPT structure 200) includes one or more portions of a mediating heat-sensitive material. The portions of the heat-sensitive material can advantageously be a part of a system configured to detect foreign objects in proximity to the WPT structure based on a change in a property of the mediating heat-sensitive material rather than a change in a property of the object itself.

In some aspects, the heat-sensitive material may be a material that changes an electrical resistance based on a temperature of the material. More generally, a heat-sensitive material may be a material that changes an impedance as measured at an operating frequency (e.g., the FOD sense frequency) as a function of the material's temperature. More specifically, a heat-sensitive impedance material may change one or more of a resistivity, a conductivity, a capacitance, an inductance, an electric permittivity, a magnetic permeability, and another electrical characteristic based on a temperature of the material.

In an aspect, the heat-sensitive material may be a material that changes its electrical conductivity as a function of temperature. An example heat-sensitive material may have a conductivity with a pronounced negative temperature coefficient (NTC) characteristic such that its conductivity substantially increases as temperature rises and decreases as temperature falls. The conductivity of the heat-sensitive material may rapidly and substantially increase as the temperature exceeds a threshold (e.g., 100° Celsius (C), 373 Kelvin (K)). In an implementation, the heat-sensitive material is a doped polymer (e.g., CoolPoly® thermally conductive plastic from Celanese Corporation) with an NTC characteristic that has a conductivity that substantially increases when the temperature rises above 100° C. (373 K). In another example, the heat-sensitive material acts substantially as an insulator at temperatures below the threshold and becomes electrically conductive when the temperature exceeds the threshold. In some implementations, the heat-sensitive material is a type of ceramic or a crystalline material with a pronounced NTC characteristic (e.g., due to a phase change in the crystalline structure when the temperature rises).

In another aspect, the heat-sensitive material may have a resistance with a pronounced positive temperature coefficient (PTC) characteristic such that its resistance substantially increases as temperature rises and decreases as temperature falls. In an implementation, the heat-sensitive material is a PTC screen printable ink (e.g., from Loctite® PTC ink from Henkel Corporation) with a defined temperature threshold whose sheet resistance ($\Omega$/square) increases rapidly when the temperature rises above the threshold.

In a further aspect, the heat-sensitive material may change its electric permittivity (e.g., dielectric constant) as a function of temperature. An example of such material has a permittivity that rapidly changes when a temperature exceeds a threshold (e.g., 100° C., 373 K). This threshold may be the Curie temperature of the dielectric material. In an implementation, the heat-sensitive material includes Barium Titanate ($BaTiO_3$) or similar chemical compounds with a low Curie point (e.g., near 100° C., 373 K).

In yet another aspect, the heat-sensitive material may change its magnetic permeability as a function of temperature. An example of such material is a ferrite powder plastic composite that has a permeability that rapidly changes when a temperature exceeds a threshold. This threshold may be the Curie temperature of the ferrite material. In an implementation, the ferrite material is a chemical composition of manganese-zinc (MnZn) and at least one of an iron-oxide ($Fe_2O_3$) or zinc-oxide (ZnO) exhibiting a relatively low Curie point (e.g., near 100° C., 373 K) that can be controlled by its oxide content.

In an aspect of IFS, use of a material with a heat-sensitive permeability may increase the system intrinsic magnetic biasing effect as previously discussed in connection with FIG. 4. Therefore, in some implementations, the heat-sensitive material is also configured to reduce a material intrinsic magnetic biasing effect. In other implementations, the heat-sensitive material is also configured to reduce an overall intrinsic magnetic biasing effect caused by the heat-sensitive material, (e.g., together with the ferrite structure 204). In some implementations, the intrinsic magnetic biasing effect is controlled by one of a grain size of the ferrite powder, a mixing ratio of different grain sizes, and the chemical composition of the ferrite powder.

In yet a further aspect, the heat-sensitive material may change another physical (non-electrical) property as a function of temperature, such as by changing shape. This deformation may cause a metallic object to move slightly, making it detectable, using IMS as described above, by a change in a measured electrical characteristic (e.g., impedance) of an inductive sense element.

Further, certain aspects combine inductive sensing with heat sensing to detect metallic objects (e.g., object 110) using a sensing system that combines a plurality of sense elements with a mediating heat-sensitive material, wherein each sense element comprises an electrically conductive structure. At least a portion of the plurality of sense elements is configured as an inductive sense element with an electrical characteristic that changes in the presence of a metallic object based on an inductive effect. The mediating heat-sensitive material has a property that varies as a function of a temperature as described above when heated by a metallic object that is resting on the top surface of the enclosure (e.g., enclosure 310 of FIG. 3) and that is exposed to the alternating magnetic field generated by the WPT structure. Further, the mediating heat-sensitive material changes an electrical characteristic of at least a portion of the plurality of sense elements as the property changes and thereby mediates sensing of the object based on a thermal effect. The electrical characteristic of each of the sense elements may be periodically measured by the measurement circuit 104 in a time multiplexing fashion as discussed in connection with FIG. 4. Measurement outputs of the measurement circuit 104 are evaluated and monitored by the control and evaluation circuit 102 configured to make a decision if the change in the measured electrical characteristic of the sense elements indicates the presence of a metallic object. Although certain aspects are described herein with respect to detecting foreign objects resting on the top surface of the WPT structure 200, similar techniques may be used for foreign object detection in other implementations.

Moreover, certain aspects combine capacitive sensing with heat sensing to detect metallic objects using a sensing system comprising a plurality of sense elements and a mediating heat-sensitive material, wherein each sense element comprises an electrically conductive structure. At least a portion of the plurality of sense elements is configured as a capacitive sense element and to have an electrical characteristic that changes in the presence of a metallic object based on a capacitive effect. The mediating heat-sensitive material has a property as described above and changes an electrical characteristic of at least a portion of the plurality of sense elements as the property changes, mediating sensing of the object based on a thermal effect. The electrical characteristic of each of the sense elements may be periodically measured by the measurement circuit 104 in a time multiplexing fashion as discussed in connection with FIG. 4. Measurement outputs of the measurement circuit 104 are evaluated and monitored by the control and evaluation circuit 102 configured to take a decision if the change in the measured electrical characteristic of the sense elements indicate the presence of a metallic object, through the capacitive effect, or of an object being heated by the magnetic field, through the thermal effect.

In an aspect of combined inductive and thermal sensing or combined capacitive and thermal sensing using a mediating heat-sensitive material, the detection circuit 100 may employ the ITS scheme as previously discussed for detecting certain metal objects based on a correlation with the level of magnetic field exposure as previously described. ITS based on a mediating heat-sensitive material may be referred to as indirect ITS (ID-ITS) where the object is detected based on a change in a property of the mediating heat-sensitive material rather than a change in a property of the object itself.

In certain aspects herein, the enclosure of a ground-based WPT structure is constructed at least partially from a heat-sensitive material that changes at least one of an electrical or a non-electrical characteristic based on a temperature of the material. This allows inductive or capacitive sensors inside the WPT structure to detect foreign objects based on the thermal effect on the heat-sensitive material of the enclosure.

In an aspect, the enclosure may include at least partially a heat-resistant material able to withstand temperatures that foreign objects may reach before the system detects them, which may be as much as 200° C. (473 K) or more. The heat-resistant material may have a melting point of, for example, above 200° C. (473 K). In another aspect, the heat-resistant material may be flame retardant. In a further aspect, the material may have a high autoignition temperature. For example, the heat-resistant material may include one or more of plastics such as nylon resins (e.g., Minlon® or Zytel® resin from Dupont), perfluoroelastomers (e.g., Kalrez® products from Dupont), polymerized siloxanes (e.g., silicone rubber), glass or carbon-fibre reinforced plastics, structural composites (e.g., PyroSic®, PyroKarb™ composites from Pyromeral Systems), a sintered high temperature polymer (e.g. polyimides (PI) such as TECAS-INT™ from Ensinger), or ceramic matrix composites (CMC) (e.g., glass-ceramics).

In mechanical aspects, the enclosure may include a material that is resistant to mechanical impact, bending, or compressive stress. Such mechanical resistance may protect the WPT structure from physical damage. Additionally, the material may have an elasticity so as not to be brittle, thereby allowing the material to sag or bend under pressure without breaking (e.g., from a vehicle driving over the WPT structure). Further, the material may have a low thermal expansion to avoid bulging or deformation due to heat (e.g., from sun irradiation or a foreign object). Moreover, the material may provide good machinability or may be suitable for injection molding.

In an aspect of mass (weight) and other aspects mentioned herein, the enclosure may include an engineering plastic with a relatively low mass density (specific weight) such as a polyamid, (e.g., Durethan® plastic from LANXESS), a Polybutylene terephthalate (PBT) (e.g., Pocan® plastic from LANXESS), and a fiber-reinforced plastic composite (e.g., Tepex® composites from LANXESS).

In a thermal aspect, the enclosure may include a material having a high thermal conductivity to dissipate heat (e.g., heat produced by a foreign object). The heat conductivity may be substantially higher than that of prevalent plastic materials. Alternatively, the enclosure may include a material with a low thermal conductivity (e.g., silica, carbon-carbon composite, fiberglass, etc.). The enclosure may also include a material resistant to long term ultraviolet (UV) radiation exposure and to chemical substances (e.g., lubricating and diesel oils, gasoline, brake fluid, coolant, solvents, etc.).

In electrical aspects, the enclosure may include a material that is electrically non-conductive such as to not generate substantial eddy currents, and that exhibits low dielectric polarization losses such as to not generate substantial displacement currents, when exposed to the wireless power electromagnetic field. Furthermore, the material may be non-magnetic or only weakly magnetic such as to not substantially impact the wireless power magnetic field or the magnetic field as generated for sensing foreign objects.

In commercial aspects, the enclosure may include a traditional low-cost material that may not provide properties of a heat-sensitive or heat-resistant material as defined above. Such materials may include one or more of polyethylene (PE), acrylonitrile butadiene styrene (ABS), polyoxymethylene (POM), and fiber-reinforced epoxy material.

In another aspect, the enclosure (e.g., enclosure 310) may include a material that combines heat resistance with other electrical, mechanical, chemical, thermal, and radiation exposure properties as previously described. In a further aspect, the enclosure may include a material that combines heat sensitivity with other electrical, mechanical, chemical, thermal, and radiation exposure properties as previously described. The enclosure may combine a material that provides heat sensitivity, heat resistance, or both with any of the other aspects described above.

FIGS. 5A to 5F illustrate examples of respective enclosures 310A to 310F for a WPT structure (e.g., WPT structure 200 of FIG. 3). Each of the enclosures 310A to 310F comprises a cover shell 312 and the back plate 206 of FIG. 2 and may be a preferred construction for a ground surface mounted WPT structure. However, they should not be construed as limited to this application. Certain concepts disclosed in FIGS. 5A to 5F with some adaptions may also be used in a flush mount or ground embedded WPT structure (not shown herein). I As previously described with reference to FIGS. 2 and 3, the enclosures 310A to 310F house the WPT coil 202, the ferrite structure 204, the sense element arrays 107 and 109, and other components. The cover shell 312 is placed over a portion of the WPT structure that faces a vehicle-based WPT structure (e.g., vehicle-based WPT structure 320) for wirelessly transferring power. For example, the cover shell 312 may be positioned on a portion of the WPT structure that faces away from the ground (e.g., that is up from the ground) when the WPT structure is placed on the ground. The back plate 206 is placed below the portion of the WPT structure that faces the vehicle-based WPT for wirelessly transferring power. For example, the back plate 314 may be disposed on a portion of the WPT structure that faces toward the ground when the WPT pad is placed on the ground. The back plate 206 may be metallic (e.g., aluminum), made of plastic, or may be made of the same material as the cover shell 312. The cover shell 312 may have a size and shape to cover the WPT structure. As would be understood, cover shell 312 or back plate 206 may have any suitable size and/or shape.

In some implementations, the interior of an enclosure is potted using a casting resin or any other suitable material to fill air space. In such implementations, the cover shell 312 may no longer be a separable part after the potting process, having merged with other plastic support structures in the interior of the enclosure. In other implementations (e.g., optimized for a special injection molding process), the cover shell 312 may serve as an insulating and protecting material surrounding the electrical components of the WPT structure such as sense element arrays 107 and 109, WPT coil 202, and ferrite structure 204 as illustrated in FIG. 3.

The material used for the cover shell 312 may combine electrical, mechanical, chemical, thermal, and radiation exposure properties as previously described. The cover shell 312 may be resistant to mechanical impact, heat, bending, or compressive stress. Such mechanical strength or heat resistance may protect the WPT structure from physical damage. In addition, the cover shell 312 may have an elasticity so as not to be brittle, thereby allowing the cover shell 312 to sag or bend under pressure without breaking (e.g., from a vehicle driving over the cover shell 312). The thermal conductivity, in some aspects, may also prevent foreign objects from getting excessively hot because a thermally conductive material absorbs and dissipates heat from a hot foreign object. Therefore, use of a thermally conductive material for the cover shell 312 may prevent a local hot spot from developing on the top surface of the cover shell 312 and consequent damage of portions of the WPT structure.

Figures 5A, 5B, 5C, 5D, 5E, 5F:
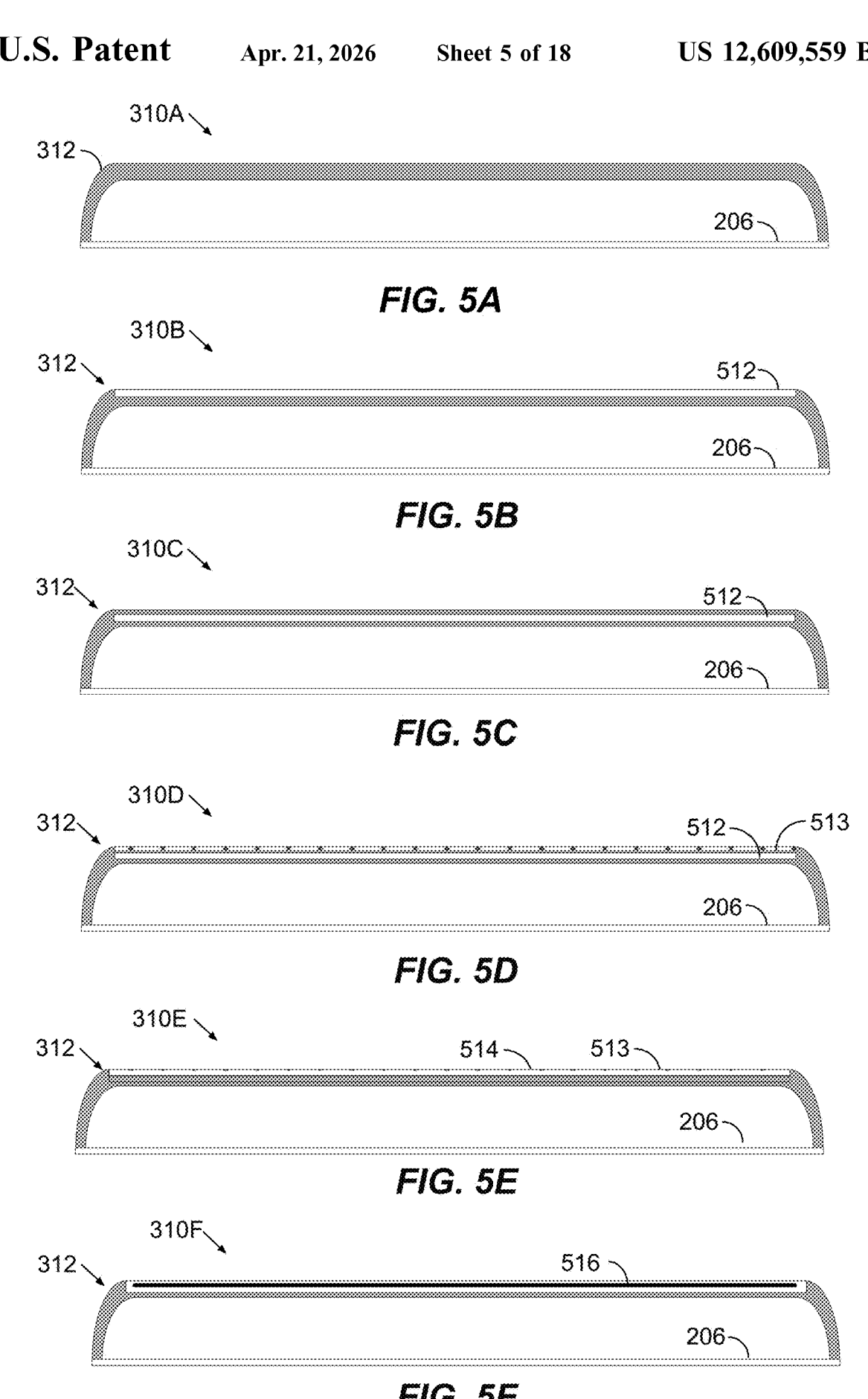
FIGS. 5A to 5F show enclosures for a wireless power transfer structure.

FIG. 5A illustrates an example implementation of an enclosure 310A for a WPT structure. In this implementation, the entire cover shell 312 is made of a heat-sensitive material configured to detect the presence of foreign objects above the top surface of the cover shell 312, as described above, and thus protect the WPT structure. The heat-sensitive material may combine properties such as a pronounced temperature dependent electrical characteristic with one or more of a mechanical, chemical, thermal, and radiation exposure property as described above. In particular, it may combine a pronounced temperature dependent electrical characteristic with heat resistance.

With reference to FIGS. 5B to 5F, the cover shell 312 includes one or more inlays. An inlay may include at least one of a heat-sensitive, heat-resistant, and heat isolating material. In some implementations, an inlay may be a separate part assembled with the cover shell 312 in a manufacturing process. In other implementations, an inlay may be a defined region of the cover shell 312 created by a special and local treatment of a base material (e.g., plastic) of the cover shell. In further implementations, this region is created by locally adding one or more materials with a desired property (e.g., a heat-sensitive ferrite powder) to the base material during formation (e.g., in an injection molding process).

FIG. 5B illustrates another example of an enclosure 310B for a WPT structure, in accordance with an illustrative aspect. In the example of FIG. 5B, the enclosure 310B is similar to the enclosure 310A, except that the cover shell 312 is not entirely formed of the heat-sensitive material. Instead, as shown, the cover shell 312 includes an inlay 512 at the top surface of the cover shell 312. The inlay 512 may be made of a heat-sensitive material (heat-sensitive inlay). The remaining portion of the cover shell may be made of a non-heat-sensitive material. By reducing the amount of heat-sensitive material used for the cover shell 312, the cost of the enclosure 310B may be reduced without compromising FOD performance. The heat-sensitive inlay 512 may cover only a portion of the top surface of the cover shell 312, or it may cover the entire top surface, as shown. The material used for the heat-sensitive inlay 512 may combine properties such as pronounced temperature dependent electrical characteristics with one or more of a mechanical, chemical, thermal, and radiation exposure property as previously described. In particular, it may combine a pronounced temperature dependent electrical characteristic with heat resistance.

FIG. 5C illustrates a further example of an enclosure 310C. The enclosure 310C is similar to the enclosure 310B, in that it includes the heat-sensitive inlay 512, although the heat-sensitive inlay 512 is embedded in the cover shell 312 instead of being at the top surface of the cover shell 312.

FIG. 5D illustrates yet another example of an enclosure 310D for a WPT structure. The enclosure 310D is similar to the enclosures 310B and 310C, in that it includes the heat-sensitive inlay 512, but the cover shell 312 further includes a heat-resistant inlay 513. As illustrated in FIG. 5D, the heat-resistant inlay 513 is at the top surface of the cover shell 312, while the heat-sensitive inlay 512 is disposed beneath the heat-resistant inlay 513. In some implementations, the heat-sensitive inlay 512 and the heat-resistant inlay 513 may be adjacent (in physical contact), as shown in FIG. 5D. The material used for the heat-resistant inlay 513 may combine properties such as heat resistance with one or more of a mechanical, chemical, thermal, and radiation exposure property as previously described.

The heat-resistant inlay 513 may include multiple layers, such as a first layer including a first material (e.g., a plastic) with some heat resistance (e.g., greater than 200° C., 473 K) and a high ignition temperature (e.g., greater than 600° C., 873 K), and a second layer including a highly heat-resistant mesh structure or tissue of a second material, which maintains its structure at high temperature (e.g., greater than 600° C. (873 K)). The inclusion of such multiple layers prevents an object from sinking into the cover shell 312 if the first material starts melting. The second material may be glass or carbon.

In another example, the heat-resistant inlay 513 is made of a compound including the first and second material that prevents an object from sinking into the cover shell 312 if the first material starts melting. In a further example, the heat-sensitive inlay 513 is omitted, and the entire remaining portion of the cover shell 312 is made of the heat-sensitive material. In yet another example, the heat-resistant inlay 513 is omitted, and the entire remaining portion of the cover shell 312 is made of the heat-resistant material.

In the example of FIG. 5E, an enclosure 310E is similar to the enclosure 310D, in that it includes a heat-resistant inlay 513 at the top surface as shown, but the cover shell 312 further includes a thermal insulation layer in form of a heat-insulating inlay 514. The heat-insulating inlay 514 may be made of a material with a low thermal conductivity as previously described. The heat-insulating inlay 514 may protect the wireless transfer structure from heat (e.g., generated by a foreign object) and consequent damage. For example, although the heat-resistant inlay 513 may prevent a hot object from physically contacting exposed components of the WPT structure housed in the enclosure 310E, in some aspects, heat may still pass through the heat-resistant inlay 513 to those components of the WPT structure causing damage. Accordingly, the heat-insulating inlay 514 may prevent or mitigate heat generated by the foreign object from reaching exposed components in the interior of the enclosure 310E of the WPT structure. As illustrated in FIG. 5E, the heat-insulating inlay 514 may be disposed adjacent to (e.g., below) the heat-resistant inlay 513.

In another example, the heat-resistant inlay 513 is omitted and the entire remaining portion of the cover shell 312 is made of heat-resistant material with the heat-insulating inlay 514 embedded in the cover shell 312.

Using a heat-resistant inlay 513 in combination with a heat-insulating inlay 514 may sufficiently protect the cover shell 312 from damage caused by a hot object resting on its top surface for extended periods (e.g., several hours), and thus thermal sensing (e.g., using a heat-sensitive material) may not be required.

In the example of FIG. 5F, an enclosure 310F is similar to any of the enclosures 310A to 310E, and may include heat-sensitive, heat-resistant, or heat-insulating inlays (not shown). The cover shell 312 further includes an arrangement 516 of one or more sense elements configured for detecting foreign objects. In some implementations, the arrangement 516 includes at least one sense element array such as one or both of the sense element arrays 107 and 109 of FIG. 1. The arrangement 516 may be electrically coupled to the measurement circuit or some circuit configured to detect foreign objects near the cover shell 312, such as by detecting changes of an electrical characteristics of the one or more sense elements.

FIGS. 6A to 6D are schematic diagrams illustrating an example implementation of a sensing system 600A to 600D, respectively, each configured for combined inductive and thermal sensing. Each of the example sensing systems 600A to 600D includes a sense element 610 and a planar heat-sensitive structure 602 (e.g., a sheet) made of a mediating heat-sensitive material and disposed in contact or close proximity to the sense element 610. For purposes of illustration, FIGS. 6A to 6D only show a single sense element 610 and a cutout of the heat-sensitive structure 602. In some implementations, the sense element 610 or a portion thereof corresponds to an inductive sense element (e.g., one of inductive sense elements 107a to 107n) with reference to FIG. 1 and the heat-sensitive structure 602 may correspond to the cover shell 312 or inlay 512 with reference to FIGS. 5A to 5D. Each sense element 610 includes an electrically conductive planar structure consisting of a pair of sense coils 611 and 612 providing terminals 1a, 1b, and 2a, 2b, respectively, to interface to the additional elements of a sense circuit (e.g., one of the sense circuits 106a to 106n) as previously discussed in connection with FIG. 1. In some conceptions or implementations, terminals 1a, 1b, and 2a, 2b define the reference plane to which electrical characteristics of a sense element 610 refer (e.g., impedance Z as indicated in FIG. 7A at terminals a, b). However, in other conceptions or implementations, an electrical characteristic includes the entirety of the sense circuit and is measured by the measurement circuit e.g., as impedance $Z_s$ at the terminals of the sense circuit as indicated in FIG. 7A. FIGS. 6A to 6D also show at the top right a cross-sectional view (a vertical cut with respect to the drawing plane) of a small portion of the planar heat-sensitive structure 602 and a cross-section of one section of the coils 611 and 612.

Figure 6A:
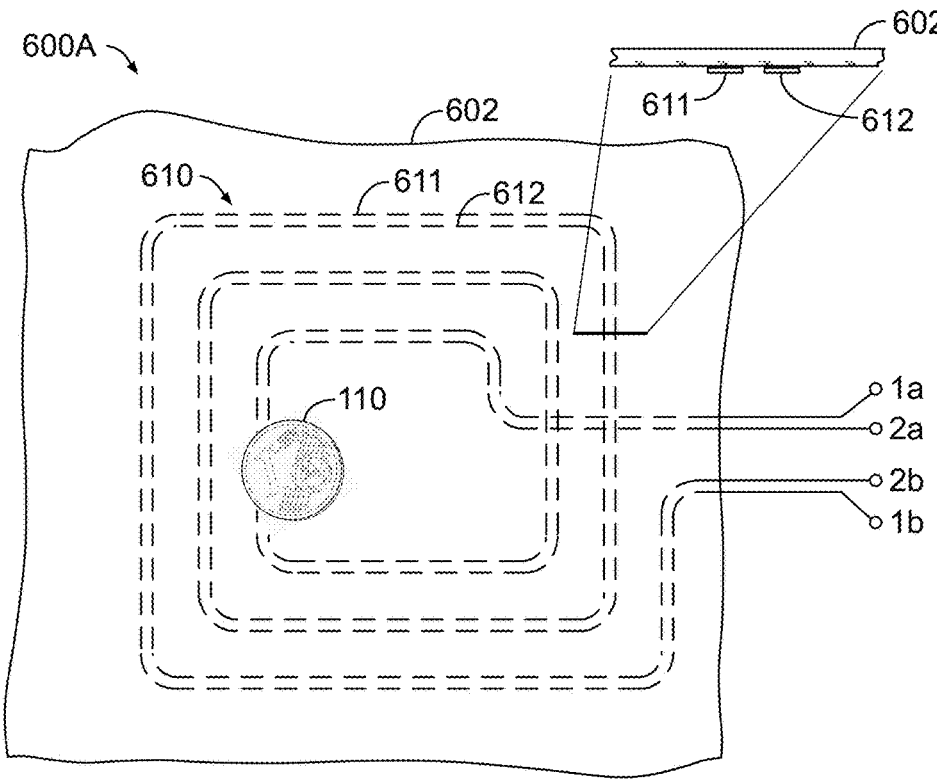
FIGS. 6A to 6D illustrate examples of a combined inductive and thermal sensing system, in accordance with an illustrative aspect.
Figure 6B:
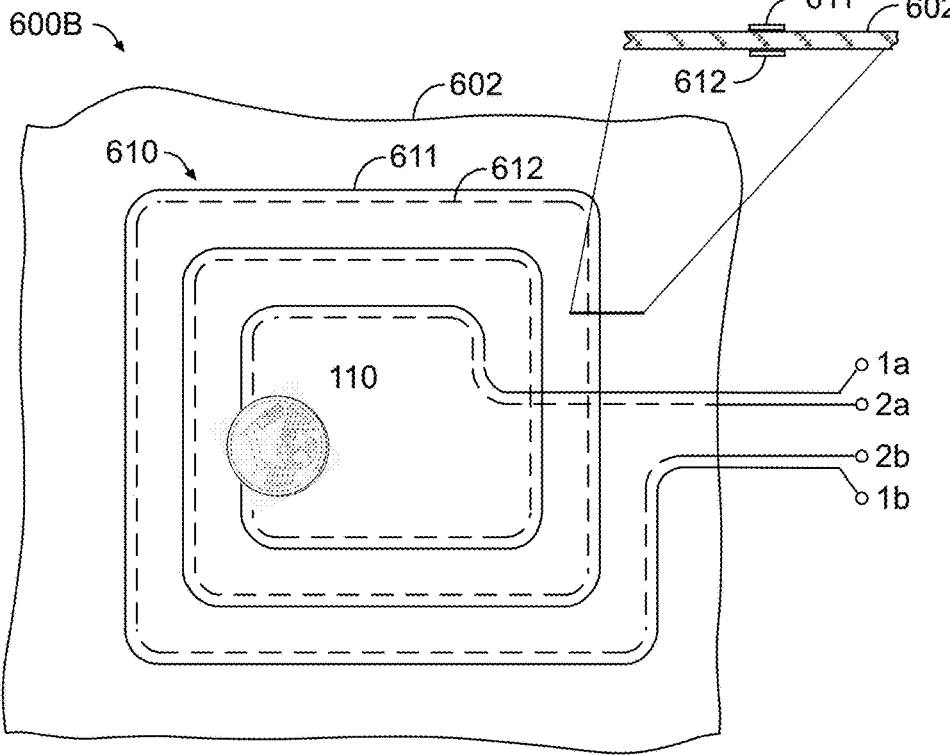
Figure 6C:
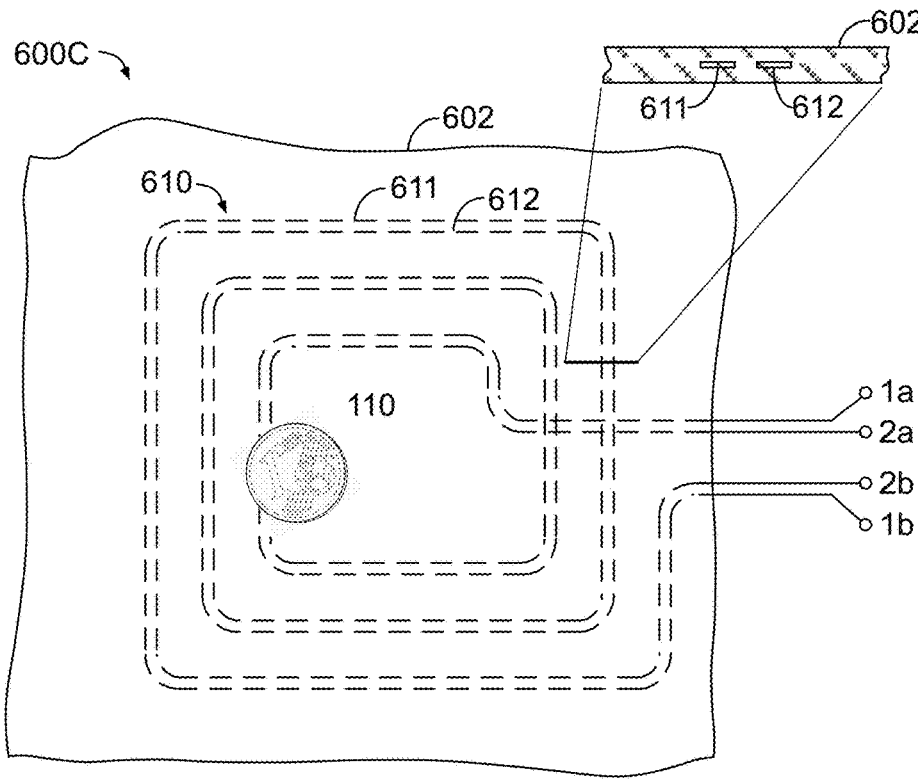
Figure 6D:
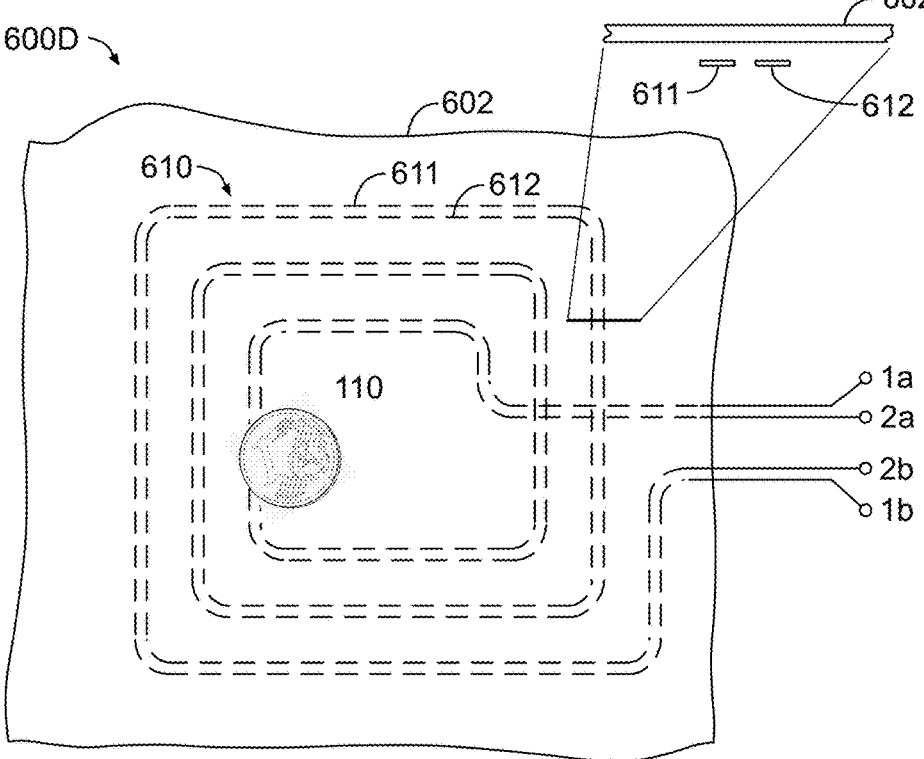
Figure 7A:
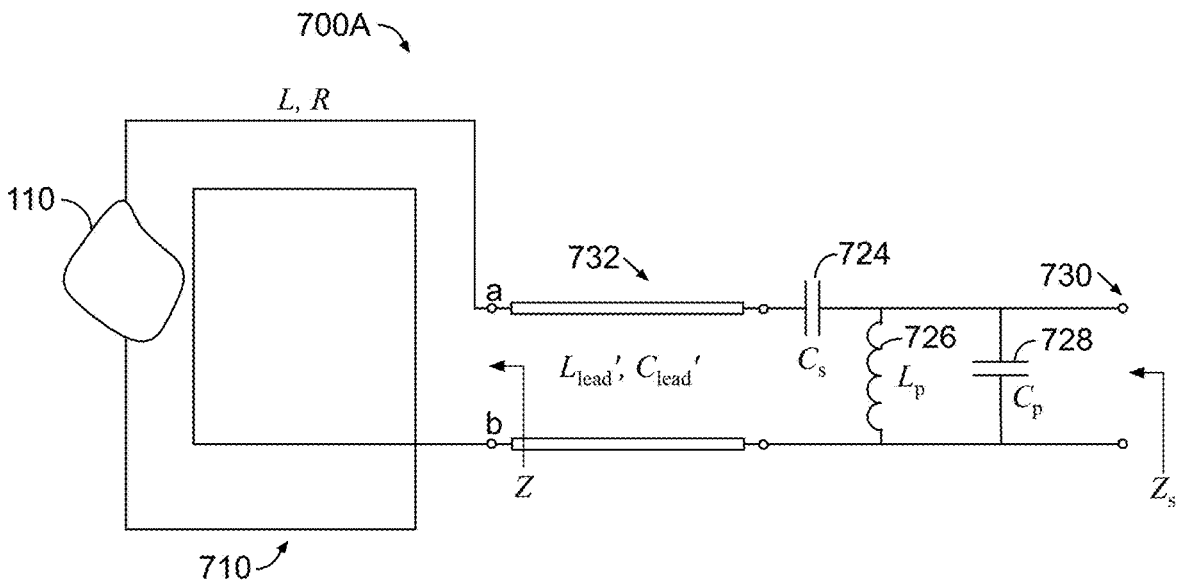
FIGS. 7A and 7B show a schematic diagram illustrating example implementations of an inductive sense circuit.

FIG. 6A illustrates an example implementation of a sensing system 600A, where both sense coils 611 and 612 are disposed at the bottom surface of the heat-sensitive structure 602 and galvanically contacted to the heat-sensitive structure 602. The galvanic contact may extend over the full conductor length of the coil windings. FIG. 6B illustrates an example implementation of a sensing system 600B, where sense coils 611 and 612 are disposed opposite each other on different sides of the heat-sensitive structure 602 and galvanically contacted to the heat-sensitive structure 602. FIG. 6C illustrates an example implementation of a sensing system 600C, where sense coils 611 and 612 are embedded in the heat-sensitive structure 602 and galvanically contacted to the heat-sensitive structure 602. In yet another aspect, FIG. 6D illustrates an example implementation of a sensing system 600D, where sense coils 611 and 612 are disposed beneath the heat-sensitive structure 602 but physically separated (galvanically isolated) from the heat-sensitive structure 602.

In a general example with reference to FIGS. 6A to 6D, multiple electrical characteristics can be defined and measured between the terminals of the sense element 610 as known from a 4-pole network. More specifically, a one-port self-electrical characteristic between terminals 1a and 1b and between terminals 2a and 2b can be defined for sense coils 611 and 612, respectively. Further, a one-port mutual electrical characteristic can be defined between the various pairs of terminals 1a and 2a, 1b and 2b, 1a and 2b, and 1b and 2a. Moreover, a two-port mutual electrical characteristic may be defined between terminals 1a, 1b and terminals 2a, 2b.

In some implementations, the measured fundamental electrical characteristic is one or more of an impedance as measured at an operating frequency (e.g., the sense frequency) of the detection circuit 100, a resistance as measured at DC, an impulse response in a current as measured when applying a voltage pulse, and a current or voltage response of another voltage or current waveform, respectively. These fundamental characteristics may principally apply to both self and mutual electrical characteristics.

A change in one or more of the measured electrical characteristics (e.g., a self-impedance, a mutual impedance) may be indicative of an object. The change may be defined as a difference to a reference value as determined in absence of any object and may be used to determine the presence of a foreign object. More specifically, a change in one or more of the measured electrical characteristics may be produced by the presence of an object based on one or more of an inductive effect and a thermal effect. In particular, a metal object in thermal contact with the heat-sensitive structure 602 and inductively heated by a strong alternating magnetic field (e.g., as generated by the WPT structure 200) may cause a property of the heat-sensitive structure 602 to change. This change may in turn cause a change in one or more of the measured electrical characteristics of the sense element 610 disposed adjacent or proximate to the heat-sensitive structure 602 acting as a mediating material.

In an example implementation referring to FIGS. 6A to 6C, the heat-sensitive structure 602 is configured to have a DC resistance (e.g., a sheet DC resistance in SI/square) that varies as a function of temperature (examples described above). In this implementation, a local change of the DC resistance caused by a heating object also is expected to cause a change in a DC resistance as measured (e.g., between terminal 1a and 2a) based on the thermal effect. On the other hand, a metal object (e.g., object 110) proximate to the sense element 610 may cause a change in the self-impedances and mutual impedances as measured between terminals 1a, 1b, 2a, and 2b due to the inductive effect. However, an increase of the DC resistance of the heat-sensitive structure 602 may also be apparent in a change in the self- and mutual impedances as measured at the sense frequency (e.g., high frequency) between terminals 1a, 1b, 2a, and 2b of the sense element 610.

In another example implementation referring to FIGS. 6A to 6C, the heat-sensitive structure 602 is substantially an electrical insulator configured to have a DC conductivity (e.g., a sheet DC conductivity in Siemens/m/square) that substantially increases as a temperature exceeds a threshold (examples described above). In this implementation, a local increase of the conductivity caused by a heating object also is expected to cause a decrease of a DC insulation resistance as measured (e.g., between terminal 1$a$ and 2$a$) based on the thermal effect. However, an increase of the DC conductivity of the heat-sensitive structure 602 may also be apparent in a change in the self- and mutual impedances as measured at the sense frequency (e.g., high frequency) between terminals 1$a$, 1$b$, 2$a$, and 2$b$ of the sense element 610.

In a further example implementation referring to any of FIGS. 6A to 6D, the heat-sensitive structure 602 is configured to have an impedance (e.g., a sheet impedance or surface impedance in SI/square) with real (resistive) and imaginary (reactive) parts that varies as a function of temperature. This may be a material that varies a sheet inductance or a sheet capacitance (e.g., due to a magnetic permeability or an electrical permittivity that varies as a function of temperature (examples described above)). In this implementation, a local change of the sheet impedance caused by a heating object may also cause a change in an impedance as measured between any pairs of terminals 1$a$, 2$a$, 1$b$, and 2$b$ based on the thermal effect and in addition to the inductive effect.

It may be appreciated that a change in an impedance based on both the thermal and inductive effects would be expected in the implementation of FIG. 6D using a heat-sensitive structure 602 that is not galvanically contacted with the sense element 610. This may be true for a heat-sensitive material configured to vary any of a sheet resistance or sheet impedance as a function of temperature.

In yet another example implementation referring to FIGS. 6A to 6D, the sense element 610 comprises only one sense coil (e.g., sense coil 611) and an impedance is measured between terminals 1$a$ and 1$b$ for determining the presence of an object (e.g., object 110) based on one or more of an inductive and a thermal effect.

In an example implementation of a sensing system based on one or more of a capacitive and a thermal effect (not shown), the sense element 610 is replaced by a capacitive sense element (e.g., one of capacitive sense elements 109$a$ to 109$n$) comprising two electrodes each providing a terminal and an impedance is measured between the terminal of the first electrode and the terminal of the second electrode for determining the presence of an object based on one or more of an inductive and a thermal effect.

The implementations as illustrated in FIGS. 6A to 6D should be construed as exemplary and non-limiting. They do not represent the only implementations of a combined inductive and heat sensing FOD. For example, the heat-sensitive structure 602 may be omitted. Instead, the electrically conductive structure of the sense element 610 may include the heat-sensitive material (e.g., heat-sensitive electrical conductor). The heat-sensitive electrical conductor may be configured to substantially increase its resistance if the temperature rises above a threshold (e.g., 100° C., 373 K) as previously discussed. The sense elements 610 may be embedded in the cover shell 312 of FIG. 3 (e.g., a few millimeters below its top surface) to minimize thermal resistance of heat flow from the object to the sense element 610.

As described above with reference to FIG. 4, the sensing system may be coupled to a controller (e.g., one comprising the measurement circuit 104 and the control and evaluation circuit 102 of FIG. 4). The controller may be configured to measure an electrical characteristic of the sense element and to control the WPT of the WPT system (e.g., via control output indicated in FIG. 4). For example, in certain aspects, if a change in the measured electrical characteristic satisfies a threshold or another defined criterion indicative of the presence of a foreign object by either the inductive or thermal effect mediated by the mediating heat-sensitive structure, the controller determines a foreign object is present and takes appropriate action.

In some aspects, once the presence of a foreign object is detected by either the inductive or thermal effect as described above, the controller or the WPT system may take one or more actions. For instance, the system may go into a low power mode, reduce power, turn off, or issue alerts prompting a user to remove the object.

Further, in some aspects, the detection of a foreign object (e.g., object 110) based on the thermal effect may be made more reliable by correlating the change in a measured characteristics of a sense element, as described above for the ITS scheme in connection with FIG. 4, with a level of the alternating magnetic field as generated by one or more of the ground-based and vehicle-based WPT structures (e.g., 200 and 320 of FIG. 3).

In some other aspects, the detection of a foreign object may be made more reliable by correlating a change in a measured electrical characteristics of a sense element 610 with an output of another foreign object detector e.g., based on microwave radar sensing, infrared sensing, visual light sensing (e.g. using a vehicle underbody mounted camera or a ground-based camera, etc.).

Sense Circuits

Figure 7B:
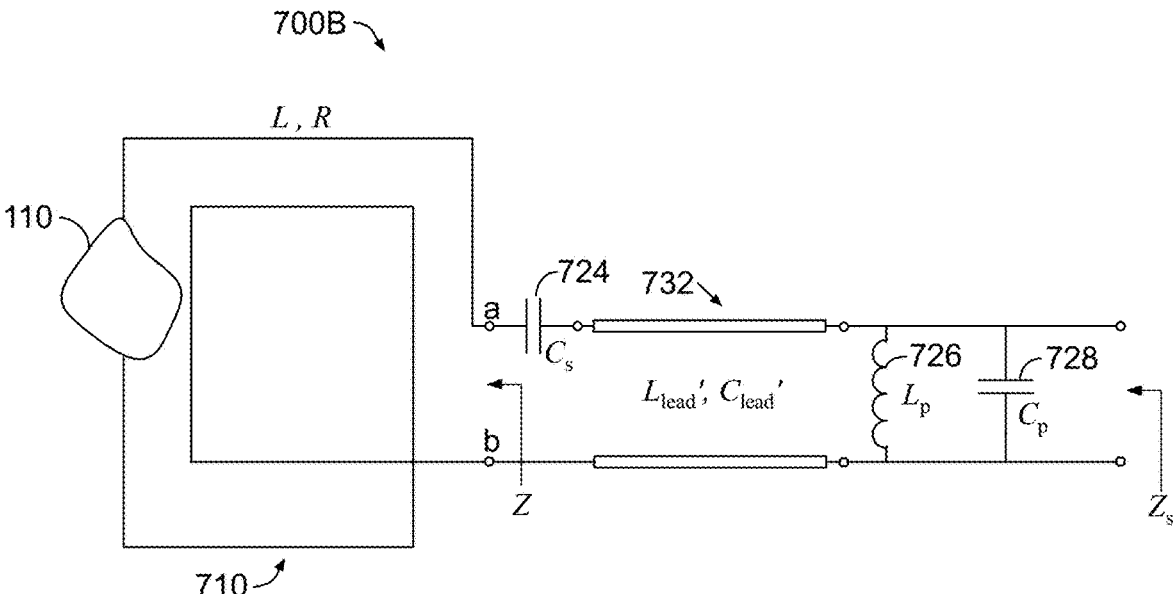

FIGS. 7A and 7B show schematic diagrams illustrating an example implementation of sense circuits 700A and 700B, respectively. Sense circuits 700A or 700B may correspond to one or more of inductive sense circuit 106$a$ to 106$n$ constituting a portion of the detection circuit 100 in FIG. 1.

The sense circuit 700A of FIG. 7A includes a sense element 710 (e.g., a sense coil) having an inductance L and an equivalent series resistance R, and presenting an impedance Z at terminals a and b. It also includes a lead line 732 characterized by an inductance per unit length $L_{lead}'$ and a capacitance per unit length $C_{lead}'$ electrically connected to the sense element 710 at the terminals a and b, and it includes a series capacitor 724 having a capacitance $C_s$ electrically connected in series to the lead line 732. The sense circuit 700A also includes a parallel (shunt) inductor 726 having an inductance $L_p$ and a parallel (shunt) capacitor 728 having a capacitance $C_p$ both electrically connected to the capacitor 724 and in parallel to a measurement port 730 configured to measure an impedance $Z_s$ of the sense circuit 700A. FIG. 7A also illustrates the object 110 (e.g., metallic object) from FIG. 1 in proximity to the sense element 710.

The sense circuit 700B of FIG. 7B includes the same elements as the sense circuit 700A of FIG. 7A, except that the order of the series capacitor 724 and the lead line 732 is interchanged. FIG. 7B shows the capacitor 724 directly connected to the sense element 710.

In either example, the series capacitor 724 may be configured to provide a local minimum in the magnitude of the impedance $|Z_s|$ substantially at a nominal sense frequency in absence of a foreign object corresponding to a series resonance at the nominal sense frequency. The parallel inductor 726 and parallel capacitor 728 may be configured to provide an attenuation of a noise component coupled into the sense element 710 at frequencies substantially lower and substantially higher than the nominal sense frequency. In some implementations or operations, the noise may be switching noise from the WPT system coupled into the sense element 710 via electromagnetic coupling between the WPT coil (e.g., WPT coil 202) and the sense element 710.

In some implementations of the detection circuit 100, the sense element 710 is physically separated from the rest of the sense circuit 700A including the conditioning elements such as the series capacitor 724, parallel inductor 726, and parallel capacitor 728. The lead line 732 electrically connects the sense element 710 to the rest of the sense circuit 700A. In these implementations, the sense element 710 and a large portion of the lead line 732 may be part of the inductive sense element array 107 that is implemented on a first carrier (e.g., a printed circuit board, PCB). The rest of the sense circuit 700A may be populated on a second carrier (e.g., a PCB) different from the first carrier.

In PCB implementations, the capacitance per unit length $C_{lead}{}'$ of the lead line 732 may substantially vary as a function of a PCB temperature due to a thermal coefficient of the PCB carrier material (e.g., FR4). Variations of $C_{lead}{}'$ may cause substantial thermal drift in the impedance $Z_s$ as measured at the measurement port 730. This thermal drift may negatively impact detection of foreign objects based on a thermal effect such as ITS described with reference to FIG. 4 or ID-ITS described in connection with FIGS. 6A to 6D. It can be shown by circuit analysis that thermal drift can potentially be reduced by swapping the order of the lead line 732 and the series capacitor 724 as illustrated by the sense circuit 700B of FIG. 7B. Moreover, circuit analysis predicts a potential improvement of detection sensitivity for the sense circuit 700B of FIG. 7B, depending on the characteristics of the lead line 732. Therefore, in some implementations (e.g., PCB implementations), at least the series capacitors 724 are populated close to the terminal a or b of the respective sense element, thus forming an integral part of the inductive sense element array.

Figure 8A:
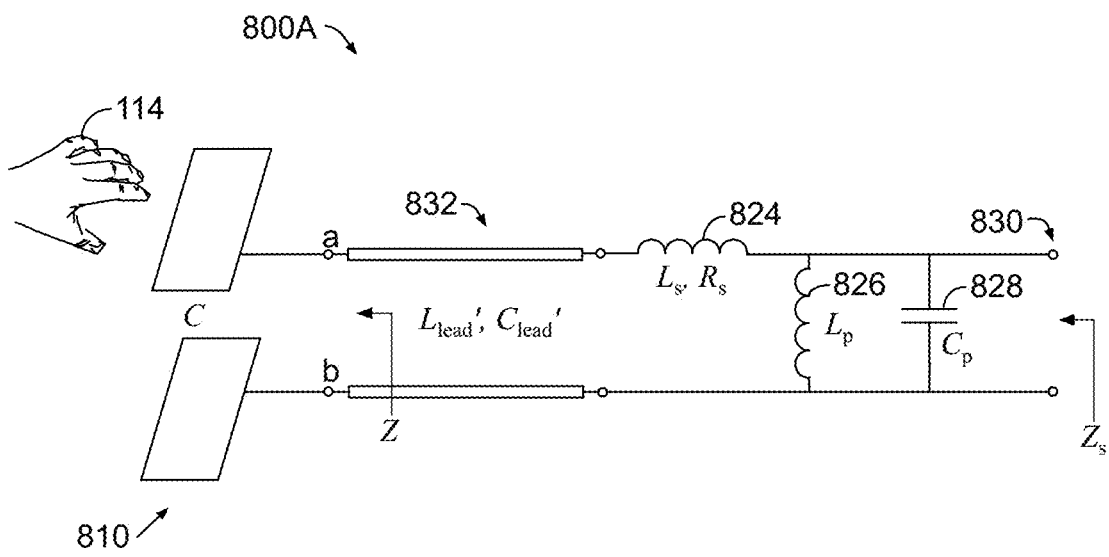
FIGS. 8A and 8B show a schematic diagram illustrating example implementations of a capacitive sense circuit.
Figure 8B:
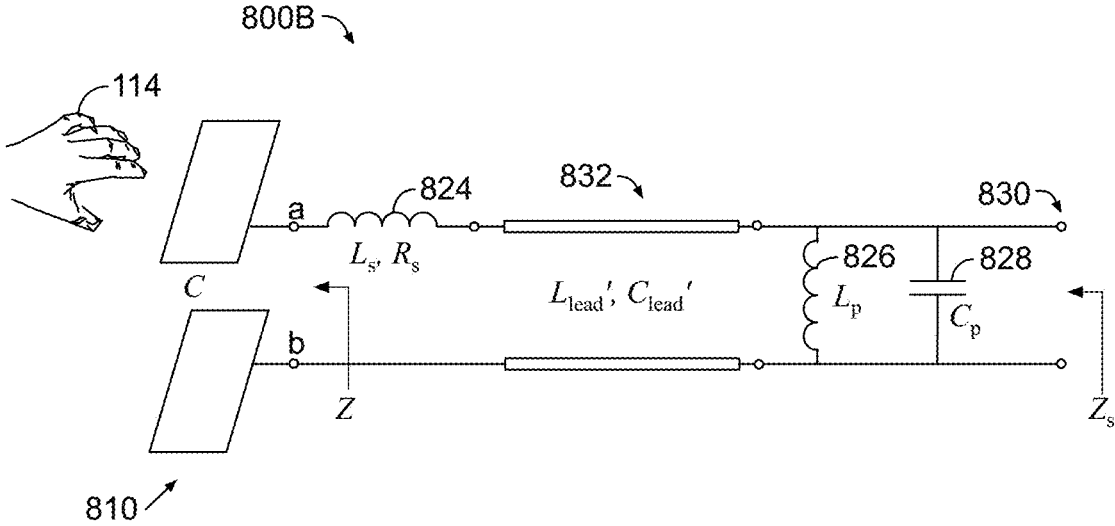

FIGS. 8A and 8B show schematic diagrams illustrating an example implementation of sense circuits 800A and 800B, respectively. Sense circuit 800A or 800B may correspond to, for example, one of capacitive sense circuits 108a to 108n constituting a portion of the detection circuit 100 of FIG. 1.

The sense circuit 800A of FIG. 8A includes a sense element 810 (e.g., a sense electrode) having a capacitance C and presenting an impedance Z at terminals a and b. It also includes a lead line 832 characterized by an inductance per unit length $L_{lead}{}'$ and a capacitance per unit length $C_{lead}{}'$ electrically connected to the sense element 810 at the terminals a and b, a series inductor 824 having an inductance $L_s$, and an equivalent series resistance $R_s$ electrically connected in series to the lead line 832. The sense circuit 800A also includes a parallel (shunt) inductor 826 having an inductance $L_p$ and a parallel (shunt) capacitor 828 having a capacitance $C_p$, both electrically connected to the inductor 824 and in parallel to a measurement port 830 configured to measure an impedance $Z_s$ of the sense circuit 800A as indicated in FIG. 8A. FIG. 8A also illustrates the object 114 (human hand) with reference to FIG. 1 in proximity to the sense element 810.

The sense circuit 800B of FIG. 8B includes the same elements as the sense circuit 800A of FIG. 8A, except that the order of the series inductor 824 and the lead line 832 is interchanged. FIG. 8B shows the inductor 824 directly connected to the sense element 810.

The series inductor 824 may be configured to provide a local minimum in the magnitude of the impedance $|Z_s|$ substantially at a nominal sense frequency in absence of a foreign object corresponding to a series resonance at the nominal sense frequency. The parallel inductor 826 and parallel capacitor 828 may be configured to provide an attenuation of a noise component coupled into the sense element 810 at frequencies substantially lower and substantially higher than the nominal sense frequency. In some implementations or operations, the noise may be switching noise from the WPT system coupled into the sense element 810 via electromagnetic coupling between the WPT coil (e.g., WPT coil 202) and the sense element 810.

In some implementations of the detection circuit 100, the sense element 810 is physically separated from the rest of the sense circuit 800A, including conditioning elements such as the series inductor 824, parallel inductor 826, and parallel capacitor 828, with the lead line 832 configured to electrically connect the sense element 810 to the rest of the sense circuit 800A. In these implementations, the sense element 810 and a large portion of the lead line 832 may be part of the capacitive sense element array that is implemented on a first carrier, while the rest of the sense circuit 800A may be populated on a second carrier different from the first carrier.

In implementations requiring a relatively long lead line 832, a parallel capacitance of the lead line 832 (e.g., length× $C_{lead}{}'$) may constitute a substantial percentage of the overall capacitance of the sense element 810 and lead line 832, potentially resulting in a loss of detection sensitivity. As in the circuit 700B of FIG. 7B and depending on the characteristics of the lead line 832, detection sensitivity may considerably increase by swapping the order of the lead line 832 and inductor 824 as illustrated by the sense circuit 800B of FIG. 8B. Therefore, in some implementations, at least the series inductors 824 are populated close to the terminals a or b of the respective sense element 810, thus forming an integral part of the capacitive sense element array.

An inductive sense element consisting of a multi-turn loop (e.g., as illustrated in FIG. 1) may also exhibit a capacitive sensing effect due to the interaction of an object with the electric field, as previously discussed in connection with FIG. 1. This innate capacitive sensitivity of an inductive sense element is also referred to as parasitic capacitive sensitivity. In particular, water having a high relative permittivity ($\varepsilon_r \approx 80$) may cause substantial changes in an electrical characteristic (e.g., impedance) of an inductive sense element when dripping onto or flowing on the top surface of the enclosure 310 of the structure 200 with reference to FIG. 3. Practical experience has shown such water events as a potential source of false detections (false positive detections). Methods and processes for discriminating water events and thus reducing a probability of false detection are provided in U.S. patent application Ser. No. 17/931,429, filed Sep. 12, 2022, and incorporated here by reference in its entirety. These methods and processes use the angle of an impedance change and other features characteristic of water movements.

Hybrid Sensing

In the presence of parasitic capacitive sensitivity, liquid objects that are predominantly dielectric but also weakly conductive (e.g., water containing free ions) generally cause an impedance change in a first quadrant of a complex impedance plane defined by a positive real (Re) and positive imaginary (Im) part. It can be observed that the magnitude and angle of the impedance change generally depend on the size, shape, and ion concentration of the liquid. Tap water with an ion concentration equivalent to a 0.02% sodium chloride (NaCl) solution may produce an impedance change with an angle in a range between 88° and 30°. Such water phenomena are described and discussed in detail in U.S. patent application Ser. No. 17/077,124 in the context of capacitive LOD. On the other hand, the angle of the impedance change caused by a ferromagnetic metal object of a certain category may also be found in the first quadrant but typically in a range below 45°. This category includes steel paper clips, nails, pins, and steel wire pieces characterized by an easy magnetic polarization (related to their form factor). Such an overlap of the angle ranges of water and metal objects may be the cause of false detections in an implementation relying on the impedance angle for object discrimination.

In another aspect, rain, splash water, and water dripping or flowing from the vehicle's underbody onto the top surface (e.g., top surface of enclosure 310) generally create water bodies with a temporally varying volume and shape, causing peculiar impedance transients with a magnitude and angle varying over time. These transients may be described in the complex impedance plane by a locus curve that substantially differs from a straight line as typically observed when dropping a metal object onto the top surface. Such dynamic or transient effects of water are caused by various mechanical forces co-acting when water impacts on the top surface. These forces may include gravitational, impact, cohesion, and adhesion forces. Cohesion and adhesion relate to properties of the water (e.g., detergent content) and the texture of the top surface (e.g., hydrophobic or hydrophilic).

In certain implementations and cases, a water object can be hard to differentiate from a metal object based on either the static or the dynamic characteristics of an impedance change, thus potentially causing a false detection. This may be particularly true if the top surface is hydrophilic or the water contains a detergent (e.g., soap) and the detection circuit employs a time-differential detection (TDD) scheme as previously described. Deformation of a water object (e.g., when water objects merge or drain off the top surface) may produce an output at a time-differential detector resembling that of a metal object.

In a further aspect, presence of standing water on the top surface (e.g., a puddle) may alter the static and dynamic characteristics of the impedance change of metal objects of a certain category that fall into the puddle. This category may include small and lightweight ferromagnetic metal objects (e.g., a paper clip). This angle alteration may be the cause of misdetections (false negative detections) of certain metal objects in implementations employing object discrimination based on certain static and dynamic characteristics of the impedance change.

In yet another aspect, presence of parasitic capacitive sensitivity may also increase the impedance angle of certain metal objects with respect to an ideal inductive sensor. This effect may be mainly observed at locations where the ratio of inductive to capacitive sensitivity is low (e.g., between two or more adjacent sense coils). In certain implementations and locations, the angle of the impedance change caused by a ferromagnetic metal object (e.g., paper clip) may be found, for example, at 50° instead of 30° as measured using an ideal inductive sensor. This angle increase may be another cause for misdetections in implementations employing object discrimination based on certain static and dynamic characteristics of the impedance change.

Therefore, in some implementations, it may be desirable to reduce an innate parasitic capacitive sensitivity of an inductive sense element to discriminate water and detect metal objects more reliably.

In some implementations, FOD is operated at a frequency that is as low as possible to reduce the parasitic capacitive sensitivity of an inductive sense element. It can be shown (e.g., by circuit analysis) that the parasitic capacitive sensitivity reduces proportionally to the operating frequency while an innate inductive sensitivity of the inductive sense element stays about the same. On the other hand, a spectral density level of noise (e.g., switching noise) as typically generated by a WPT system and electromagnetically coupled into the inductive sense elements may increase more than inverse proportionally as the FOD operating frequency approaches the WPT operating frequency (e.g., 85 kHz). Therefore, in some implementations, the FOD operating (sense) frequency represents a trade-off between the SNR and the innate inductive-to-capacitive sensitivity ratio.

Figure 9A:
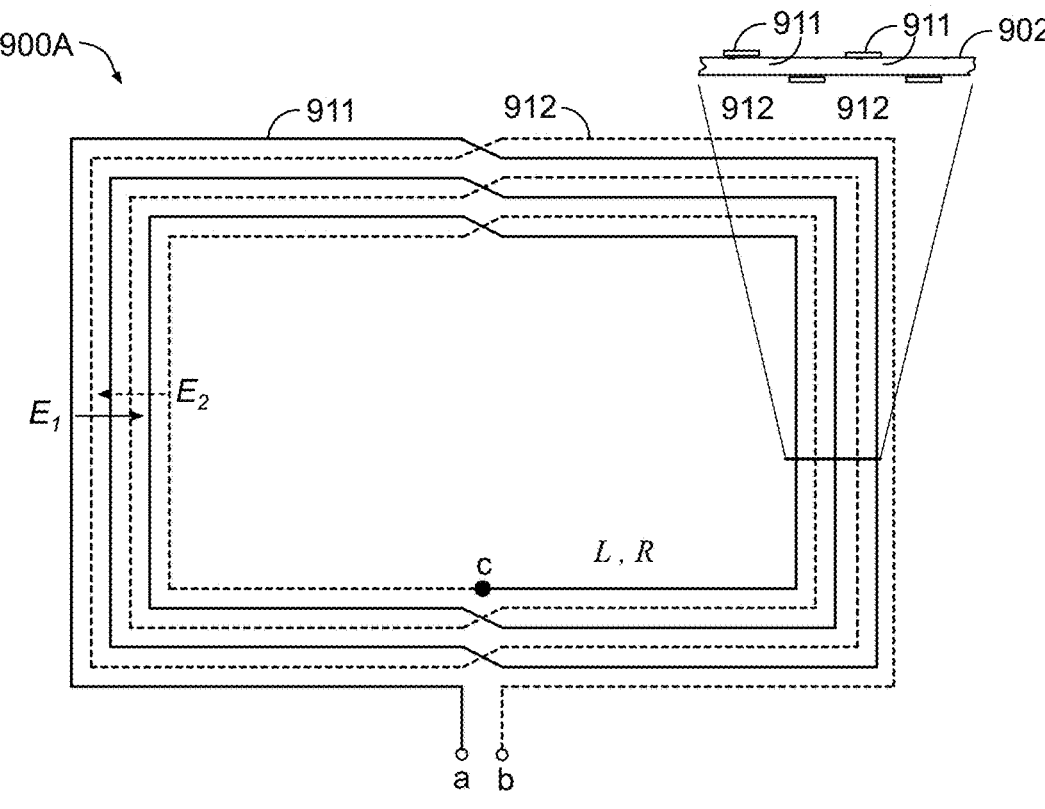
FIGS. 9A to 9C illustrate example implementations of a sense coil.
Figure 9B:
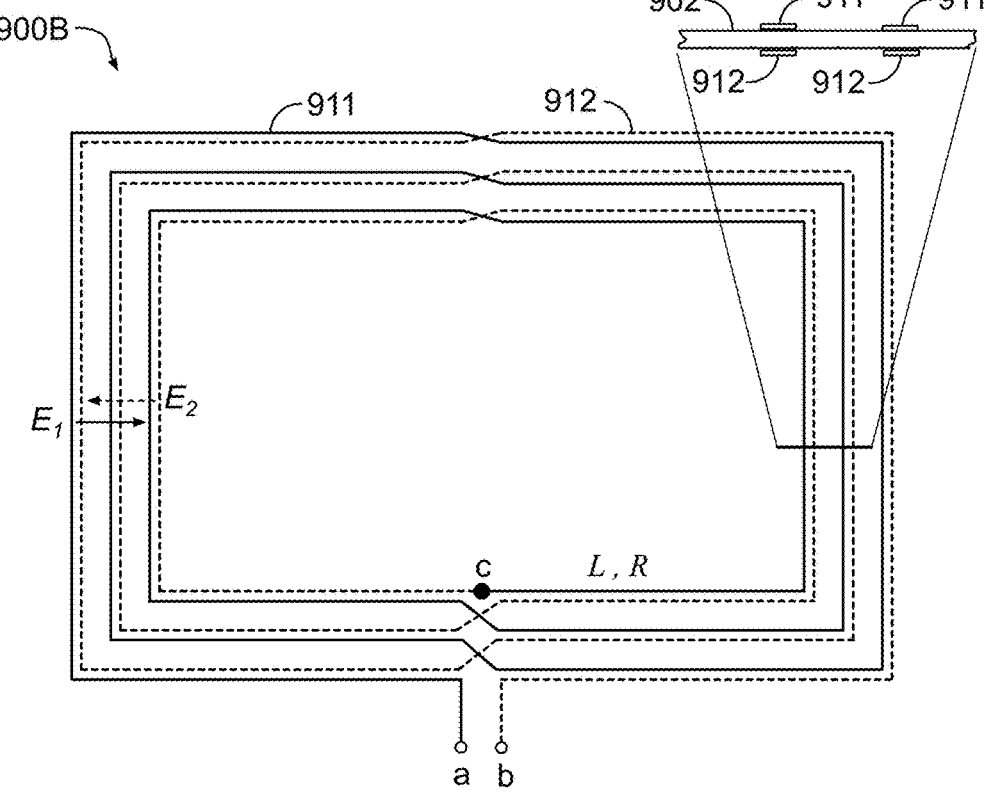
Figure 9C:
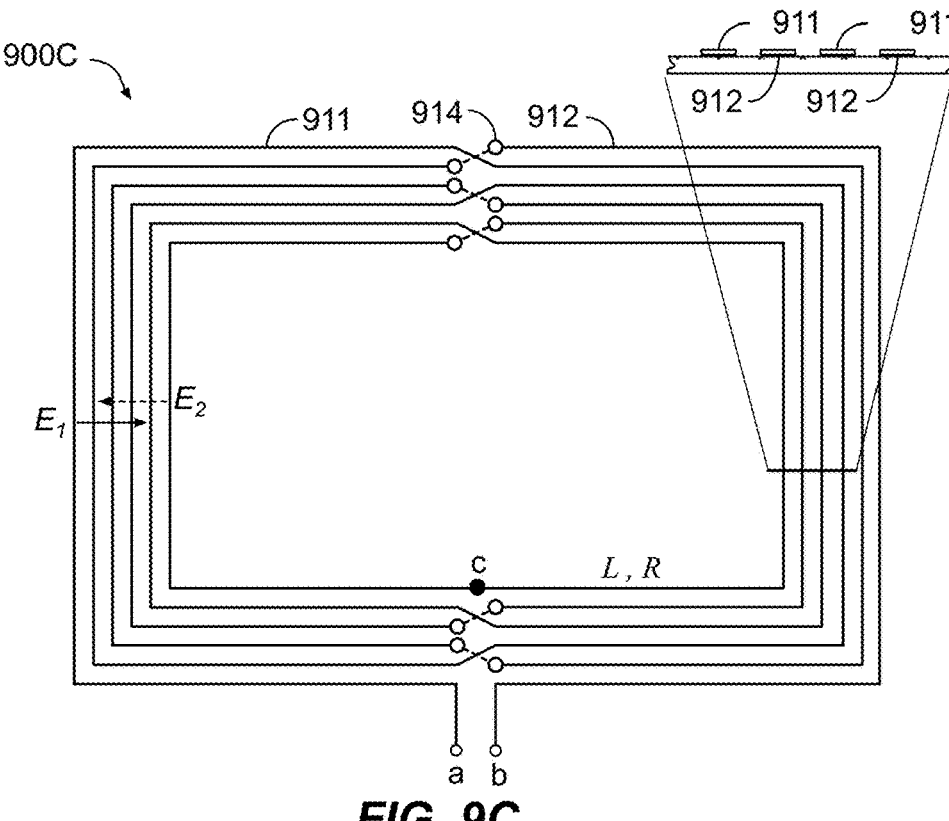

Therefore, in some implementations, it may be desirable to increase the innate inductive-to-capacitive sensitivity ratio of an inductive sense element at a frequency in the MHz range (e.g., 3 MHz) without compromising the SNR. FIGS. 9A to 9C illustrate example PCB implementations of substantially planar sense coils 900A to 900C, respectively, configured to provide an increased inductive-to-capacitive sensitivity ratio. Each of these example sense coils 900A to 900C may form an inductive sense element (e.g., one of inductive sense elements 107a to 107n) and consists of 6 turns of an electrical conductor providing an inductance L and an equivalent series resistance R. More specifically, they may be considered composed of a pair of substantially co-planar and overlapping half coils 911 and 912. The two half coils are magnetically tightly coupled and electrically connected in series at a central point c as indicated in FIGS. 9A to 9C. Each half coil provides one terminal of a pair of terminals a and b as required to electrically connect the sense coil (e.g., sense coil 900A) as part of a sense circuit (e.g., one of sense circuits 106a to 106n) to a measurement circuit (e.g., measurement circuit 104 in FIG. 1). By contemplating FIGS. 9A to 9C, it may be appreciated that the half coil 912 is the mirror image of the half coil 911 with respect to a vertical symmetry axis through point c. A voltage applied at the terminals a and b generates a current circulating in the same direction in all coil windings of the half coils 911 and 912, generating a magnetic field substantially equal to the magnetic field as produced by an ordinary spiral coil having the same turn count and similar geometry. However, due to a difference in voltage potential between coil windings, electric fields $E_1$ and $E_2$ generated by the respective half coils 911 and 912 have substantially equal magnitude but opposite direction as indicated, and therefore substantially cancel out. Electric field cancelling may also be found with respect to the field generated between the sense coil and an electrically conductive structure in the sense coil's vicinity or proximity if the sense coil is driven by a symmetric signal. In some implementations, the electrically conductive structure includes the WPT coil 202 in FIG. 3 and one or more adjacent sense coils of the array 107. Symmetric driving may be characterized by the voltages at the terminals a and b having substantially equal magnitude but opposite polarity if measured against a voltage potential of the electrically conductive structure. In some implementations, this potential substantially equals a ground potential. Driving the sense coil symmetrically, the electric field generally reduces at any position in the sense coil's surroundings. Reducing the electric field strength while maintaining the magnetic field strength increases the innate inductive-to-capacitive sensitivity ratio, thus reducing sensitivity to non-metallic objects (e.g., object 112) such as water but preserving sensitivity to metallic objects. A sense coil composed of a pair of mirror symmetric half coils (e.g., such as half coil 911 and 912) configured to reduce an electric field may be referred to as a balanced sense coil.

FIG. 9A illustrates an example PCB implementation of a 6-turn balanced sense coil 900A with half coils 911 and 912 disposed on opposite sides of the PCB and with respective windings interleaved such as illustrated in more detail by the cut view top right of FIG. 9A.

FIG. 9B illustrates another example PCB implementation of a 6-turn balanced sense coil 900B with half coil 911 and 912 also on opposite sides of the PCB but with respective windings on top of each other.

FIG. 9C illustrates a further example PCB implementation of a 6-turn balanced sense coil 900C where half coils 911 and 912 are interleaved and substantially on the same (top) side of the PCB such as illustrated in the cut view top right of FIG. 9C but with undercrossings on the opposite (bottom) side and electrically connected using vias 914. For reasons of symmetry and as illustrated in FIG. 9C, the undercrossings are equally distributed between the half coils 911 and 912. Moreover, every second crossing is an undercrossing when following the coil winding path starting at terminal a and ending at terminal b.

The implementations of balanced sense coils as illustrated in FIGS. 9A to 9C should be construed as exemplary and non-limiting. They do not represent the only implementations of a balanced sense coil. Moreover, the application of these balanced sense coils may not be limited to FOD. In certain implementations, a balanced sense coil may also be used as the transponder coil of the passive beacon transponder 326 in FIG. 3.

As previously discussed, reducing parasitic capacitive sensitivity requires the balanced sense coil 900C to be operated symmetrically at the terminals a and b. With reference to FIG. 4, this may be accomplished by configuring the measurement circuit 104 with a symmetric (differential) output driver circuit 402 including a symmetric multiplexer (MUX), a plurality of symmetric inductive sense circuits 106 each including a symmetric lead line, and a symmetric (differential) input measurement amplifier circuit 404 including a MUX. It may be appreciated that fully symmetric circuitry may be substantially more complex and costly than a corresponding asymmetric circuitry.

To reduce complexity and cost, asymmetric operation can potentially simplify the lead line wiring, such as in terms of the number of copper traces, the required PCB area, and the number of pins in any connector (not shown herein) required to electrically connect each sense coil of the array to the measurement circuit 104. Therefore, in some implementations, at least a portion of the sense coils are electrically connected to a common ground distribution (not shown herein). In such implementations, a driving signal is applied at the terminal b while the terminal a is virtually at zero (e.g., ground) potential.

In some examples, symmetric operation of the balanced sense coil 900C does not exclude the use of an asymmetric measurement circuitry and a common ground distribution if a balun transformer is used. In some implementations, the balun transformer (not shown herein) is inserted in each sense circuit between the lead line and the balanced sense coil. The balun transformer is configured to convert an asymmetric input signal at its unbalanced port to a symmetric output signal at its balanced port. However, since the balun transformer would be part of a resonant sense circuit and introduce losses, the Q-factor of the sense circuit is expected to noticeably degrade.

Figure 9D:
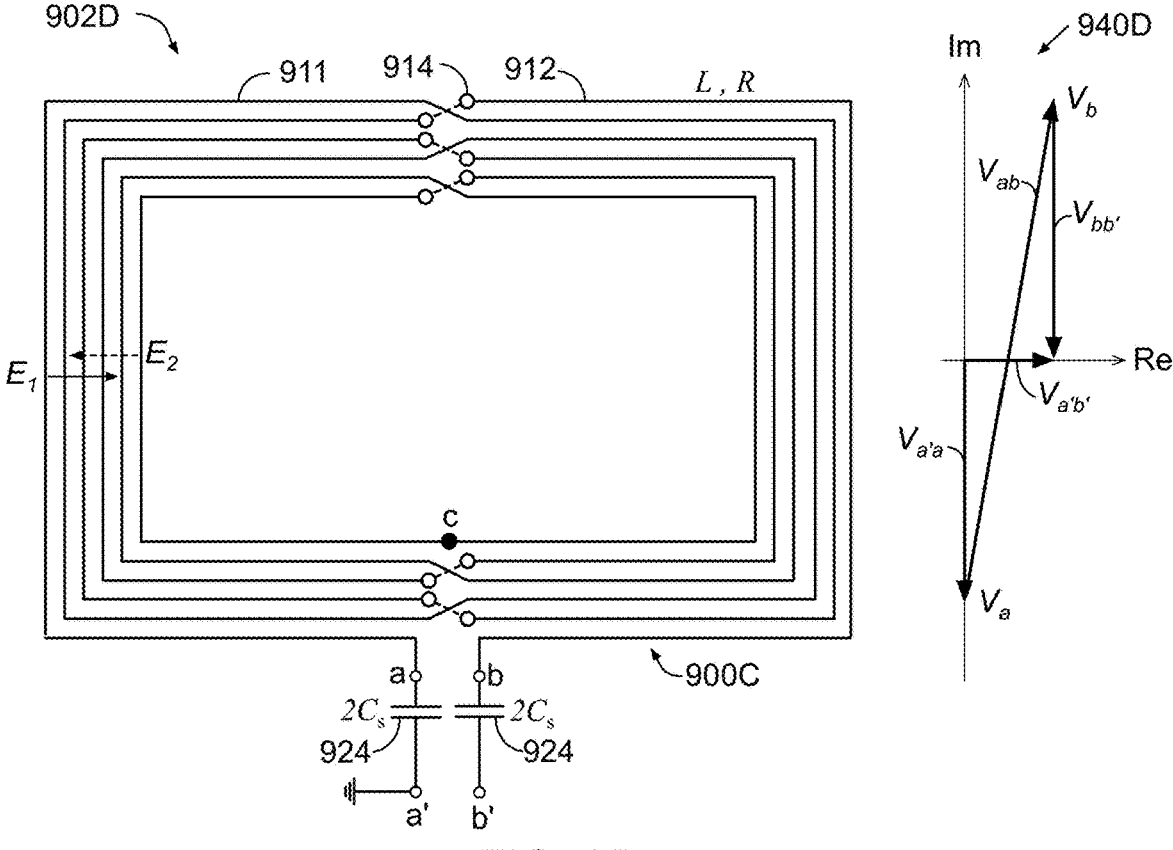
FIGS. 9D and 9E illustrate a implementations of an inductive sense circuit and a graph of voltage vectors in the complex plane.

For resonant sense circuits, there exists a more economical solution to achieve symmetry while also adding no extra losses. FIG. 9D illustrates an example implementation of a portion of an inductive sense circuit 902D. This portion includes the balanced sense coil 900C of FIG. 9C and a pair of capacitors 924 serving the same role as the capacitor 724 in FIGS. 7A and 7B. The capacitors 924 are electrically connected in series to the sense coil 900C directly at terminals a and b as illustrated in FIG. 7B except that the capacitive loading ($C_s$) is equally split (balanced) between the terminals a and b. Each capacitor 924 provides a capacitance $2C_s$ resulting in a total series capacitance $C_s$ as required to tune the sense circuit to series resonance at the nominal sense frequency as previously described. The resulting circuit 902D providing terminals a' and b' may also be considered a resonant balanced inductive sense element. The example implementation of FIG. 9D shows the terminal a' connected to ground (e.g., to a common ground distribution as mentioned above). Hence, the driving signal is applied to the terminal b'.

As previously discussed with reference to FIG. 7B, connecting the capacitors 924 directly to the terminals a and b may increase the Q-factor of the sense circuit and reduce a thermal drift. But even more importantly, the balanced capacitive loading by the capacitors 924 potentially converts an asymmetric driving signal at the terminal b' to a substantially symmetric signal at the terminals a and b if measured against ground potential. The symmetrizing effect of the capacitors 924 is illustrated in the right-hand side of FIG. 9D by a diagram 940D representing voltage vectors in a complex plane with its origin referring to ground potential. The diagram 940D assumes the capacitors 924 are loss-free, and thus vectors of voltages $V_{a'a}$ and $V_{bb'}$ across the capacitors 924 are perpendicular ($-90°$) to the driving voltage vector $V_{a'b'}$. Since a magnitude ratio $|V_{a'a}|$ to $|V_{a'b'}|$ equals the Q-factor and if the Q-factor is high enough (e.g., >30), it may be appreciated that the voltages resulting at the terminals a and b vs. ground, denoted in FIG. 9D by $V_a$ and $V_b$, respectively, are substantially symmetric, meaning that $V_b \approx -V_a$. Symmetric driving of the balanced sense coil 900C also results in substantially zero voltage at the sense coil's central point c.

Figure 9E:
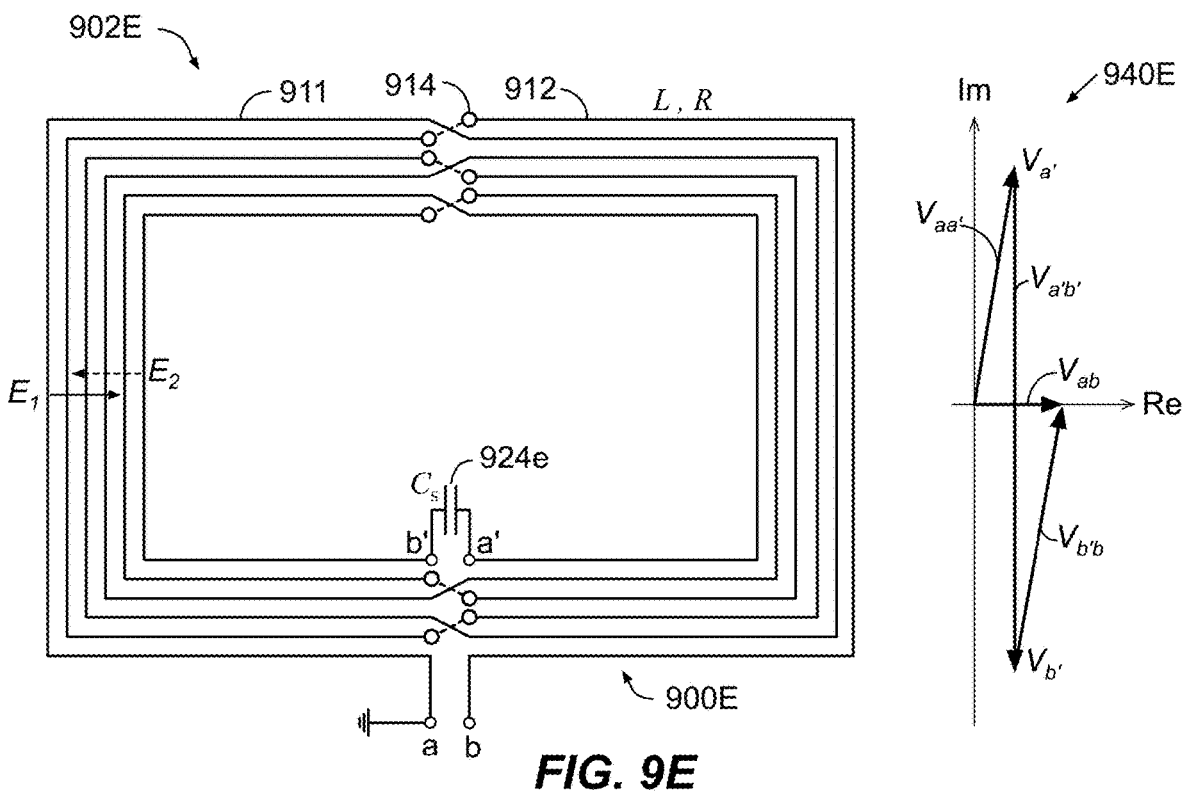

FIG. 9E illustrates another example implementation of a portion of an inductive sense circuit 902E including a balanced sense coil 900E providing terminals a and b and a single capacitor 924e electrically connected (inserted) between terminals a' and b' obtained by splitting the balanced sense coil 900C of FIG. 9C at its central point c. The capacitor 924e having capacitance $C_s$ is configured to tune the circuit 902E for series resonance at the nominal sense frequency as previously described. Similarly to the circuit 902D, the circuit 902E may be considered as a resonant balanced inductive sense element. FIG. 9E shows the terminal a connected to circuit ground (e.g., a common ground distribution as described above) indicated by the ground symbol.

The circuit 902E may be considered equivalent to the circuit 902D in all aspects but saves one tuning capacitor. The effect of the capacitor 924e is illustrated on the right-hand side of FIG. 9E by a voltage vector diagram 940E representing voltage vectors in the complex plane with its origin referring to ground potential. As in FIG. 9D, the capacitor 924e is assumed to be loss-free meaning that the phase of the voltage $V_{a'b'}$ between the terminals a' and b' is $-90°$ offset relative to the phase of the driving voltage $V_{ab}$. Since the ratio $|V_{a'b'}|$ to $|V_{ab}|$ equals the Q-factor and if the Q-factor is high enough (e.g., >30), it may be appreciated that voltages $V_{aa'}$ and $V_{b'b}$ across the two half coils 911 and 912, respectively, are substantially symmetric. Symmetric driving also results in voltage vectors $V_{a'}$ and $V_{b'}$ at the terminals a' and b', respectively, being mirror symmetric with respect to the real axis and including a common mode component of $V_{ab}/2$ that vanishes if the Q-factor approaches infinity.

However, for discriminating a certain category of nonmetallic objects, presence of parasitic capacitive sensitivity may also be helpful. This category may include predominantly dielectric objects having a size and conductivity sufficient to cause an impedance change with a magnitude and angle comparable to some tiny ferromagnetic metallic objects (e.g., a paper clip). As opposed to the latter, objects of this category would not heat to a hazardous temperature if exposed to the WPT magnetic field and thus can be ignored by FOD. Larger water objects (e.g., with a size comparable to the sense coil or larger) and an increased ion concentration (e.g., comparable to a 1% NaCl solution or higher) such as sea water or salty water (e.g., as found on driveways after extensive de-icing) may belong to this category. Other objects of this category may be human extremities containing liquid (blood) known to be approximately equivalent to a 1% NaCl solution. To discriminate objects of this category, presence of parasitic capacitive sensitivity may be useful. It may be appreciated that a larger water body can produce an impedance change differing from that of a tiny metal object if the inductive sense element provides parasitic capacitive sensitivity. This may be explained by the high permittivity of water ($\varepsilon_r \approx 80$).

Summarizing above discussions, smaller water objects with a low ion concentration (e.g., tap water) may cause false detections due to the presence of parasitic capacitive sensitivity, while larger water objects with a higher ion concentration (e.g., seawater) can potentially cause false detections due to the absence (or lack) of parasitic capacitive sensitivity. Moreover, the presence of parasitic capacitive sensitivity may alter the angle of an impedance change produced by a metal object, potentially causing misdetections. This dilemma may be resolved by using a detection system that combines inductive sensing with reduced parasitic capacitive sensitivity and capacitive sensing with reduced parasitic inductive sensitivity. This approach is referred to herein as hybrid inductive and capacitive sensing.

Figure 9F:
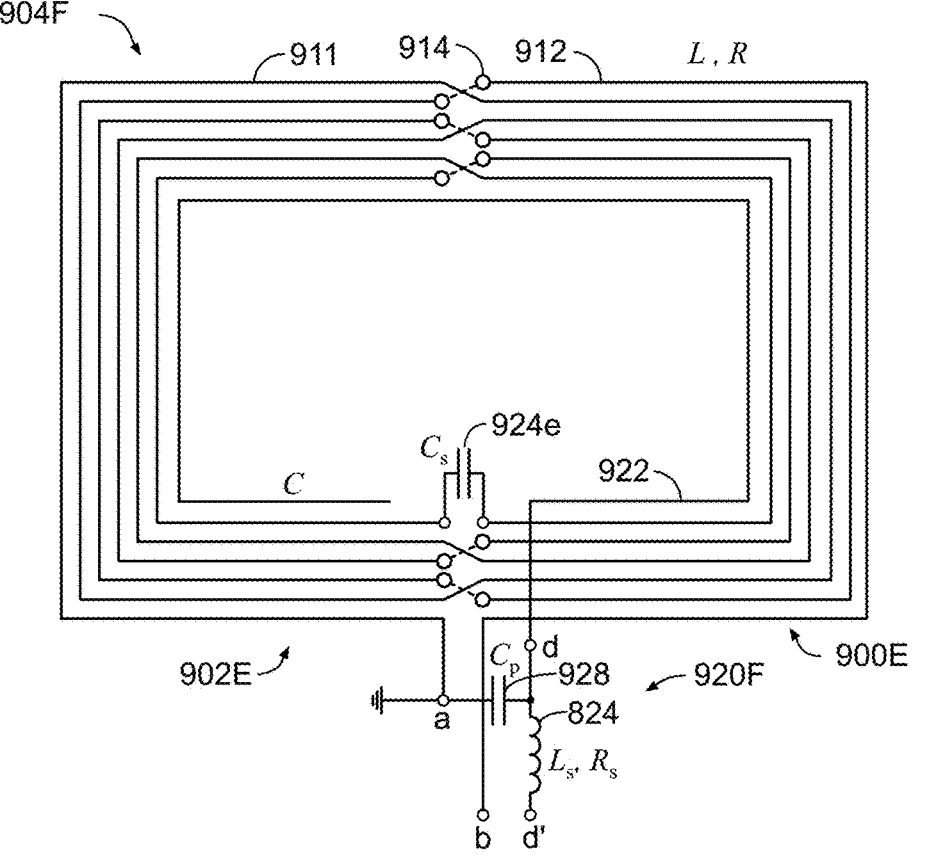
FIGS. 9F to 9H illustrate example implementations of a hybrid inductive and capacitive sense circuit.

FIG. 9F illustrates an example implementation of a portion of a hybrid inductive and capacitive sense circuit 904F using the circuit 902E of FIG. 9E to sense objects predominantly inductively and a portion of a capacitive sense circuit 920F configured to sense objects predominantly capacitively. In some implementations and with reference to FIG. 1, the inductive sense circuit 902E and the capacitive sense circuit 920F may apply to the inductive sense circuits 106a to 106n and to at least a portion of the capacitive sense circuits 108a to 108n, respectively. The circuits 902E and 920F provide terminal pair a and b and terminal pair a and d', respectively, where the drive signals are applied. In the example implementation of FIG. 9F, the terminal a, which is shared by both of the circuits 902E and 920F, is electrically connected to ground (e.g., a common ground distribution) as indicated by the ground symbol. Further, the circuit 920F includes a capacitive sense element 922 (e.g., a single-ended sense electrode) having a capacitance C and providing a single terminal (e.g., terminal d), a parallel capacitor 928 having capacitance $C_p$ electrically connected in parallel at the terminals d and a, and the series inductor 824 from FIG. 8B having an inductance $L_s$ and an equivalent series resistance $R_s$ electrically connected in series between the terminals d and d'.

The capacitive sense element 922 forms a single-turn open loop of an electrical conductor as illustrated in FIG. 9F. In a PCB implementation of the circuit 904F, this open loop may be a copper trace. However, any other conductive structure suitably configured to sense larger non-metallic objects as previously described and to prevent substantial eddy current flow when WPT is active may be used. A single-turn open loop or a similar lean structure may be preferable in PCB implementations of a hybrid inductive and capacitive sense element array providing a cutout (hole) in an inner area (e.g., coil window) of the hybrid sense elements. Such cutouts may be useful in implementations of a WPT structure (e.g., structure 200 of FIG. 3) providing a cover shell (e.g., cover shell 312) that mechanically rests on a coil former (e.g., coil former of WPT coil 202) (not shown herein) rather than on the PCB array (e.g., to avoid excessive mechanical pressure on the PCB array in case of a vehicle drive over). In such implementations, either the coil former or the cover shell may provide a mechanical support structure (e.g., a matrix of low-profile sockets) passing through the cutouts.

In some implementations of the circuit 904F, the parallel capacitor 928 is omitted and the circuit 920F is tuned for series resonance using a series inductor 824 with a larger inductance $L_s$ and a sense electrode (e.g., capacitive sense element 922) configured for a higher capacitance C.

In another implementation of the circuit 902F, the resonant resistance (e.g., impedance at the series resonant frequency) of each of the circuit 902E and the circuit 920F is individually tuned to a desired level. The resonant resistance of the circuit 902E is tuned by adjusting the ratio of the inductance L and the capacitance $C_s$ accordingly taking the equivalent series resistance R of the balanced sense coil 900E into account. Likewise, the resonant resistance of the circuit 920F is tuned by adjusting the ratio of the inductance $L_s$ and the sum capacitance ($C_p$+C) accordingly taking the equivalent series resistance $R_s$ of the inductor 824 into account.

In a further implementation of the circuit 904F, each of the circuits 902E and 920F are separately connected to a measurement circuit (e.g., measurement circuit 104 of FIG. 4) via lead lines (e.g., lead line 732 and 832, respectively, from FIG. 7A, 8A, or 7B, 8B). The circuits 902E and 920F may be tuned substantially to the same resonant frequency and operated in different time slots in a time-multiplexed fashion (e.g., time division multiplexing) as previously discussed in connection with FIG. 4. Alternatively, the circuits 902E and 920F may be tuned to substantially different resonant frequencies and operated concurrently (in the same time slot) in a frequency-multiplexed fashion (e.g., frequency division multiplexing). Frequency-multiplexed operation would require the measurement circuit to concurrently generate and process two different sense signals at different ports. In an example implementation based on frequency multiplexing, the circuits 902E and 920F are tuned for series resonance at a frequency around 3 MHz and a frequency above 4 MHz, respectively.

In yet another implementation of the circuit 904F, the circuits 902E and 920F are tuned to substantially different resonant frequencies but electrically connected in parallel to a common lead line (e.g., the terminals b and d' are electrically connected to form a common terminal). In these implementations, the resonant circuits 902E and 920F provide an inherent frequency duplexer function. They may be operated either in a frequency-multiplexed fashion or in a frequency- and time-multiplexed fashion. Supplementary time multiplexing avoids dual sense signal generation and processing, simplifying the measurement circuit but increasing the time needed for scanning through the plurality of sense circuits as described with reference to FIG. 4.

In yet a further implementation of the circuit 904F where the circuits 902E and 920F are connected in parallel (at the terminals b and d') and operated at different frequencies (frequency division multiplexing) as described above, the circuit 920F is tuned for a series resonant resistance that is substantially higher than that of the circuit 902E (e.g., to reduce an impact of the circuit 920F on the circuit 902E). This impact may refer to an alteration of the impedance change as measured at the common terminals b and d' and at the operating frequency of the circuit 902E due to the presence of an object. This impact may be reduced by increasing at least one of the resonant resistance and resonant frequency of the circuit 920F.

It may be appreciated that hybrid inductive and capacitive sensing based on the circuit 904F can generally provide more information to discriminate non-metallic objects than an inductive sense circuit exhibiting parasitic capacitive sensitivity (e.g., inductive sense circuit 700A of FIG. 7A that is based on an unbalanced sense coil 710). As opposed to the circuit 700A, the circuit 904F provides two physical or logical ports to measure the impedance change caused by an object by the inductive and capacitive sensing effects, separately.

In implementations of the circuit 100 of FIG. 4 using hybrid inductive and capacitive sensing for FOD, the control and evaluation circuit 104 is configured to use measurement outputs of the measurement circuit 104 associated with inductive sense circuits (e.g., circuit 902E including balanced sense coil 900E) and corresponding capacitive sense circuits (e.g., circuit 920F including sense electrode 922) to discriminate non-metallic objects from metallic objects more reliably. More specifically, it is configured to use at least one measured electrical characteristic (e.g., a complex impedance) associated with the inductive and capacitive sense circuits for FOD.

In another implementation of the circuit 100 of FIG. 4, hybrid inductive and capacitive sensing according to the implementation of FIG. 9F is used for FOD and LOD. In such implementation, the control and evaluation circuit 104 may be configured to use measurement outputs of the measurement circuit 104 associated to inductive sense circuits (e.g., circuit 902E) and corresponding capacitive sense circuits (e.g., circuit 920F) to discriminate non-living objects from living objects more reliably. In such an implementation and with reference to FIGS. 2 and 9F, the hybrid sense circuits (e.g., circuit 904F) associated with sense elements located along the periphery of the array 107 may be configured with sense electrodes (e.g., capacitive sense element 922) that are larger and expand into a peripheral area outside of the sense coil (e.g., sense coil 900E). These larger electrodes (e.g., capacitive sense element 922) may be configured to improve a capacitive sensitivity to living objects approaching the structure 200. In some implementations, these larger electrodes in the peripheral areas supplant the capacitive sense elements 109a to 109n as shown in FIGS. 1 and 2.

Figure 9G:
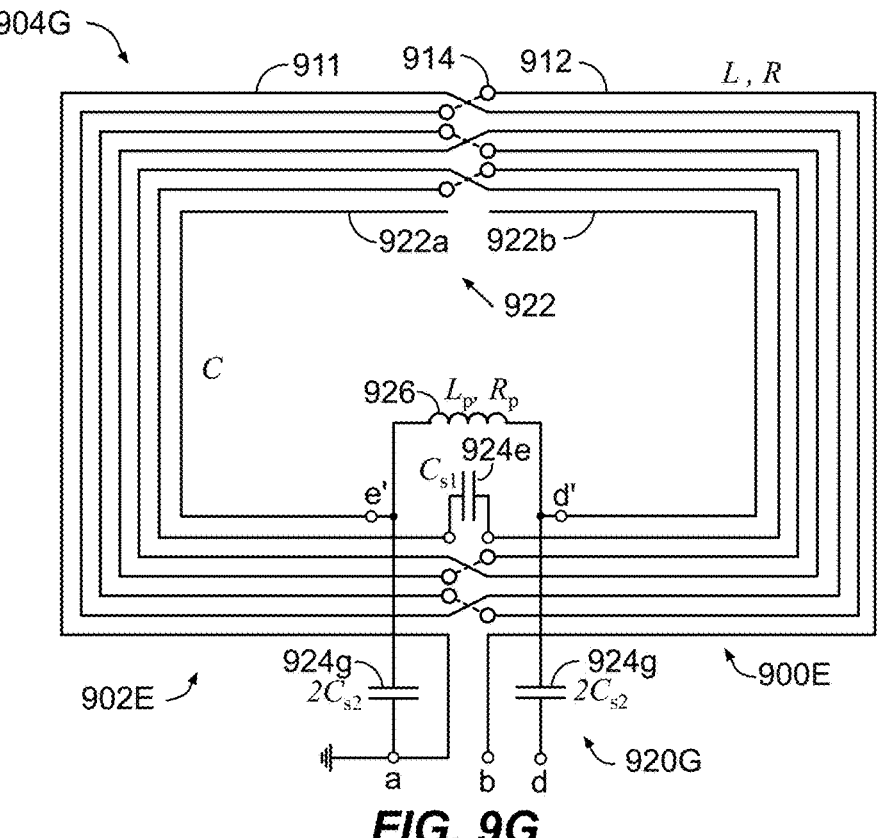

FIG. 9G illustrates an example implementation of a portion of a hybrid inductive and capacitive sense circuit 904G comprising the circuit 902E of FIG. 9E configured to sense objects predominantly inductively and a portion of a capacitive sense circuit 920G configured to sense predominantly capacitively. As indicated in FIG. 9G, the circuits 902E and 920G provide terminal pair a and b and terminal pair a and d, respectively, where the drive signals are applied. The terminal a is shared between both of the circuits 900E and 920G and electrically connected to ground (e.g., a common ground distribution) as indicated by the ground symbol. The circuit 920G differs from the circuit 920F of FIG. 9F in that the circuit 920G is based on a symmetric topology using a symmetric capacitive sense element 923 having a differential mode capacitance C and providing terminals e' and d', a parallel inductor 926 having inductance $L_p$ and equivalent series resistance $R_p$ electrically connected between the terminals e' and d', and a symmetric pair of series capacitors 924 each having a capacitance $2C_{s2}$. The symmetric capacitive sense element 923 may be a double-ended open loop sense electrode composed of two single-ended electrodes 923a and 923b.

Figure 9H:
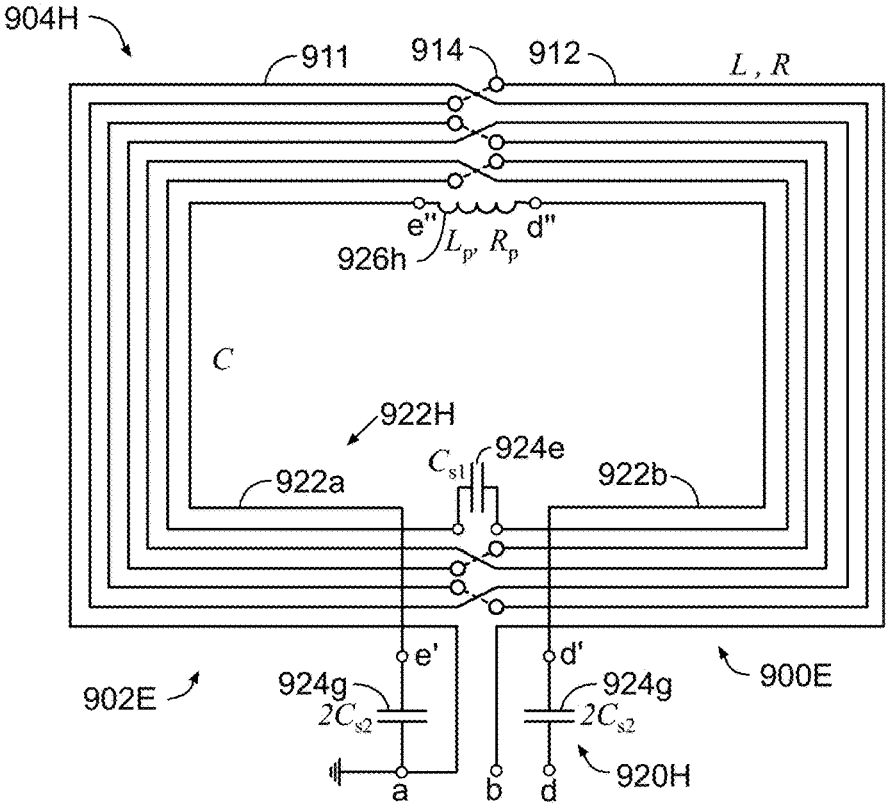

FIG. 9H illustrates another example implementation of a portion of a hybrid inductive and capacitive sense circuit 904H comprising the circuit 902E of FIG. 9E configured to sense objects predominantly inductively and a portion of a capacitive sense circuit 920H configured to sense objects predominantly capacitively. The circuit 920H differs from the circuit 920G of FIG. 9G in that the parallel inductor 926 (referring to FIG. 9G) is electrically connected (inserted) between the two open ends of the symmetric sense electrode 923 indicated by terminals e" and d".

Although FIGS. 9D to 9H show the respective circuits 902D to 904H based on the balanced sense coil 900C of FIGS. 9C and 900E of FIG. 9E, any other implementation of a balanced sense coil (e.g., sense coil 900A or 900B) may apply.

In a further aspect of the detection circuit 100, it may be desirable to suppress circuit extrinsic noise produced by the WPT system (e.g., when WPT is active). As previously discussed, this noise may be electromagnetically coupled into the inductive and capacitive sense elements (e.g., inductive sense element 107a and capacitive sense element 109a) of the detection circuit 100 and may degrade a performance (e.g., a detection sensitivity). This extrinsic noise may be switching noise emanating from the GA but also from the VA. The VA noise contribution may be significant if the VA includes an active rectifier. The switching noise may include frequency-selective noise (e.g., harmonics of the fundamental WPT operating frequency and other switching frequencies as used in the GA and VA power conversion) and wide-band noise. The switching noise spectrum typically reaches far into the Megahertz range but with a spectral density level that tends to decrease towards higher frequencies.

Noise Reduction

It may be desirable to reduce a noise component in the frequency range where FOD and LOD are sensitive. Reducing noise may improve a detection performance of the detection circuit 100. The circuit diagrams of FIGS. 10A to 13B illustrate example implementations of an inductive WPT system including a GA and VA as previously described. Each of the different implementations includes provisions configured to reduce a high frequency switching noise component and is discussed below.

FIGS. 10A, 11A, 12A, and 13A show schematic diagrams of respective GA circuits 1000A, 1100A, 1200A, and 1300A subdivided into a GA power supply circuit 1010 and a GA resonator circuit 1020 electrically connected via a feeder cable 1016. The GA power supply circuit 1010 includes a GA power conversion circuit 1012 electrically connected to a portion of a tuning and matching network including symmetric series inductors 1014 together providing an inductance $L_{s1}$. Further, it includes a metal chassis 1011 indicated by a dashed box. FIGS. 10A to 13A also illustrate an AC power (e.g., voltage) source 1002 electrically connected to the GA power supply circuit 1010. The AC power source 1002 may represent the power grid (e.g., 60 Hz or 50 Hz AC, single-phase, two-phase, or three-phase). In some implementations or operations supporting V2G, the AC power source 1002 may also act as an AC power sink. A port of the GA power supply circuit 1010 or the GA power conversion circuit 1012 interfacing to the AC power source 1002 is also referred to as the AC port, while a port interfacing towards the GA resonator circuit 1020 is referred to as the WPT port. Further, the GA resonator circuit 1020 includes the WPT coil 202 of FIG. 2 represented by an inductor having an inductance $L_1$ electrically connected to the remaining portion of the tuning and matching network comprising symmetric series capacitors 1024 together having a capacitance $C_{s1}$ and a parallel capacitor 1026 having a capacitance $C_{p1}$. Further, it includes the back plate 206 of FIG. 2 (made of an electrically conductive material) indicated by a dashed box.

The feeder cable 1016 includes a double wire line configured to convey power from the GA power supply circuit 1010 to the GA resonator circuit 1020 and a ground connection 1017 electrically connecting the back plate 206 to the chassis 1011, and it includes a cable shield 1018 indicated in FIGS. 10A to 13A by a dashed oval. In some implementations, the ground connection 1017 is provided by at least one of the cable shield 1018 and a ground wire sometimes also referred to as a "drain" wire. In other implementations, the cable shield 1018 is electrically bonded to the ground connection 1017 as indicated in FIGS. 10A to 13A by the black dot. In further implementations, the cable shield 1018 is electrically "floating". In yet other implementations, the cable shield 1018 is bonded to at least one of the chassis 1011 and the back plate 206.

Further, FIGS. 10A to 13A show the GA power conversion circuit 1012 electrically grounded to the chassis 1011 via a ground connection 1013. In some implementations, the ground connection 1013 is capacitive (AC coupled) and thus mainly effective at a high frequency. Moreover, the WPT coil 202 exhibits a stray capacitance $C_{g1}$ to the back plate 206. Though only shown in FIG. 10A, the stray capacitance $C_{g1}$ may be present in any of the GA circuits 1100A to 1300A. For purposes of illustration, the stray capacitance $C_{g1}$ is shown as a discrete (lumped) element but may be considered as a distributed capacitance $C_{g1}'$ along the wire of the WPT coil 202 also having a distributed inductance $L_1'$ (not shown in FIG. 10A).

In some implementations, the GA power supply circuit 1010 is contained in a "wall box" and the GA resonator circuit 1020 in a ground-based unit (e.g., ground-based WPT structure 200 of FIG. 2) electrically connected via the feeder cable 1016. In such implementations, the feeder cable 1016 may have a length of several meters (e.g., 5 m). However, the GA circuits 1000A to 1300A may also and at least in part apply to other implementations where the GA power supply circuit 1010 and the GA resonator circuit 1020 constitute a single (e.g., inseparable) physical unit and are contained in the same housing (not shown). In such implementations, the feeder cable 1016 as such may not appear or may only have a short length. With reference to FIGS. 2 and 3, the GA resonator circuit 1020 may correspond to the ground-based structure 200. Any of the GA circuits 1000A to 1300A may be included in the one or more units that are installed on the ground (e.g., floor mount) or on a wall and may be configured to enable inductive WPT from the grid to the vehicle (G2V) or vice versa (V2G).

FIGS. 10B, 11B, 12B, and 13B show schematic diagrams of respective VA circuits 1000B, 1100B, 1200B, and 1300B subdivided into a VA resonator circuit 1030 and a two-port VA power supply circuit 1040. The VA power supply circuit 1040 includes a VA power conversion circuit 1042 electrically connected to a portion of a tuning and matching network comprising symmetric series inductors 1044 providing together an inductance $L_{s2}$. Further, it includes a metal chassis 1041 indicated by a dashed box. FIGS. 10B to 13B also illustrate a DC power (e.g., voltage) sink 1052 electrically connected to the VA power supply circuit 1040 at a port also referred to as the DC port. The DC power sink 1052 may abstract the vehicle's traction battery (e.g., vehicle 340 of FIG. 3) presenting an electrical load to the VA power supply circuit 1040. In some implementations or operations supporting V2G, the DC power sink 1052 may also act as a DC power source. A port of the VA power supply circuit 1040 or the VA power conversion circuit 1042 interfacing to the DC power sink 1052 is also referred to as the DC port, while a port interfacing towards the VA resonator circuit 1030 is referred to as the WPT port. Further, the VA resonator circuit 1030 includes the WPT coil 322 of FIG. 3 represented by an inductor having an inductance $L_2$ electrically connected to the remaining portion of the tuning and matching network comprising a parallel capacitor 1036 having a capacitance $C_{p2}$ and symmetric series capacitors 1034 having together a capacitance $C_{s2}$. In some implementations and as indicated in FIGS. 10B to 13B by the dashed box, the metal chassis 1041 also includes a back plate for the WPT coil 322. In certain implementations, the chassis 1041 is electrically and physically connected to the shield 334 of FIG. 3 that acts as a back plate for the WPT coil 322.

Further, FIGS. 10B to 13B show the VA power conversion circuit 1042 electrically grounded to the chassis 1041 via a ground connection 1043. In some implementations, the ground connection 1043 is capacitive (AC coupled) and thus mainly effective at a high frequency. Moreover, the WPT coil 322 exhibits a stray capacitance $C_{g2}$ to the chassis (e.g., back plate) 1041. Though only shown in FIG. 10B, the stray capacitance $C_{g2}$ may also apply to any of the VA circuits 1100B to 1300B. For purposes of illustration, the stray capacitance $C_{g2}$ is shown as a discrete (lumped) element but may be considered as a distributed capacitance $C_{g2}'$ along the wire of the WPT coil 322 also having a distributed inductance $L_2'$ (not shown in FIG. 10B).

In some implementations and as indicated by FIGS. 10B to 13B, the VA resonator circuit 1030 and the VA power supply circuit 1040 form a single (e.g., inseparable) physical unit. However, the VA circuits 1000B to 1300B may also and at least in part apply to other implementations where the VA power supply circuit 1040 and the VA resonator circuit 1030 constitute two (e.g., separable) physical units each contained in a different housing and electrically connected by a feeder cable (not shown herein) in a manner similar to that illustrated in FIGS. 10A to 13A. With reference to FIG. 3, the VA resonator circuit 1030 may correspond to the vehicle-based WPT structure 320. Any of the VA circuits 1000B to 1300B may be included in the one or more units that are installed on the vehicle (e.g., vehicle 340 of FIG. 3) and may be configured to enable inductive WPT from the grid to the vehicle (G2V) or vice versa (V2G). Some or all components of the VA power conversion circuit 1042 may also serve additional functions, such as converting power provided to the vehicle through a wired connection, in the case of an integrated VA and on-board charger (OBC).

Figure 10A:
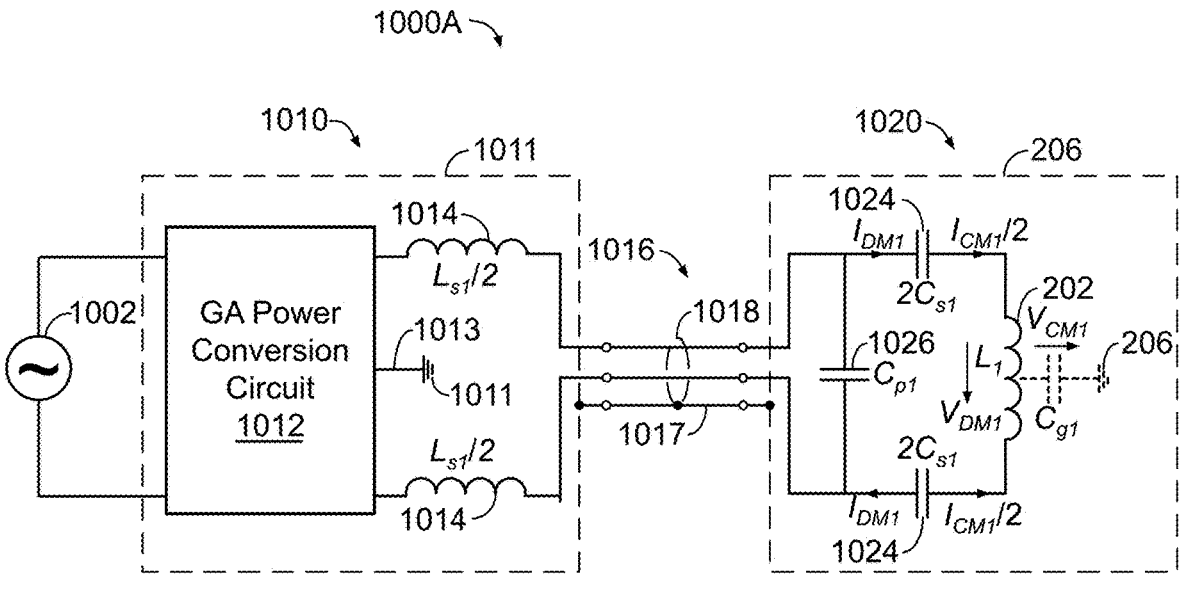

FIG. 10A indicates a differential mode (DM) current $I_{DM1}$ and a common mode (CM) current $I_{CM1}$ flowing into the WPT coil 202 in the same direction and opposite directions, respectively. These currents may be accompanied by a respective DM voltage $V_{DM1}$ across the WPT coil 202 and CM voltage $V_{CM1}$ across the stray capacitance $C_{g1}$ (between WPT coil 202 and back plate 206). Both currents may have a respective source in the GA power conversion circuit 1012 but also in the VA power conversion circuit 1042 due to an electromagnetic field coupling between the WPT coil 202 and the WPT coil 322. More precisely, the GA contributed CM current may flow from the symmetric WPT port of the GA power conversion circuit 1012 via the power conveying wires of the feeder cable 1016 and series capacitors 1024 to the WPT coil 202 and return to the GA power conversion circuit 1012 via the stray capacitance $C_{g1}$, back plate 206, chassis 1011, and ground connection 1013. In some implementations or operations, both of the currents $I_{DM1}$ and $I_{CM1}$ may include a substantial high frequency switching noise component in a critical frequency band where the detection circuit 100 is sensitive. Spectral analysis of this high-frequency switching noise component may show discrete harmonics and wide-band noise as previously discussed. Though indicated in FIG. 10A only, the DM current $I_{DM1}$ and CM current $I_{CM1}$ as well as the respective voltages $V_{DM1}$ and $V_{CM1}$ may also apply to the GA circuits 1100A to 1300A of respective FIGS. 11A to 13A at corresponding positions.

In some examples, the elements of the GA tuning and matching network also act as a low pass filter with the potential to sufficiently attenuate the high-frequency switching noise component in the DM current $I_{DM1}$. This may be particularly true if the GA resonator circuit 1020 is tuned for resonance at a low frequency (e.g., 85 kHz) while the detection circuit 100 operates in the MHz range. In some examples, however, the tuning and matching network cannot sufficiently suppress the high-frequency switching noise component in the CM current $I_{CM1}$. It may be appreciated that the low pass filtering effect provided by the series inductors 1014 in combination with the inductance $L_1$ and stray capacitance $C_{g1}$ may not suffice.

The CM current $I_{CM1}$ in the WPT coil 202 will generate both a magnetic and an electric field with a distribution differing from that produced by the DM current $I_{DM1}$. More specifically, it can be found that the CM currents $I_{CM1}/2$ flowing into the WPT coil 202 at both wire ends in opposite directions are steadily decreasing along the wire and eventually vanishing at some central point (current knot). This peculiar current distribution produces a kind of standing wave with a magnetic field maximum and an electric field minimum at each wire end and a magnetic field minimum and an electric field maximum at the central point. Both the DM current-generated and the CM current-generated electromagnetic fields have the potential to induce a signal (e.g., a high-frequency switching noise component) into one or more of an inductive and a capacitive sense element (e.g., any of inductive sense elements 107a to 107n or capacitive sense elements 109a to 109n of FIG. 1). From discussions above, it may be concluded that reducing the GA-induced high frequency switching noise component requires the corresponding component in both $I_{DM1}$ and $I_{DM2}$ to be sufficiently attenuated. This may be equivalent to attenuating a corresponding component in the DM voltage $V_{DM1}$ and the CM voltage $V_{CM1}$.

Figure 10B:
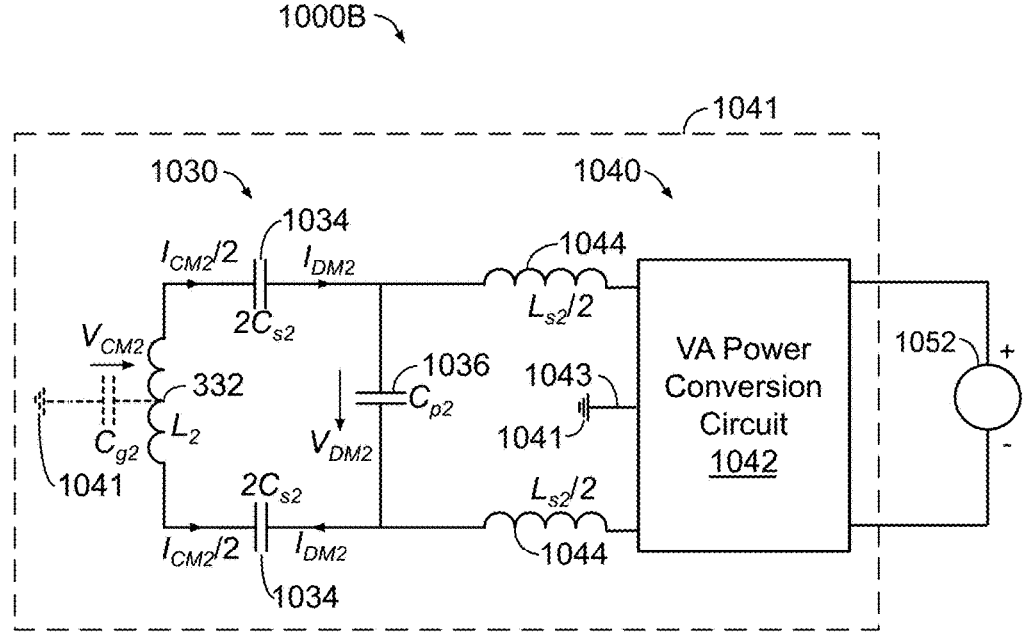

FIG. 10B indicates a DM current $I_{DM2}$ and a CM current $I_{CM2}$ flowing into the WPT coil 322. These currents may be accompanied by a respective DM voltage $V_{DM2}$ across the WPT coil 322 and CM voltage $V_{CM2}$ across the stray capacitance $C_{g2}$ (between WPT coil 322 and chassis 1041). Both currents may have a respective source in the VA power conversion circuit 1042 but also in the GA power conversion circuit 1012 due to the electromagnetic field coupling between the WPT coil 202 and the WPT coil 322. More precisely, the VA-contributed CM current may flow from the symmetric WPT port of the VA power conversion circuit 1042 to the WPT coil 322 via series inductors 1044 and series capacitors 1034 and return to the VA power conversion circuit 1042 via the stray capacitance $C_{g2}$, chassis 1041, and ground connection 1043. In some implementations or operations, both of the currents $I_{DM2}$ and $I_{CM2}$ may include a substantial high-frequency switching noise component in a critical frequency band where the detection circuit 100 is sensitive. This may be particularly true if the VA power conversion circuit 1042 implements an active rectifier or operates in a transmit mode for transferring power in the reverse direction (e.g., V2G). Spectral analysis of this high-frequency switching noise component may show discrete harmonics and wide-band noise as previously discussed. Though indicated in FIG. 10B only, the DM current $I_{DM2}$ and the CM current $I_{CM2}$ as well as the respective voltages $V_{DM2}$ and $V_{CM2}$ may also apply to the VA circuits 1100A to 1300A of respective FIGS. 11A to 13A at corresponding positions.

As with the GA, the elements of the VA tuning and matching network also act as a low pass filter with the potential to sufficiently attenuate the high-frequency switching noise component in the DM current $I_{DM2}$. Again, this may be particularly true if the VA resonator circuit 1030 is tuned for resonance at a low frequency (e.g., 85 kHz) while the detection circuit 100 operates in the MHz range. And, again, the tuning and matching network cannot sufficiently suppress the high-frequency switching noise component in the CM current $I_{CM2}$. It may be appreciated that the low pass filtering effect provided by the series inductors 1044 in combination with the inductance $L_2$ and stray capacitance $C_{g2}$ may not suffice.

As already discussed for the GA circuit 1000A, the CM current $I_{CM2}$ in the WPT coil 322 will also generate an electromagnetic field. Both the DM current-generated and CM current-generated electromagnetic fields have the potential to induce a signal (e.g., a high-frequency switching noise component) into one or more of an inductive and a capacitive sense element. This may be particularly true, if the distance between the GA integrated sense element array (e.g., sense element array 107 or 109, respectively) and the VA WPT coil 322 is relatively small (e.g., at low z-height operation). From discussions above, it may be concluded that reducing the VA induced high-frequency switching noise component requires the corresponding component in both $I_{DM2}$ and $I_{CM2}$ to be sufficiently attenuated. This may be equivalent to attenuating a corresponding component in the DM voltage $V_{DM2}$ and the CM voltage $V_{CM2}$.

Figure 11A:
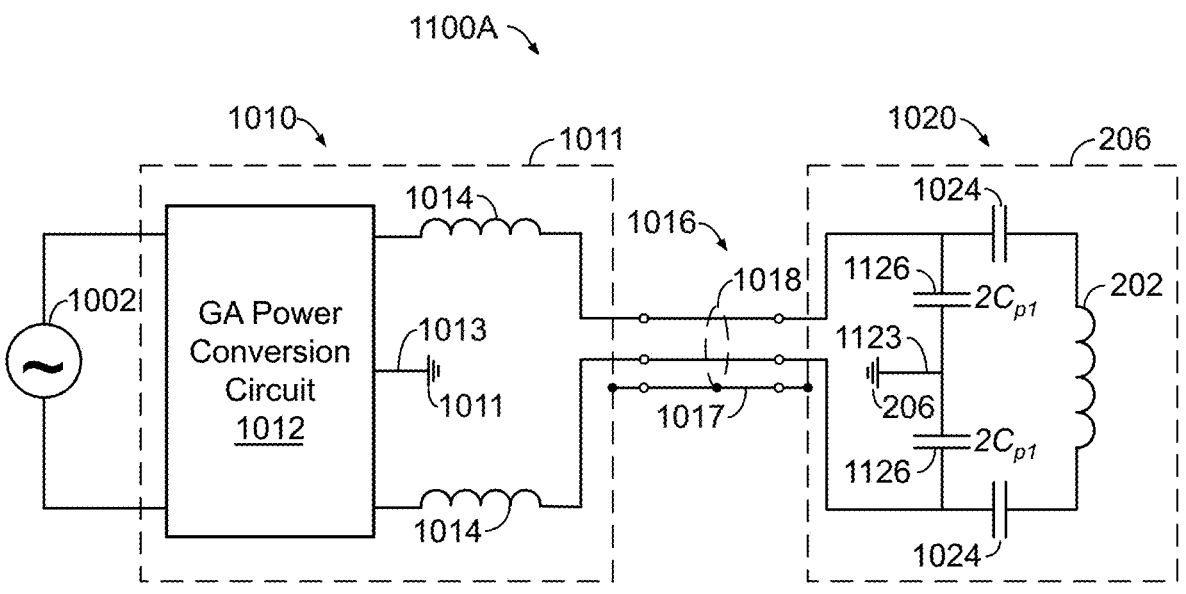

In one example of providing such noise reduction, FIG. 11A illustrates a GA circuit 1100A configured to provide improved attenuation of the high-frequency switching noise component in the CM current $I_{CM1}$. The GA circuit 1100A equals the GA circuit 1000A of FIG. 10A, except that the parallel capacitor 1026 is split into two equal portions 1126, each having double capacitance $2C_{p1}$, to provide a center point that can be electrically connected to the back plate 206 via a ground connection also referred to as a center point grounding 1123. Depending on the actual values of $C_{p1}$, this center point grounding 1123 may provide a virtual short circuit at high frequency with respect to a CM voltage between the terminals of the GA resonator circuit 1020 and the back plate 206 (ground). In combination with the series inductors 1014, the center point grounding 1023 may sufficiently suppress a high-frequency switching noise component in the CM current $I_{CM1}$. In other words, it can divert a large portion of the high frequency component in the CM current to ground before reaching the WPT coil 202.

Figure 11B:
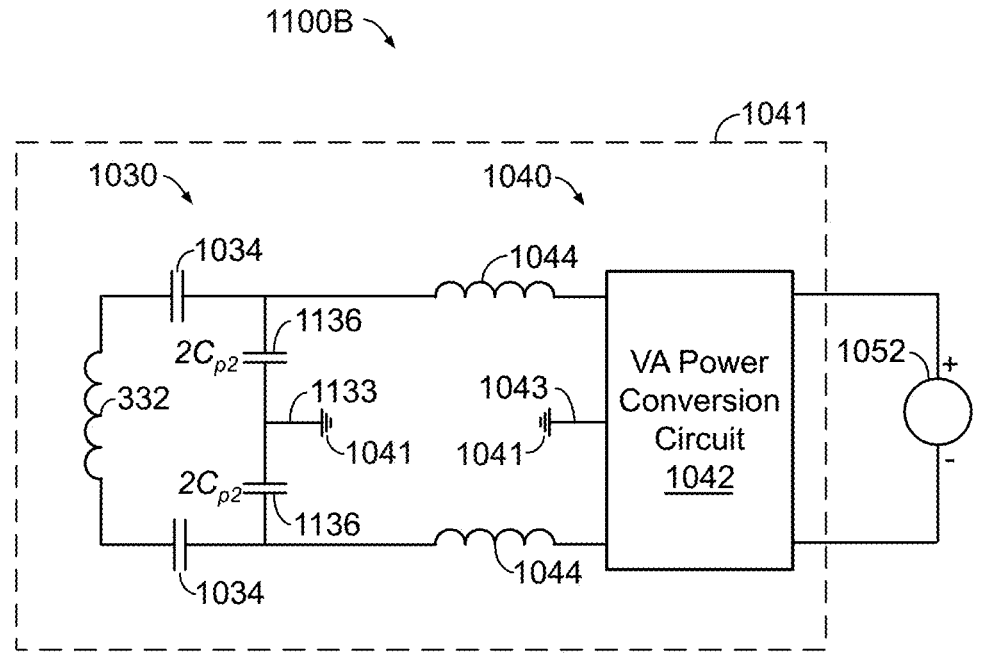

In the same aspect, FIG. 11B illustrates a VA circuit 1100B configured to provide improved attenuation of the switching noise component in the CM current $I_{CM2}$. The VA circuit 1100B equals the VA circuit 1000B of FIG. 10B, except that the parallel capacitor 1036 is split into two equal portions 1136, each having double capacitance $2C_{p2}$, to provide a center point that can be electrically connected to the chassis 1041 via a center point grounding 1133. Depending on the actual values $C_{p1}$, the center point grounding 1133 may provide a virtual short circuit at high frequency with respect to a CM voltage between the terminals of the VA resonator circuit 1030 and the chassis 1041. In combination with the series inductors 1044, the center point grounding 1133 may sufficiently suppress a high-frequency switching noise component in the CM current $I_{CM2}$. In other words, it can divert a large portion of the high-frequency component in the CM current component before reaching the WPT coil 322.

In certain implementations and operations, the CM current flowing through the ground connection 1013 may reach relatively high levels (e.g., several Amperes) when a ground loop is closed via the center point grounding 1023. This may be particularly true in implementations using an efficient electromagnetic interference (EMI) filter at the AC port of the GA power conversion circuit 1012. In such implementations, a predominant path of the ground connection 1013 is commonly provided by CM filtering capacitors (e.g., the so called "Y" capacitors) of the EMI filter (not shown in FIG. 11A). Introducing the center point grounding 1123 would require certain components of the EMI filter to be dimensioned for much higher currents substantially increasing their size and cost.

Likewise, in certain implementations or operations, the CM current flowing through the ground connection 1043 may reach relatively high levels (e.g., several Amperes) when a ground loop is closed via the center point grounding 1123. This may be particularly true in implementations using an EMI filter at the DC port of the VA power conversion circuit 1042 (e.g., for reasons as discussed above for the GA circuit 1100A). Introducing the center point grounding 1133 would require certain components of the EMI filter (not shown in FIG. 11B) to be dimensioned for much higher currents, substantially increasing their size and cost.

Figure 12A:
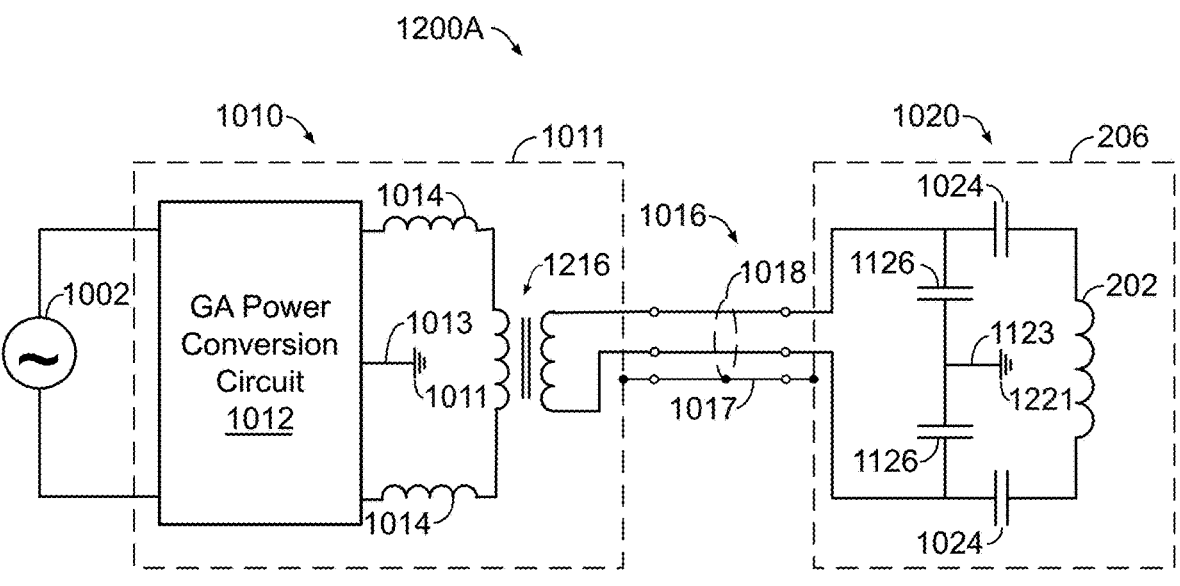

To address such concerns, FIG. 12A illustrates a GA circuit 1200A configured to provide improved attenuation of the high-frequency switching noise component mainly in the CM current $I_{CM1}$. The GA circuit 1200A equals the GA circuit 1100A of FIG. 11A, except that an isolation transformer 1216 is inserted at the WPT port of the GA power supply circuit 1010 (e.g., between the series inductors 1014 and the feeder cable 1016). It may be appreciated that the isolation transformer 1216 has the potential to substantially reduce the CM current $I_{CM1}$ if configured to exhibit a low capacitance between its primary and secondary winding. However, the isolation transformer 1216 needs to be dimensioned to transfer the full power as specified for the GA circuit 1200A, which may substantially increase space demand and cost of the GA power supply circuit 1010.

Figure 12B:
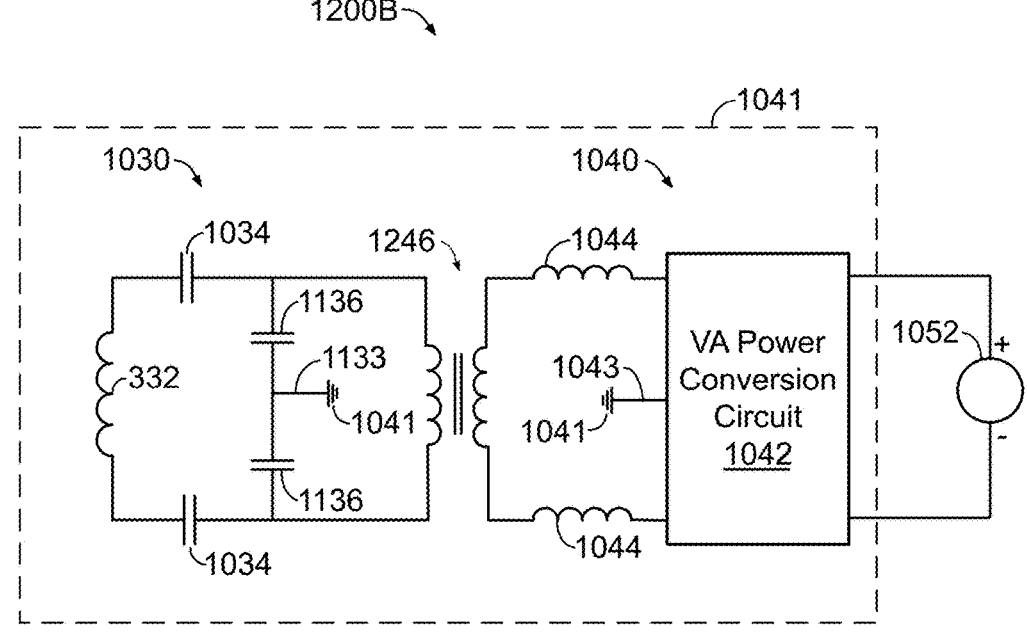

In the same aspect, FIG. 12B illustrates a VA circuit 1200B configured to provide improved attenuation of the high-frequency switching noise component mainly in the CM current $I_{CM2}$. The VA circuit 1200B equals the VA circuit 1100B of FIG. 11B, except that an isolation transformer 1246 is inserted at the WPT port of the VA power supply circuit 1040 (e.g., between the series inductors 1044 and the parallel capacitors 1036). It may be appreciated that the isolation transformer 1246 has the potential to substantially reduce the CM current $I_{CM2}$ if configured to exhibit a low capacitance between its primary and secondary winding. However, the isolation transformer 1246 needs to be dimensioned to transfer the full power as specified for the VA circuit 1200B, which may substantially increase space demand and cost of the VA power supply circuit 1040.

Figure 13A:
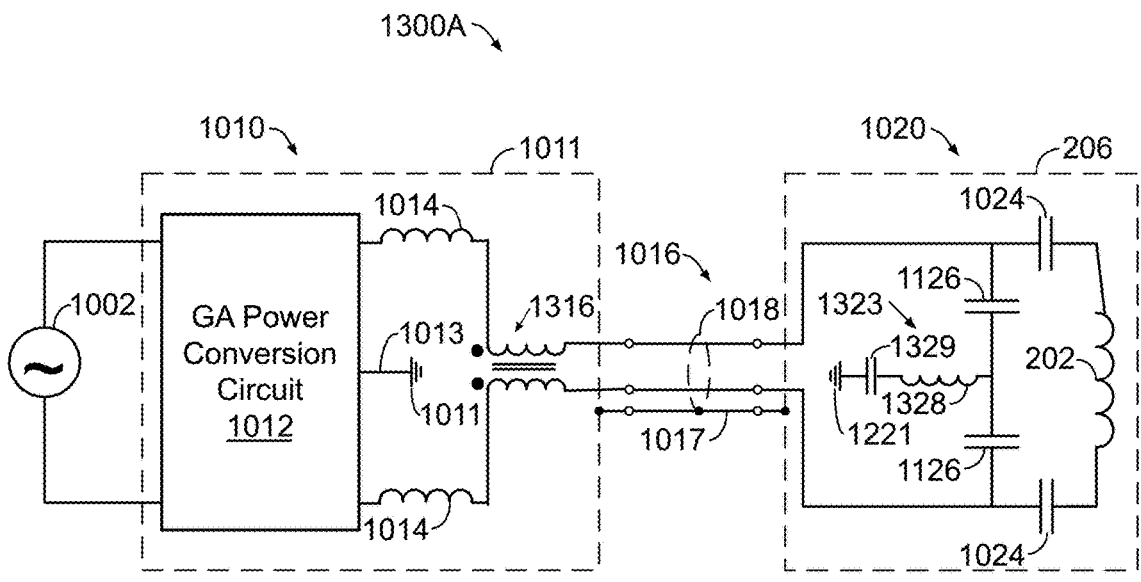

In a further aspect of noise reduction, FIG. 13A illustrates a GA circuit 1300A configured to provide improved attenuation of the high-frequency switching noise component mainly in the CM current $I_{CM1}$. The GA circuit 1300A equals the GA circuit 1200A of FIG. 12A, except that the isolation transformer 1216 is supplanted by a CM choke 1316 and that the center point grounding is implemented as a series LC resonant circuit, also referred to as a notch filter 1323, comprising an inductor 1328 and a capacitor 1329. The notch filter 1323 is tuned to provide an impedance minimum substantially at the operating frequency of the detection circuit 100. It may be appreciated that inserting the notch filter 1323 has the potential to selectively reduce a component of the CM current $I_{CM1}$ and thus the noise induced into the one or more sense elements at the operating frequency of the detection circuit 100, avoiding a substantial increase of the overall CM current in the ground connection 1013. It may also be appreciated that insertion of the CM choke 1316 helps to further suppress the noise induced into the sense elements.

Figure 13B:
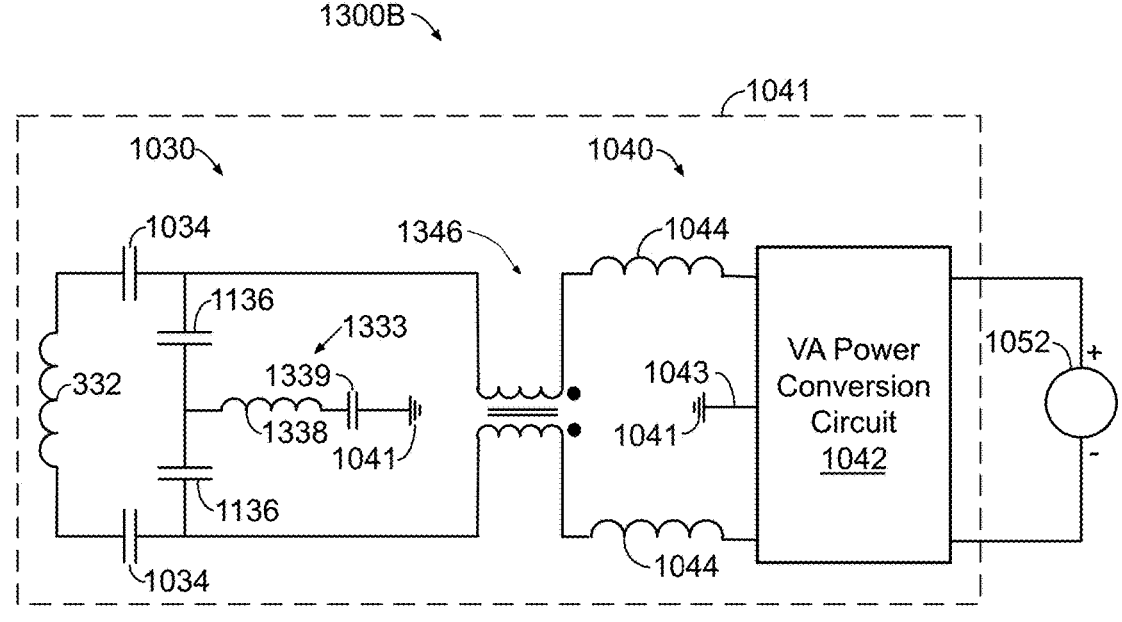

In the same aspect, FIG. 13B illustrates a VA circuit 1300B configured to provide improved attenuation of the high-frequency switching noise component mainly in the CM current $I_{CM2}$. The VA circuit 1300B equals the VA circuit 1200B of FIG. 12B, except that the isolation transformer 1246 is supplanted by a CM choke 1346 and that the center point grounding is implemented as a series LC resonant circuit, also referred to as a notch filter 1333, comprising an inductor 1338 and a capacitor 1339. The notch filter 1333 is tuned to provide an impedance minimum substantially at the operating frequency of the detection circuit 100. It may be appreciated that inserting the notch filter 1333 has the potential to selectively reduce a component of the CM current $I_{CM2}$ and thus the noise induced into the one or more sense elements at the operating frequency of the detection circuit 100, avoiding a substantial increase of the overall CM current in the ground connection 1043. It may also be appreciated that insertion of the CM choke 1346 helps to further suppress the noise induced into the sense elements.

In some implementations, one or more of the CM chokes 1316 and 1346 are implemented using one or more toroidal cores of a suitable ferrite material and a bifilar winding of an electrically conductive wire (e.g., a pair of Copper Litz wire) passing one or more times through the one or more toroidal cores.

In another aspect, the GA circuits 1100A to 1300A and the VA circuits 1100B and 1300B may be used as a whole or at least in part to reduce unwanted radiated and conducted emissions of a WPT system (e.g., to achieve compliance with an emission standard).

Figure 14:
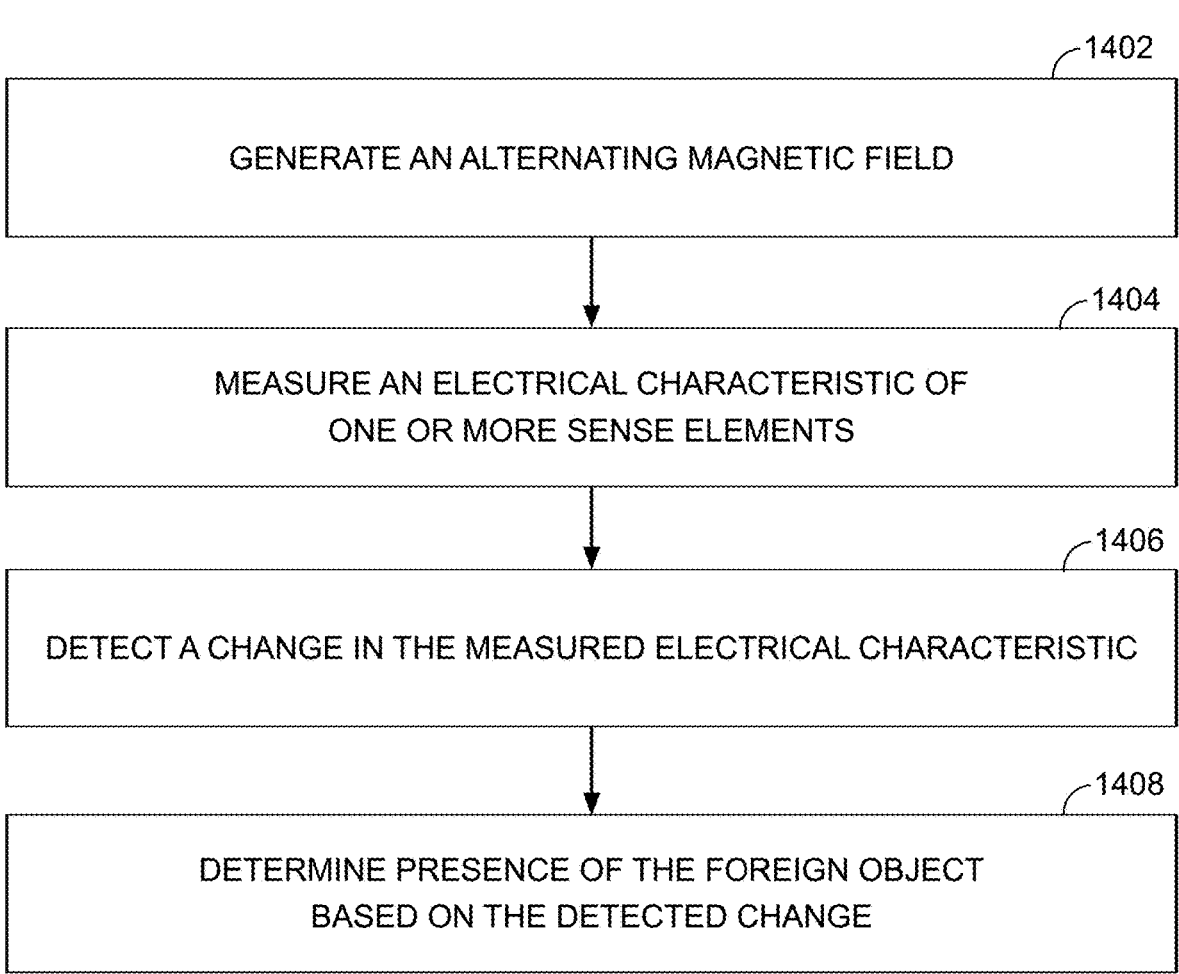
FIG. 14 illustrates example operations for performing hybrid inductive and capacitive sensing in a foreign object detection system.

In a further aspect, FIG. 14 illustrates example operations for performing combined inductive sensing and thermal sensing for detecting a foreign object. In certain aspects, the operations 1400 may be performed by a controller.

Operations 1400 begin at operation 1402, where an alternating field is generated in a WPT system comprising a sensing system comprising one or more sense elements and a mediating heat-sensitive material configured for detecting a foreign object based on one or more of an inductive and a thermal effect. At 1404, an electrical characteristic of one or more sense elements is measured. At 1406, a change in the measured electrical characteristic of the one or more sense elements is detected that is caused by one or more of the inductive effect and the thermal effect mediated by the mediating heat-sensitive material, which is configured to vary a property as a function of a temperature when heated by the foreign object exposed to the alternating magnetic field and herby to change the electrical characteristic of the one or more sense elements. Finally, at 1408 the presence of the foreign object is determined based on the detected change in the measured electrical characteristics.

As used herein, the term "determining" encompasses a wide variety of actions. For example, "determining" may include calculating, computing, processing, deriving, investigating, looking up (e.g., looking up in a table, a database, or another data structure), ascertaining, and the like. Also, "determining" may include receiving (e.g., receiving information), accessing (e.g., accessing data in a memory), and the like. Also, "determining" may include resolving, selecting, choosing, establishing, and the like.

The various illustrative logical blocks, modules, and circuits described in connection with the present disclosure may be implemented or performed with a general-purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, such as a combination of a DSP and a microprocessor, a plurality of microprocessors, one or more microprocessors in conjunction with a DSP core, or any other such configuration.

It is to be understood that the claims are not limited to the precise configuration and components illustrated above. Various modifications, changes, and variations may be made in the arrangement, operation and details of the methods and apparatus described above without departing from the scope of the claims.

What is claimed is:

1. An apparatus for detecting foreign objects in an inductive wireless power transfer system, based on one or more of an inductive effect and a capacitive effect, the apparatus comprising:

a first sense circuit comprising a first electrical conductor, the first electrical conductor forming a loop of an inductive sense element and terminating in a first terminal and a second terminal;

a second sense circuit comprising a second electrical conductor, the second electrical conductor forming an electrode of a capacitive sense element and having a third terminal; and a measurement circuit, the measurement circuit configured to:

measure a first electrical characteristic between the first terminal and the second terminal and a second electrical characteristic between the first terminal and the third terminal; and a controller configured to:

jointly use the measured first and second electrical characteristics to determine a presence of the foreign object and to discriminate whether the foreign object is a metallic object or a non-metallic object based on a change in the measured first and second electrical characteristics.

2. The apparatus of claim 1, wherein the first electrical conductor forms a balanced loop of at least two turns forming a substantially symmetric structure with respect to a mirror axis, and wherein the first electrical conductor has at least one crossover located on the mirror axis.

3. The apparatus of claim 1, wherein the first sense circuit further comprises a capacitor coupled between two equal length sections of the first electrical conductor forming a series resonant circuit tuned to a first operating frequency.

4. The apparatus of claim 1, wherein the first sense circuit further comprises a first capacitor coupled between the first electrical conductor and the first terminal and a second capacitor coupled between the first electrical conductor and the second terminal forming a series resonant circuit tuned to a first operating frequency.

5. The apparatus of claim 1, wherein the second sense circuit further comprises an inductor coupled between the second electrical conductor and the third terminal forming a series resonant circuit tuned to a second operating frequency.

6. The apparatus of claim 5, wherein the second sense circuit further comprises a capacitor coupled between the second electrical conductor and the first terminal in parallel to the capacitive sense element forming a series resonant circuit tuned to the second operating frequency.

7. The apparatus of claim 1, wherein the second electrical conductor comprises a single-turn open loop.

8. The apparatus of claim 1, wherein at least one of the first electrical characteristic or the second electrical characteristic is a complex impedance.

9. The apparatus of claim 1, wherein:

the first sense circuit further comprises a first capacitor coupled between the first electrical conductor and the first terminal and a second capacitor coupled between the first electrical conductor and the second terminal forming a series resonant circuit tuned to a first operating frequency;

the second sense circuit further comprises an inductor coupled between the second electrical conductor and the third terminal forming a series resonant circuit tuned to a second operating frequency; and the first operating frequency differs from the second operating frequency.

10. The apparatus of claim 1, wherein the first and second electrical characteristics are measured in different time intervals according to a time multiplexing scheme.

11. A method of detecting foreign objects in an inductive wireless power transfer system, based on one or more of an inductive effect and a capacitive effect, the method comprising:

measuring a first electrical characteristic between a first terminal and a second terminal of a first sense circuit comprising a first electrical conductor, the first electrical conductor forming a loop of an inductive sense element and terminating in the first terminal and the second terminal;

measuring a second electrical characteristic between the first terminal and a third terminal of a second sense circuit comprising a second electrical conductor, the second electrical conductor forming an electrode of a capacitive sense element and terminating at the third terminal; and jointly using the measured first and second electrical characteristics to determine a presence of a foreign object and to discriminate whether the foreign object is a metallic object or a non-metallic object based on a change in the measured first and second electrical characteristics.

12. The method of claim 11, wherein measuring at least one of the first and second electrical characteristics comprises measuring a complex impedance.

13. The method of claim 11, wherein the first and second electrical characteristics are measured in different time intervals according to a time multiplexing scheme.

\* \* \* \* \*